US010194015B2

(12) United States Patent
Ahuja et al.

(10) Patent No.: US 10,194,015 B2
(45) **Date of Patent: *Jan. 29, 2019**

(54) SYSTEMS AND METHODS FOR FACILITATING CONVERSATIONS

(71) Applicant: Glu Mobile, Inc., San Francisco, CA (US)

(72) Inventors: Sourabh Ahuja, San Francisco, CA (US); Liang Wu, San Francisco, CA (US); Michael Andrew Mok, San Francisco, CA (US)

(73) Assignee: Glu Mobile Inc., San Francisco, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/084,228

(22) Filed: Mar. 29, 2016

(65) Prior Publication Data

US 2016/0286028 A1 Sep. 29, 2016

Related U.S. Application Data

(63) Continuation-in-part of application No. 14/497,242, filed on Sep. 25, 2014, now Pat. No. 9,306,881.

(Continued)

(51) Int. Cl.

| | |
|---|---|
| ***H04M 1/725*** | (2006.01) |
| ***G06T 11/60*** | (2006.01) |
| ***G06F 3/0488*** | (2013.01) |
| ***G06F 3/0481*** | (2013.01) |
| ***G06F 3/0485*** | (2013.01) |

(Continued)

(52) U.S. Cl.

CPC ...... *H04M 1/72552* (2013.01); *G06F 3/0481* (2013.01); *G06F 3/0485* (2013.01); *G06F 3/0488* (2013.01); *G06F 17/2217* (2013.01); *G06F 17/2294* (2013.01); *G06T 11/60* (2013.01); *H04L 51/063* (2013.01); *H04L 51/10* (2013.01); *H04L 51/14* (2013.01)

(58) Field of Classification Search

CPC ........................................................ G06F 3/048

See application file for complete search history.

(56) References Cited

U.S. PATENT DOCUMENTS

| | | | | |
|---|---|---|---|---|
| 5,388,194 A * | 2/1995 | Vogel | B41M 3/14 | 358/1.18 |
| 2003/0038820 A1 * | 2/2003 | Purpura | G06F 21/84 | 345/629 |

(Continued)

*Primary Examiner* — Pei Yong Weng

(74) *Attorney, Agent, or Firm* — Morgan, Lewis & Bockius LLP

(57) ABSTRACT

Systems and methods are provided for displaying a graphical input stream comprising a plurality of keys, a first subset of which is a character set source and a second subset of which provides a message effect source. A first user input from the character set source forms an original multi-word message that is displayed in a message area. A second user input from the message effect source applies a corresponding message effect to only the multi-word message thereby forming a transformed representation. The multi-word message displayed in the message area is replaced with the transformed representation. Upon receipt of a third user input to transmit the contents of the message area, the original multi-word message and an indication of the message effect is transmitted.

26 Claims, 56 Drawing Sheets

Related U.S. Application Data

(60) Provisional application No. 62/142,681, filed on Apr. 3, 2015.

(51) Int. Cl.

| | |
|---|---|
| ***H04L 12/58*** | (2006.01) |
| ***G06F 17/22*** | (2006.01) |

(56) References Cited

U.S. PATENT DOCUMENTS

| | | | | | |
|---|---|---|---|---|---|
| 2007/0299925 | A1* | 12/2007 | Kirkland | G06F 17/2205 | 709/206 |
| 2009/0315895 | A1* | 12/2009 | Pahud | G06F 17/214 | 345/473 |
| 2014/0195619 | A1* | 7/2014 | Hodjat | H04L 51/08 | 709/206 |

* cited by examiner

Figure 5B:
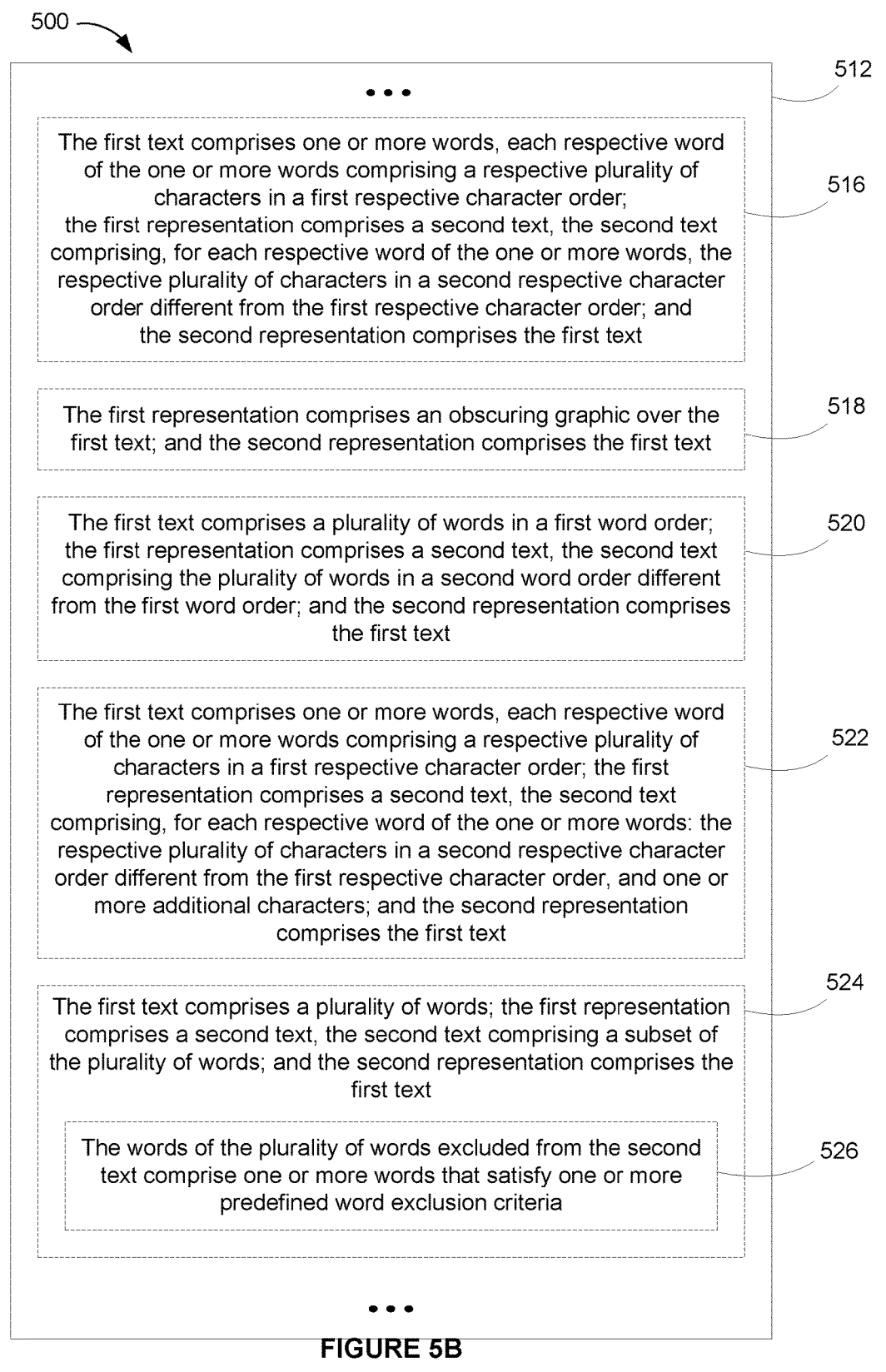

500

512

• • •

516
The first text comprises one or more words, each respective word of the one or more words comprising a respective plurality of characters in a first respective character order;
the first representation comprises a second text, the second text comprising, for each respective word of the one or more words, the respective plurality of characters in a second respective character order different from the first respective character order; and
the second representation comprises the first text 518
The first representation comprises an obscuring graphic over the first text; and the second representation comprises the first text 520
The first text comprises a plurality of words in a first word order; the first representation comprises a second text, the second text comprising the plurality of words in a second word order different from the first word order; and the second representation comprises the first text 522
The first text comprises one or more words, each respective word of the one or more words comprising a respective plurality of characters in a first respective character order; the first representation comprises a second text, the second text comprising, for each respective word of the one or more words: the respective plurality of characters in a second respective character order different from the first respective character order, and one or more additional characters; and the second representation comprises the first text 524
The first text comprises a plurality of words; the first representation comprises a second text, the second text comprising a subset of the plurality of words; and the second representation comprises the first text 526
The words of the plurality of words excluded from the second text comprise one or more words that satisfy one or more predefined word exclusion criteria

Figure 7A:
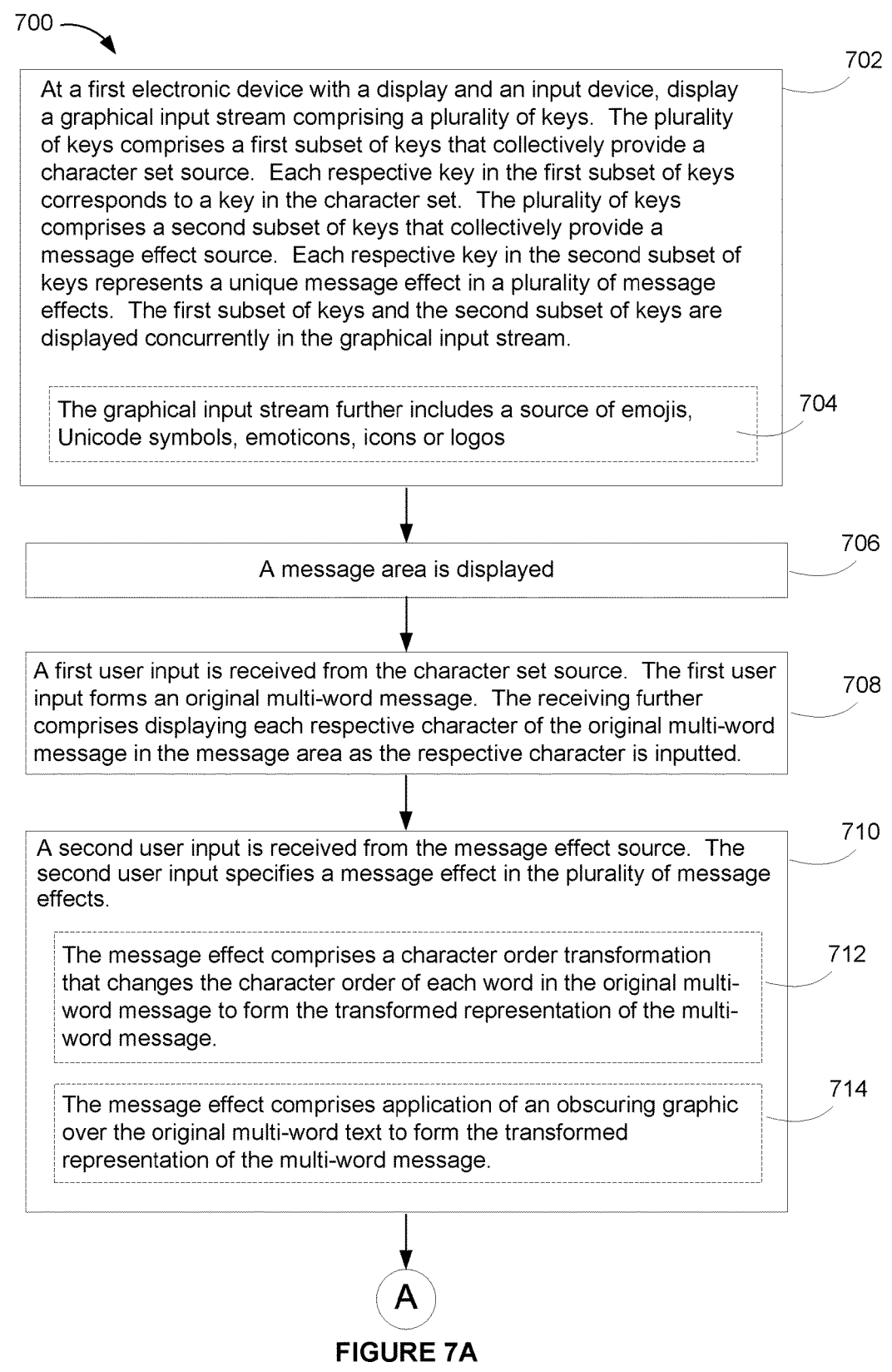

702 At a first electronic device with a display and an input device, display a graphical input stream comprising a plurality of keys. The plurality of keys comprises a first subset of keys that collectively provide a character set source. Each respective key in the first subset of keys corresponds to a key in the character set. The plurality of keys comprises a second subset of keys that collectively provide a message effect source. Each respective key in the second subset of keys represents a unique message effect in a plurality of message effects. The first subset of keys and the second subset of keys are displayed concurrently in the graphical input stream.

704 The graphical input stream further includes a source of emojis, Unicode symbols, emoticons, icons or logos 706 A message area is displayed 708 A first user input is received from the character set source. The first user input forms an original multi-word message. The receiving further comprises displaying each respective character of the original multi-word message in the message area as the respective character is inputted.

710 A second user input is received from the message effect source. The second user input specifies a message effect in the plurality of message effects.

712 The message effect comprises a character order transformation that changes the character order of each word in the original multi-word message to form the transformed representation of the multi-word message.

714 The message effect comprises application of an obscuring graphic over the original multi-word text to form the transformed representation of the multi-word message.

SYSTEMS AND METHODS FOR FACILITATING CONVERSATIONS

CROSS REFERENCE TO RELATED APPLICATIONS

This Application is a continuation-in-part of U.S. patent application Ser. No. 14/497,242, entitled "Methods and Systems for Obscuring Text in a Conversation," filed Sep. 25, 2014, which is hereby incorporated by reference herein in its entirety. This Application also claims priority to U.S. Provisional Application No. 62/142,681, entitled "Systems and Methods for Facilitating Conversations," filed Apr. 3, 2015, which is hereby incorporated by reference herein in its entirety.

TECHNICAL FIELD

The present application generally describes messaging, and more particularly to applying transformations to messages within message conversations.

BACKGROUND

With the growth of the Internet and wireless communication technologies, mobile messaging, such as texting and instant messaging (e.g., chatting) have become a ubiquitous form of communication. As mobile messaging has grown, new features have been developed to enhance the messaging experience. For example, users can send emoji, share photos and videos, send an audio message, and/or send a virtual sticker. However, these experience-enhancing features have mostly left the body text of the messages undisturbed. Features targeted to the message body text opens up new avenues of enhancement and revitalization of the messaging experience.

SUMMARY

Systems and methods are provided for displaying a graphical input stream comprising a plurality of keys, a first subset of which is a character set source and a second subset of which provides a message effect source. A first user input from the character set source forms an original multi-word message that is displayed in a message area. A second user input from the message effect source applies a corresponding message effect to the entire multi-word message (e.g., converting the entire message to a hashtag) thereby forming a transformed representation. The multi-word message displayed in the message area is replaced with the transformed representation. In some embodiments, upon receipt of a third user input to transmit the contents of the message area, the original multi-word message and an indication of the message effect is transmitted (e.g., to a remote recipient device). In some embodiments, upon receipt of a third user input to transmit the contents of the message area, the transformed representation is transmitted.

In accordance with some implementations, a method is provided that comprises, at an electronic device with a display and an input device, displaying a graphical input stream comprising a plurality of keys. The plurality of keys comprises a first subset of keys that collectively provide a character set source. Each respective key in the first subset of keys corresponds to a key in the character set. The plurality of keys comprises a second subset of keys that collectively provide a message effect source. Each respective key in the second subset of keys represents a unique message effect in a plurality of message effects. The first and second subset of keys is displayed concurrently in the graphical input stream. A message area is also displayed. A first user input is received from the character set source. The first user input forms an original multi-word message. Each respective character of the original multi-word message is displayed in the message area as the respective character is inputted. A second user input from the message effect source specifies a message effect in the plurality of message effects. Responsive to receiving the second user input, the message effect is applied to the entire multi-word message thereby forming a transformed representation of the multi-word message. The multi-word message displayed in the message area is replaced with the transformed representation of the multi-word message. A third user input to transmit the contents of the message area is received. In response, the original multi-word message and an indication of the message effect is transmitted.

In some embodiments, the transmitting further comprises sending formatting instructions for (i) displaying the transformed representation of the multi-word message on a receiving device, and (ii) in response to a user input with respect to the transformed representation at the receiving device, transiently replacing the displayed transformed representation with a display of the original multi-word message for a time period (e.g., five minutes or less, one minute or less, 30 seconds or less, 10 seconds or less, or 1 second or less), and without further user intervention, upon completion of the time period, restoring display of the transformed representation on the receiving device. In some such embodiments, the transformed representation comprises a plurality of characters found in the original multi-word text in a scrambled order relative to their order in the original multi-word text, and the transiently replacing comprises displaying an animation of the plurality of characters moving into place and re-forming the words of the original multi-word message.

In some embodiments, the graphical input stream further includes a source of emojis, Unicode symbols, emoticons, icons or logos. In some embodiments, the message effect comprises a character order transformation that changes the character order of each word in the original multi-word message to form the transformed representation of the multi-word message.

In some embodiments, the message effect comprises application of an obscuring graphic over the original multi-word text to form the transformed representation of the multi-word message.

In some embodiments, the message effect comprises a word order transformation that changes the word order of the original multi-word message to form the transformed representation of the multi-word message.

In some embodiments, the message effect comprises a character order transformation that changes the character order of each word in the original multi-word message and adds one or more characters to each word in the original multi-word message to form the transformed representation of the multi-word message.

In some embodiments, the message effect comprises a word order transformation that removes one or more words from the multi-word message to form the transformed representation of the multi-word message. In some embodiments, the words excluded from the transformed representation comprise one or more words that satisfy one or more predefined word exclusion criteria.

In some embodiments, the representation comprises, for each respective word of the original multi-word message, one or more of (i) the respective word and one or more additional characters, (ii) the respective word with one or more characters substituted, and, (iii) the respective word with one or more characters removed.

In some embodiments, the transformed representation comprises a character spacing transformation that increases the character spacing in the original multi-word message to form the transformed representation of the multi-word message.

In some embodiments, the message effect comprises a hashtag transformation that converts the multi-word message to a hashtag.

Another aspect of the present disclosure provides a method comprising, at a first electronic device with a display and an input device, displaying a graphical input stream comprising a plurality of keys. The plurality of keys comprises a first subset of keys that collectively provide a character set source. Each respective key in the first subset of keys corresponds to a key in the character set. The plurality of keys comprises a second subset of keys that collectively provide a message effect source. Each respective key in the second subset of keys represents a unique message effect in a plurality of message effects. The first subset of keys and the second subset of keys are displayed concurrently in the graphical input stream. In the method, a message area is displayed. Further, in the method, a first user input from the character set source is received. The user input forms an original multi-word message. The receiving further comprises displaying each respective character of the original multi-word message in the message area as the respective character is inputted. In the method, a second user input from the message effect source is received. The second user input specifies a message effect in the plurality of message effects. The message effect is a hashtag key. In the method, responsive to receiving the second user input, the message effect is applied to the entire multi-word message thereby forming a transformed representation of the original multi-word message. The transforming converts the multi-word message to a hashtag. The multi-word message displayed in the message area is then replaced by the hashtag. A third user input to transmit the contents of the message area is received. In response to receiving the third user input to transmit the contents of the message area, the hashtag is transmitted (e.g., a remote device).

Another aspect of the present disclosure provides an electronic device comprising a display, one or more processors, memory, and one or more programs running on the one or more processors. The one or more programs comprise instructions for displaying a graphical input stream comprising a plurality of keys on the display. The plurality of keys comprises a first subset of keys that collectively provide a character set source. Each respective key in the first subset of keys corresponds to a key in the character set. The plurality of keys comprises a second subset of keys that collectively provide a message effect source. Each respective key in the second subset of keys represents a unique message effect in a plurality of message effects. The first and second subset of keys is displayed concurrently in the graphical input stream. A message area is displayed on the display. A first user input from the character set source is received. The first user input forms an original multi-word message. The receiving further comprises displaying each respective character of the original multi-word message in the message area as the respective character is inputted. A second user input from the message effect source is received. The second user input specifies a message effect in the plurality of message effects. Responsive to receiving the second user input, the message effect is applied to the entire multi-word message thereby forming a transformed representation of the multi-word message. The multi-word message displayed in the message area is replaced with the transformed representation of the multi-word message. A third user input to transmit the contents of the message area is received. In response to receiving the third user input to transmit the contents of the message area, the original multi-word message and an indication of the message effect is transmitted. In some embodiments, this transmitting further comprises sending formatting instructions for (i) displaying the transformed representation of the multi-word message on a receiving device, and (ii) in response to a user input with respect to the transformed representation at the receiving device, transiently replacing the displayed transformed representation with a display of the original multi-word message for a time period, and without further user intervention, upon completion of the time period, restoring display of the transformed representation on the receiving device. In some embodiments, this time period is (e.g., five minutes or less, one minute or less, 30 seconds or less, 10 seconds or less, or 1 second or less).

Another aspect of the present disclosure provides a non-transitory computer-readable storage medium storing one or more programs. The one or more programs comprise instructions which, when executed by an electronic device with a display and an input device, cause the device to display a graphical input stream comprising a plurality of keys. The plurality of keys comprises a first subset of keys that collectively provide a character set source. Each respective key in the first subset of keys corresponds to a key in the character set. The plurality of keys comprises a second subset of keys that collectively provide a message effect source. Each respective key in the second subset of keys represents a unique message effect in a plurality of message effects. The first subset of keys and the second subset of keys are displayed concurrently in the graphical input stream. The one or more programs further comprise instructions to display a message area. In response to receiving a first user input from the character set source, the first user input forming an original multi-word message, the one or more programs further comprise instructions to display each respective character of the original multi-word message in the message area as the respective character is inputted. Upon receiving a second user input from the message effect source, the second user input specifying a message effect in the plurality of message effects, the one or more programs further comprise instructions to apply the message effect to the entire multi-word message thereby forming a transformed representation of the multi-word message. The one or more programs further comprise instructions to replace the multi-word message displayed in the message area with the transformed representation of the multi-word message. In response to receiving a third user input to transmit the contents of the message area, the one or more programs further comprise instructions to transmit the original multi-word message and an indication of the message effect (e.g., to a remote device). In some embodiments, the transmitting further comprises sending formatting instructions for (i) displaying the transformed representation of the multi-word message on a receiving device, and in response to a user input with respect to the transformed representation at the receiving device, transiently replacing the displayed transformed representation with a display of the original multi-word message for a time period, and without further user intervention, upon completion of the time period, restoring display of the transformed representation on the receiving device.

Another aspect of the present disclosure provides a method of communicating at a server comprising one or more processors, and memory for storing programs to be executed by the one or more processors. The method comprises formatting for display on a source electronic device, a graphical input stream comprising a plurality of keys. The plurality of keys comprises a first subset of keys that collectively provide a character set source for a character set. Each respective key in the first subset of keys corresponds to a key in the character set. The plurality of keys comprises a second subset of keys that collectively provide a message effect source. Each respective key in the second subset of keys represents a unique message effect in a plurality of message effects. The first and second subset of keys is displayed concurrently in the graphical input stream. In the method, there is received, from the source electronic device, (i) an original multi-word message entered by a user through use of the first subset of keys and (ii) an indication of a message effect entered by the user at the source electronic device by selection of a key in the second subset of keys. The message effect is applied to the entire multi-word message thereby forming a transformed representation of the multi-word message. In the method the transformed representation is transmitted to a recipient electronic device indicated by the user. In some embodiments, the source electronic device and/or the recipient electronic device are portable electronic devices. In some embodiments, the message effect comprises a hashtag transformation that converts the multi-word message to a hashtag. In some embodiments, a spell checker operating at the source electronic device or the recipient electronic device ignores the hashtag. In some embodiments, the hashtag is stored at the source electronic device for subsequent use. In some embodiments, the transformed representation is formed at the source electronic device and the server does not receive or transmit the original multi-word message. In some embodiments, the transformed representation is formed at the server and the server does not transmit the original multi-word message. In some embodiments, the transformed representation is formed at the recipient electronic device and the server receives the original multi-word message from the source electronic device and transmits the original multi-word message to the recipient electronic device.

BRIEF DESCRIPTION OF THE DRAWINGS

FIG. 5A-FIG. 5C illustrate a method of displaying text with message effects in accordance with some implementations.

FIG. 7A-FIG. 7C illustrate a method of applying transformations to messages within message conversations in accordance with some implementations.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
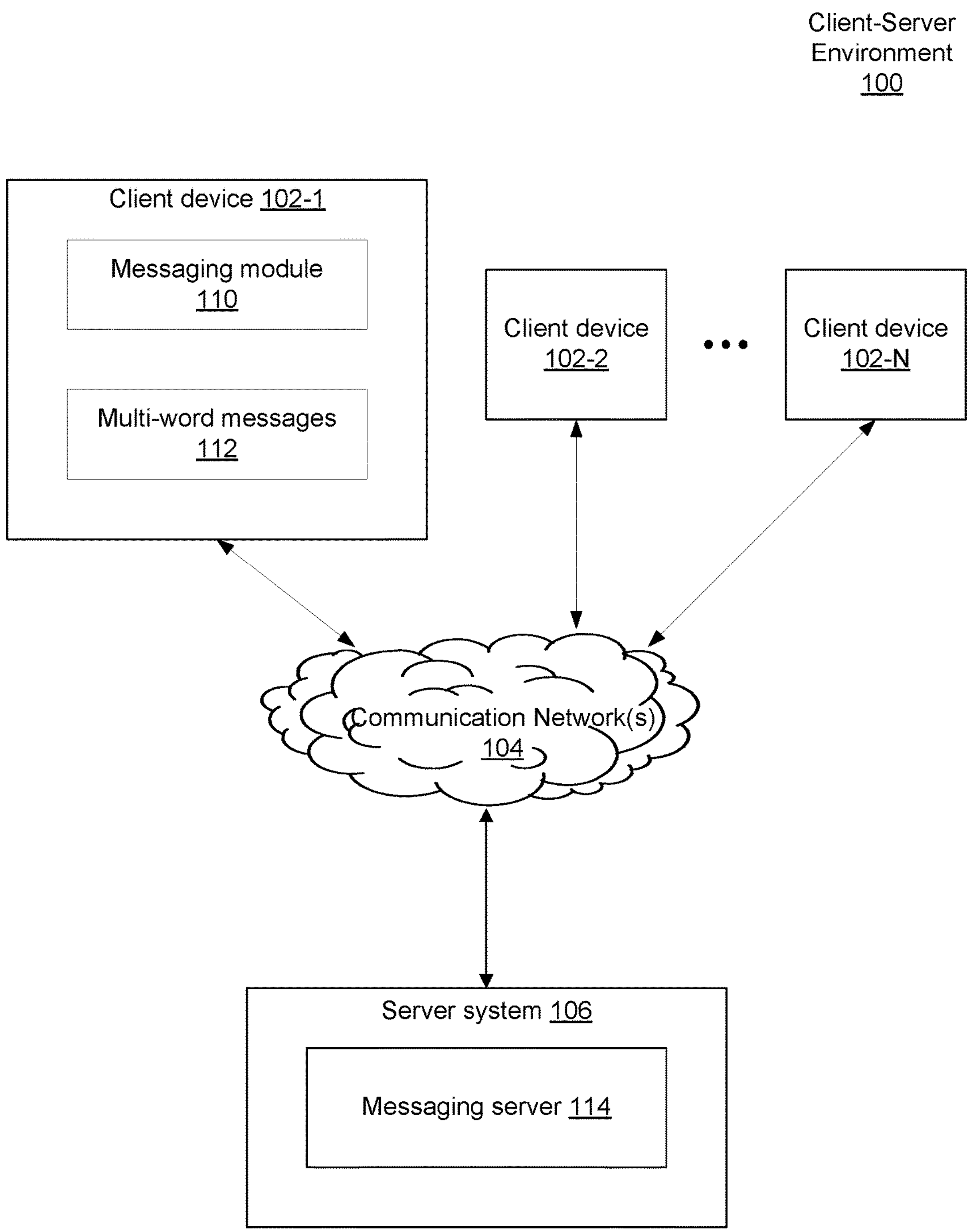
FIG. 1 is a diagram illustrating a client-server system in accordance with some implementations.

FIG. 1 illustrates a client-server environment 100 in accordance with some implementations. The client-server environment 100 includes multiple client devices 102 and a server system 106. The client devices 102 and server system 106 are communicatively coupled by one or more communication networks 104.

In some implementations, the client-server environment 100 is a messaging environment, in which client devices 102 can send multi-word messages (e.g., chat messages, text messages, instant messaging messages, email messages) to each other through the server system 106. In some embodiments, a multi-word message includes one or more of: text, hyperlinks, emoji, virtual stickers, image(s), audio, and video. The server system 106 operates a messaging service that facilitates the sending and receiving of multi-word message messages by the client devices 102.

The communication network(s) 104 can be any wired or wireless local area network (LAN) and/or wide area network (WAN), such as an intranet, an extranet, or the Internet. It is sufficient that the communication network 104 provides communication capability between the client devices 102, the server system 106, and optional other devices and systems. In some implementations, the communication network(s) 104 uses the HyperText Transport Protocol (HTTP) to transport information using the Transmission Control Protocol/Internet Protocol (TCP/IP). HTTP permits client devices 102 to access various resources available via the communication network(s) 104. The various implementations described herein, however, are not limited to the use of any particular protocol.

The client-server environment includes multiple client devices 102 (e.g., clients 102-1 thru 102-N in FIG. 1). A respective client device 102 is any suitable computing device that, in some implementations, is capable of connecting to the communication network(s) 104, receiving from the server system 106 multi-word messages originating from other client devices 102, sending to the server system 106 messages intended for other client devices 102, and presenting, managing, and inputting/editing multi-word messages. In some implementations, the client device 102 is a smartphone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of sending and receiving messages, as well as presenting (e.g., displaying), managing, and inputting/editing messages. In some implementations, the client device 102 includes an image capture device (e.g., a camera).

In some implementations, the client device 102 includes a messaging module 110, and one or more messages 112. The client device 102 stores received and sent multi-word messages 112. The client device 102 is configured to, with user input, manage, input/edit, and present the multi-word messages 112 using the messaging module 110. The client device 102 is configured to send and receive multi-word messages and content to/from other client devices 102 using the messaging module 110. In some implementations, the client device 102 also includes other modules, such as a content sharing module. In some implementations, the messaging module 110 is a client application (e.g., a messaging application).

Multi-word messages sent by a client device 102 are sent to the server system 106, which sends the multi-word messages to respective destination client devices 102. In some implementations, the server system 106 includes a messaging server 114. The messaging server 114 operates a messaging service in which client devices 102 can send and receive multi-word messages to/from each other. The messaging server 114 facilitates connections between client devices 102 for sending and receiving multi-word messages, receiving multi-word messages from client devices 102, sending the multi-word messages and content to destination client devices 102, and maintains user accounts and data with respect to the messaging service. The messaging server 114 also stores, in the server system 106, copies of the messages exchanged by the client devices 102. In some implementations, the servers system 106 operates a social network service, of which the messaging service and the messaging server 114 are parts.

The server system 106 is described herein as a single server computer for sake of convenience and ease of understanding. It should be appreciated, however, that the server system 106 may be implemented as a single server computer or as multiple server computers (e.g., in a distributed server system).

Figure 2:
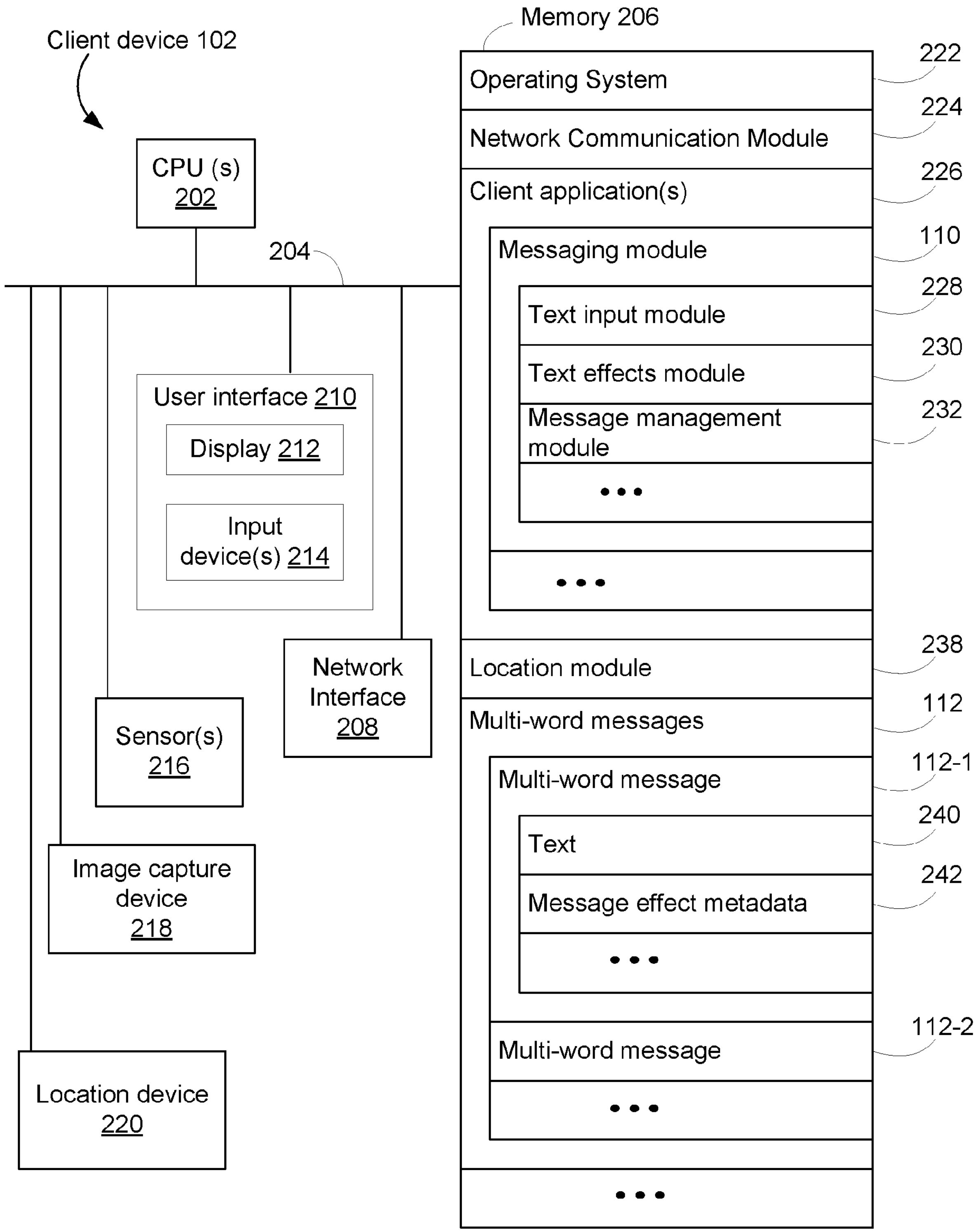
FIG. 2 is a block diagram illustrating a client device in accordance with some implementations.

FIG. 2 is a block diagram illustrating a client device 102 in accordance with some implementations. The client device 102 typically includes one or more processing units (CPU's) 202, one or more network or other communications interfaces 208, memory 206, and one or more communication buses 204, for interconnecting these and other components. The communication buses 204 optionally include circuitry (sometimes called a chipset) that interconnects and controls communications between system components. The client device 102 also includes a user interface 210. The user interface 210 includes a display device 212 and one or more input devices 214.

In some implementations, the display device 212 is integrated with the device (e.g., housed in the same chassis as the CPU and memory, such as with a smartphone or an all-in-one desktop computer). In some other implementations, the display device 212 is separate from other components of the client device 102 (e.g., a separate device from the device that houses the CPUs 202 and memory 206, such as with a desktop computer with a "tower" chassis housing the CPU and memory and a separate display device).

In some implementations, the input device(s) 214 include one or more of: a mouse or similar pointing device, a keyboard, a touch-sensitive surface (e.g., a touch pad, a touch-sensitive display), a joystick, and one or more buttons. In some implementations, the display device 212 is a touch screen (e.g., a touch-sensitive display).

In some implementations, the client device 102 includes additional input devices, such as an audio input device (e.g., a microphone). In some implementations, the client device 102 includes an audio output device (e.g., a speaker, headphones).

In some implementations, the client device 102 also includes one or more of: one or more sensors 216 (e.g., accelerometer, magnetometer, proximity sensor, gyroscope), an image capture device 218 (e.g., a camera device or module and related components), and a location module 220 (e.g., a Global Positioning System (GPS) receiver or other navigation or geolocation device and related components).

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some implementations, memory 206 or the computer readable storage medium of memory 206 store the following programs, modules and data structures, or a subset thereof, including operation system 222, network communication module 224, one or more client applications 226, a location module 238, and multi-word messages 112.

The operating system 222 includes procedures for handling various basic system services and for performing hardware dependent tasks, as well as optionally obtaining readings from sensors 216.

The network communication module 224 facilitates communication with other devices and computers (e.g., other client devices 102, server system 106) via the one or more communication network interfaces 208 (wired or wireless) and one or more communication networks 104, such as the Internet, other wide area networks, local area networks, metropolitan area networks, and so on.

The client application(s) 226 perform various operations. In some implementations, the client applications 108 include a messaging module 110. The messaging module 110 is configured to, in conjunction with the messaging service operated by the server system 106, send and receive multi-word messages. The messaging module 110 includes a text input module 228, a message effect module 230, and message management module 232. The text input module is configured to present user interfaces (e.g., graphical user interfaces and input fields) for user input of text for a message and user selection of a message effect, and receiving that user input and user selection. The message effect module 230 is configured to apply a message effect to an entire multi-word message thereby forming a transformed representation of the multi-word message. In some embodiments this includes generating corresponding metadata for the multi-word message. The message effect module 230 is further configured to replace the multi-word message displayed in the message area with the transformed representation of the multi-word message. The message management module 232 is configured to manage multi-word messages 112 in accordance with user direction, including deleting, archiving, and organizing multi-word messages 112.

In some implementations, the location module 238 determines the location of the client device 102 (e.g., using GPS or other similar systems, location identification by IP address, etc.).

The client device 102 stores multi-word messages 112 (e.g., multi-word messages 112-1 and 112-2) sent and received by the messaging module 110. In some implementations, the multi-word messages 112 are a time-limited set or number-limited set of the multi-word messages (e.g., last one months' worth, last two months worth, last 100 messages for each message conversation with a respective user) sent and received by the client device 102; a complete archive or repository of the messages is stored at the server system 106. For a given multi-word message, such as message 112-1, what is stored is the original multi-word input provided by the user and the message effect selected by the user. Typically, this message effect is stored as metadata 242. The message effect metadata indicates whether a message effect is applied to the message (more particularly, the text 240), and a message effect is applied, which message effect is applied. Further details regarding message effects are described below.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a client device, FIG. 2 is intended more as functional description of the various features which may be present in a client device than as a structural schematic of the implementations described herein. In practice, and as recognized by those of ordinary skill in the art, items shown separately could be combined and some items could be separated.

Figure 3:
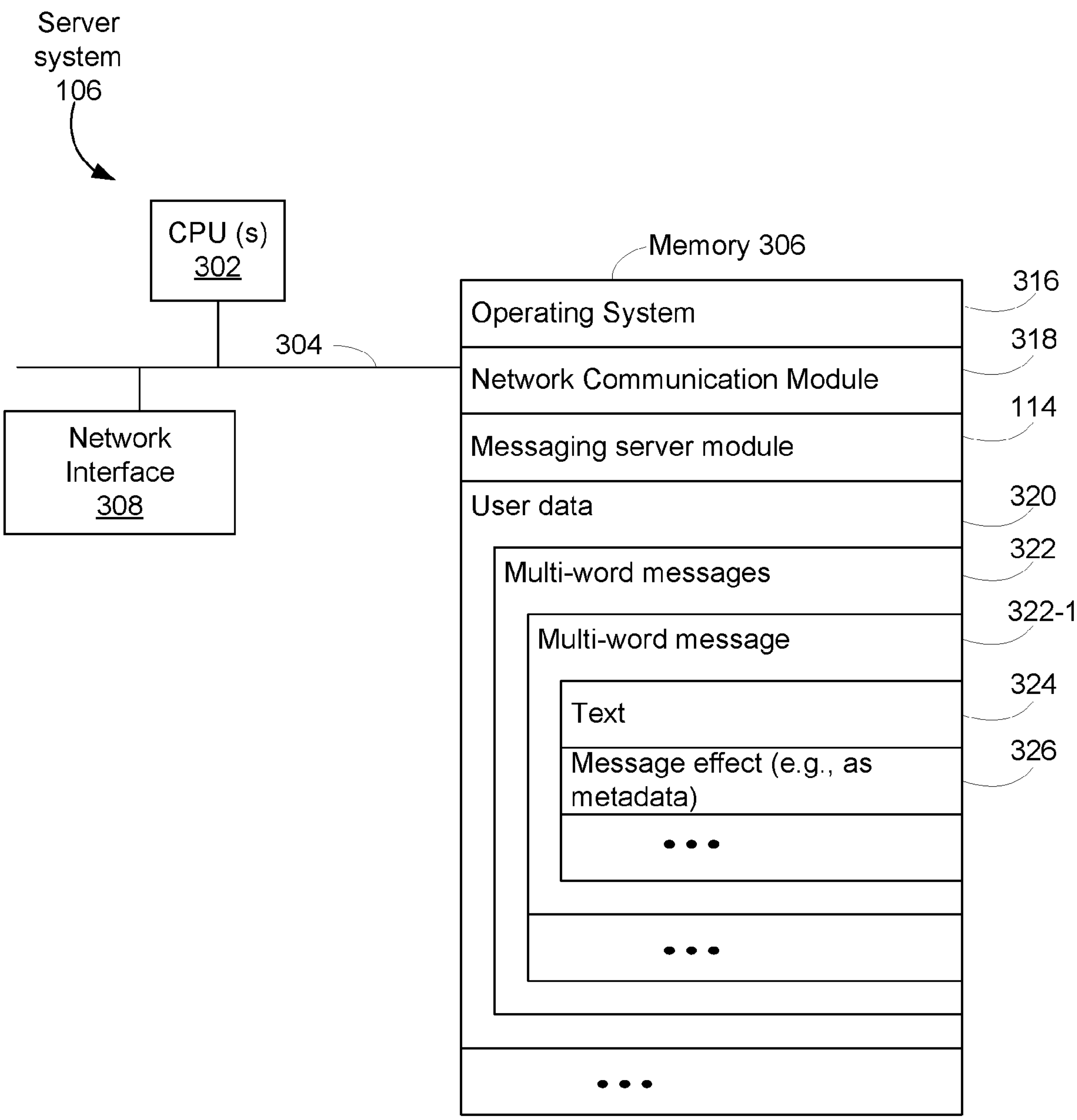
FIG. 3 is a block diagram illustrating a server system in accordance with some implementations.

FIG. 3 is a block diagram illustrating a server system 106, in accordance with some implementations. The server system 106 typically includes one or more processing units (CPU's) 302, one or more network or other communications interfaces 308, memory 306, and one or more communication buses 304 for interconnecting these components. The communication buses 304 optionally include circuitry (sometimes called a chipset) that interconnects and controls communications between system components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 306 includes one or more storage devices remotely located from the CPU(s) 302. Memory 306, including the non-volatile and volatile memory device(s) within memory 306, comprises a non-transitory computer readable storage medium. In some implementations, memory 306 or the non-transitory computer readable storage medium of memory 306 stores the following programs, modules and data structures, or a subset thereof, including an operation system 316, a network communication module 318, a messaging server module 114, and user data 320.

The operating system 316 includes procedures for handling various basic system services and for performing hardware dependent tasks.

The network communication module 318 facilitates communication with other devices and computers (e.g., client devices 102) via the one or more communication network interfaces 308 (wired or wireless) and one or more communication networks 104, such as the Internet, other wide area networks, local area networks, metropolitan area networks, and so on.

The messaging server module 114 operates a messaging service and performs operations related to the messaging service. In some implementations, the messaging server module 114 connects client devices 102, receives messages and content from client devices 102 and sends the messages and content to their destination client devices 102, and manages the user data 320 for the messaging service.

User data 320 is the data associated with the users of the messaging service. User data 320 includes user account and profile information (e.g., username, password) (not shown), and, for each user, multi-word messages 322 sent and received by the users. The multi-word messages 322 are a complete archive or repository of the messages sent and received by the client device 102 using the messaging service. For any given multi-word message that includes text, such as message 322-1, the message 322-1 includes the original multi-word message text 324 (analogous to text 240 of message 112-1) and an indication of the message effect to be applied to the original multi-word message 326 (analogous to message effect metadata 242 of message 112-1).

Each of the above identified elements may be stored in one or more of the previously mentioned memory devices, and each of the modules or programs corresponds to a set of instructions for performing a function described above. In some embodiments, the set of instructions is executed by one or more processors (e.g., the CPUs 302). The above identified modules or programs need not be implemented as separate software programs, procedures or modules, and thus, in some implementations, various subsets of these modules is combined or otherwise re-arranged. In some implementations, memory 306 stores a subset of the modules and data structures identified above. Furthermore, in some embodiments, memory 306 stores additional modules and data structures not described above.

Although FIG. 3 shows a server system, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3 could be implemented on single servers and single items could be implemented by one or more servers. The actual number of servers used to implement the server system 106 and how features are allocated among them will vary from one implementation to another, and, in some instances, depends in part on the amount of data traffic that the system must handle during peak usage periods as well as during average usage periods.

Figure 4A:
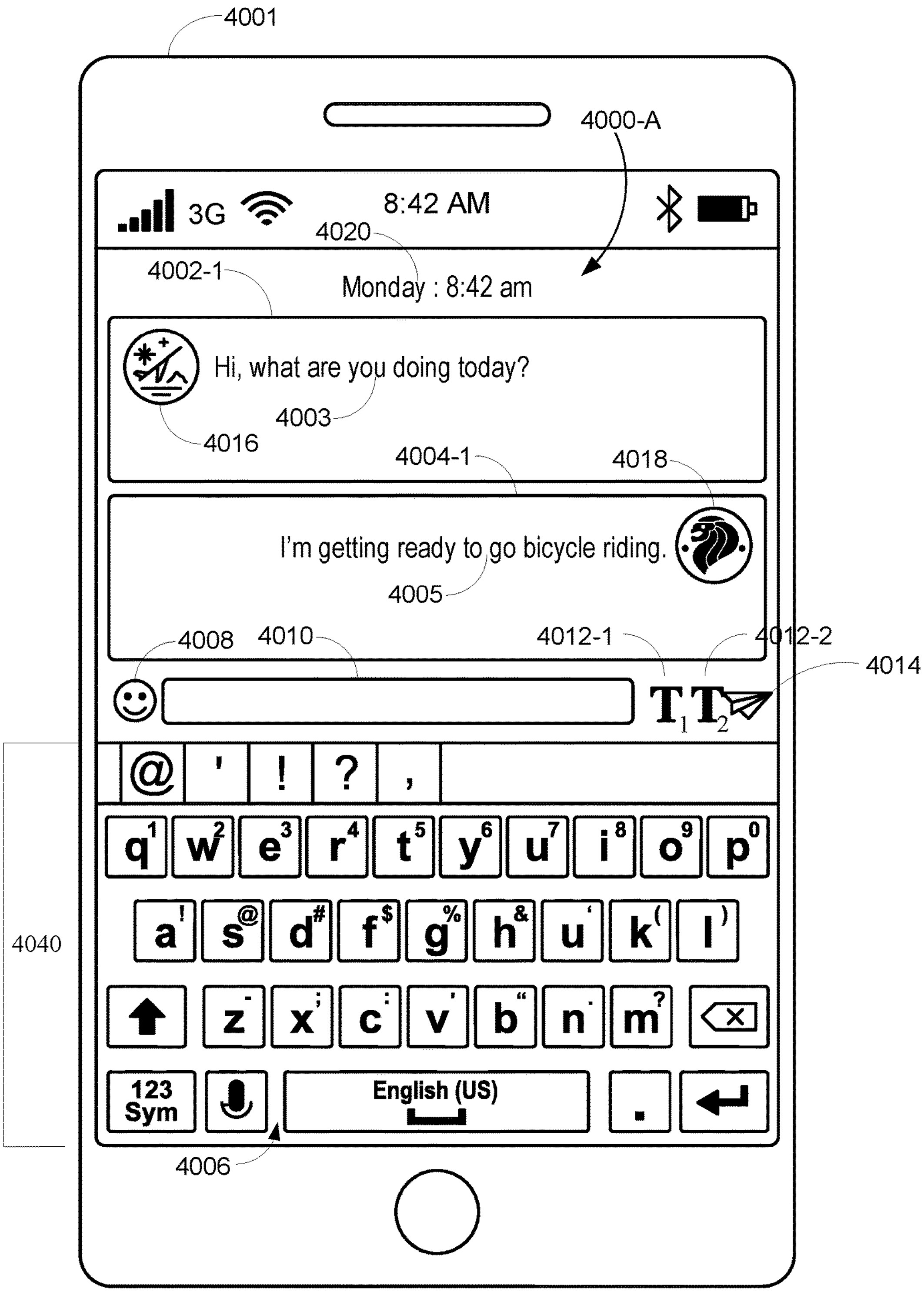
FIG. 4A-FIG. 4TT illustrate example user interfaces in accordance with some implementations.
Figure 4B:
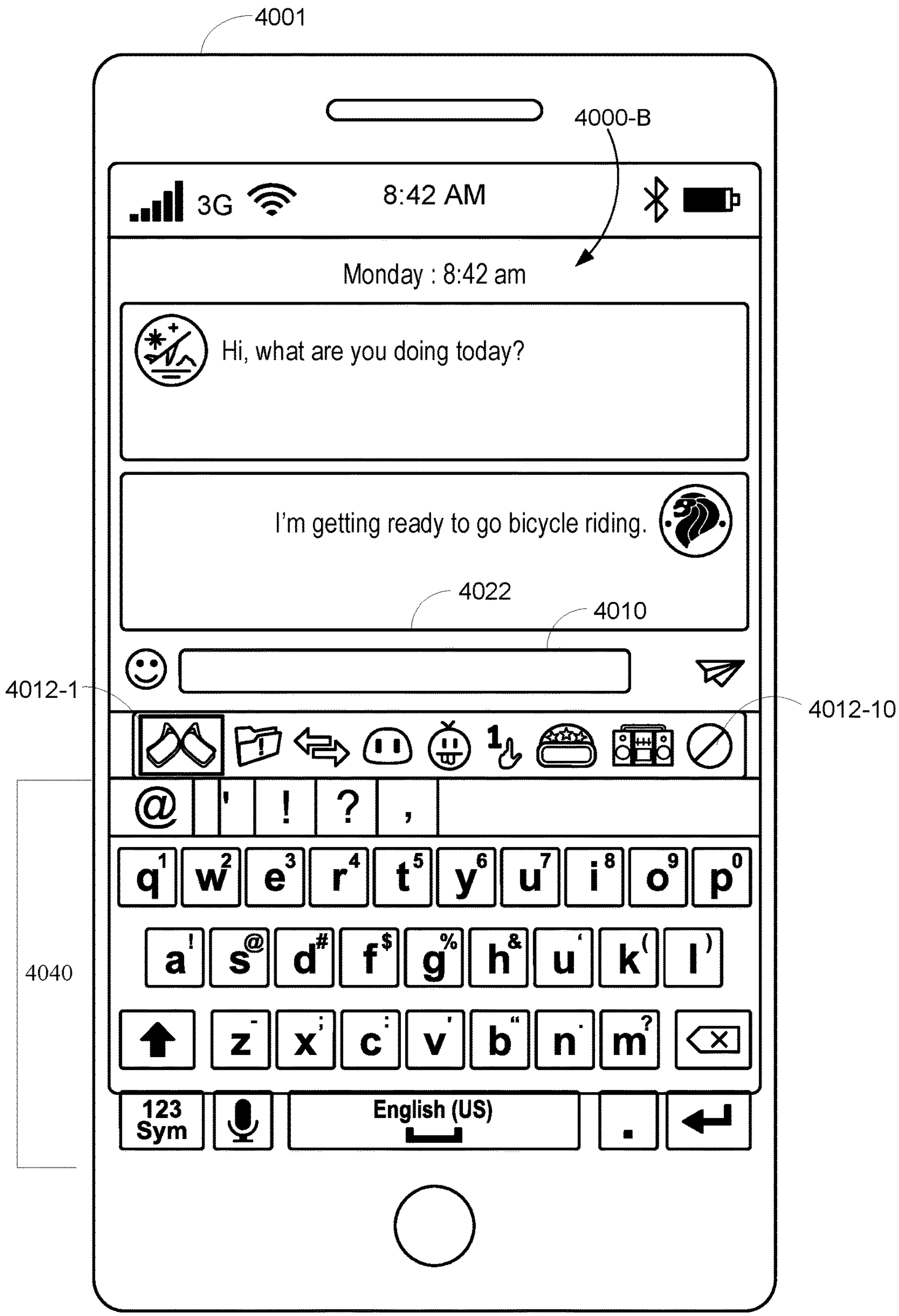
Figure 4C:
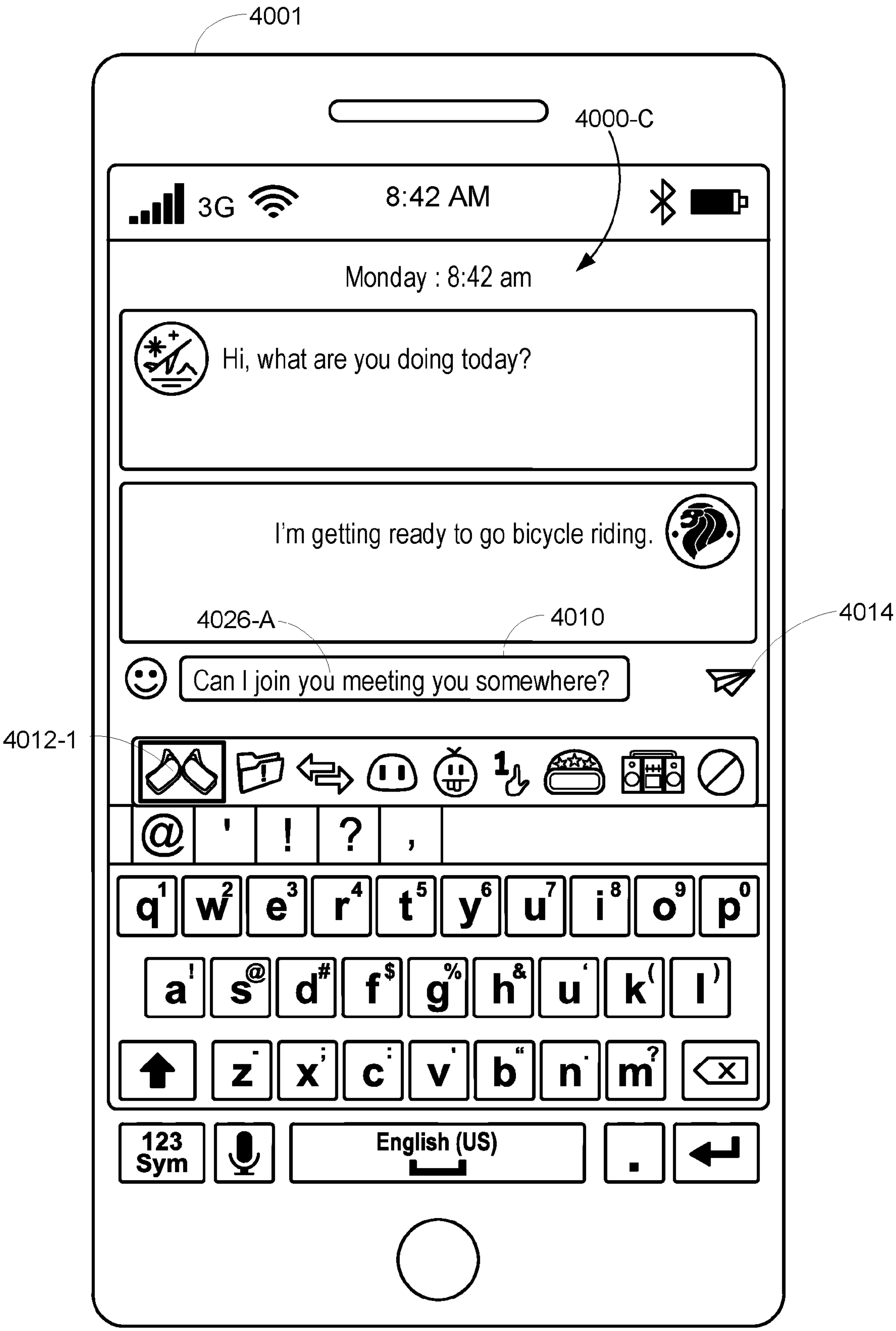
Figure 4D:
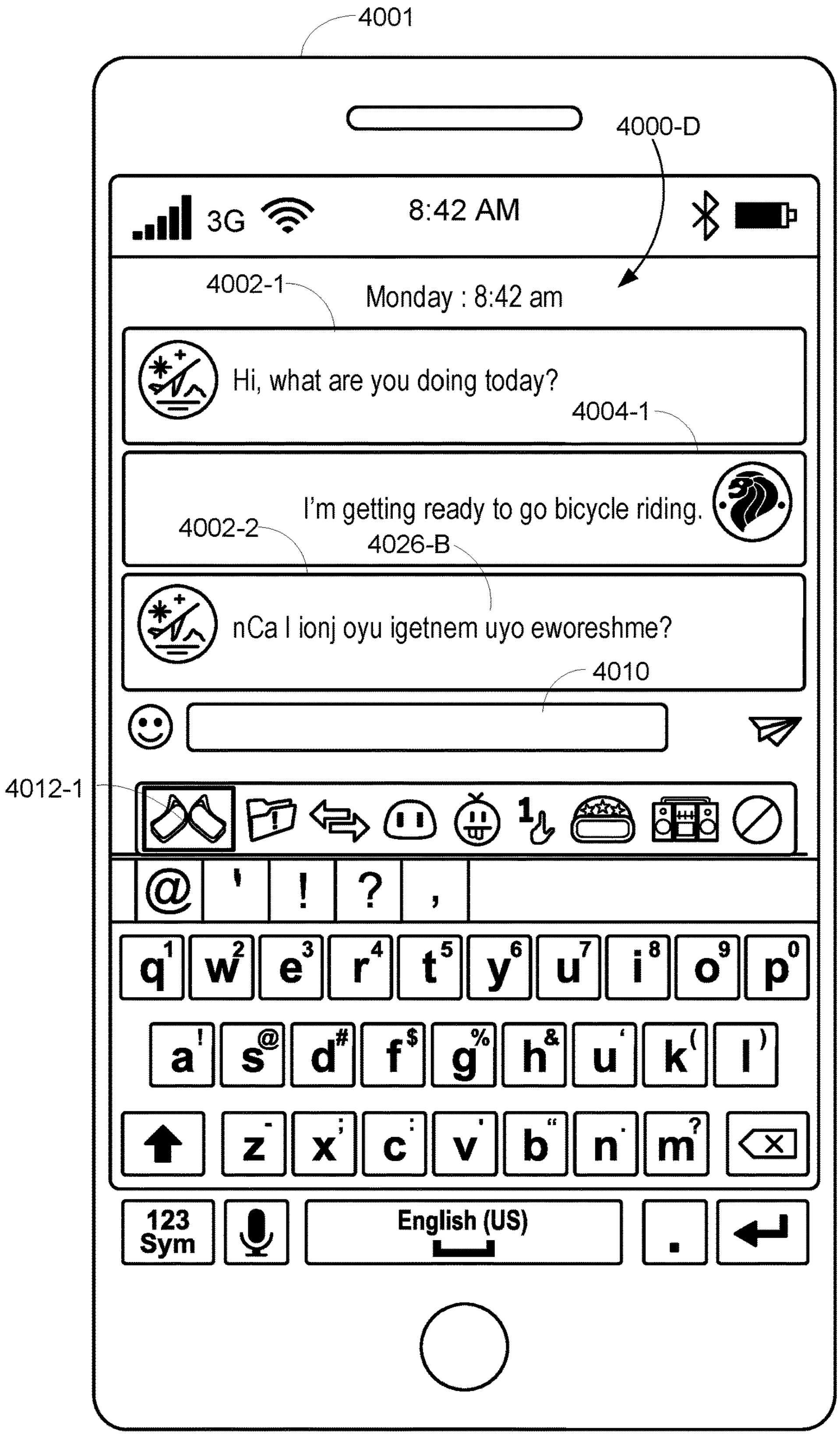
Figure 4E:
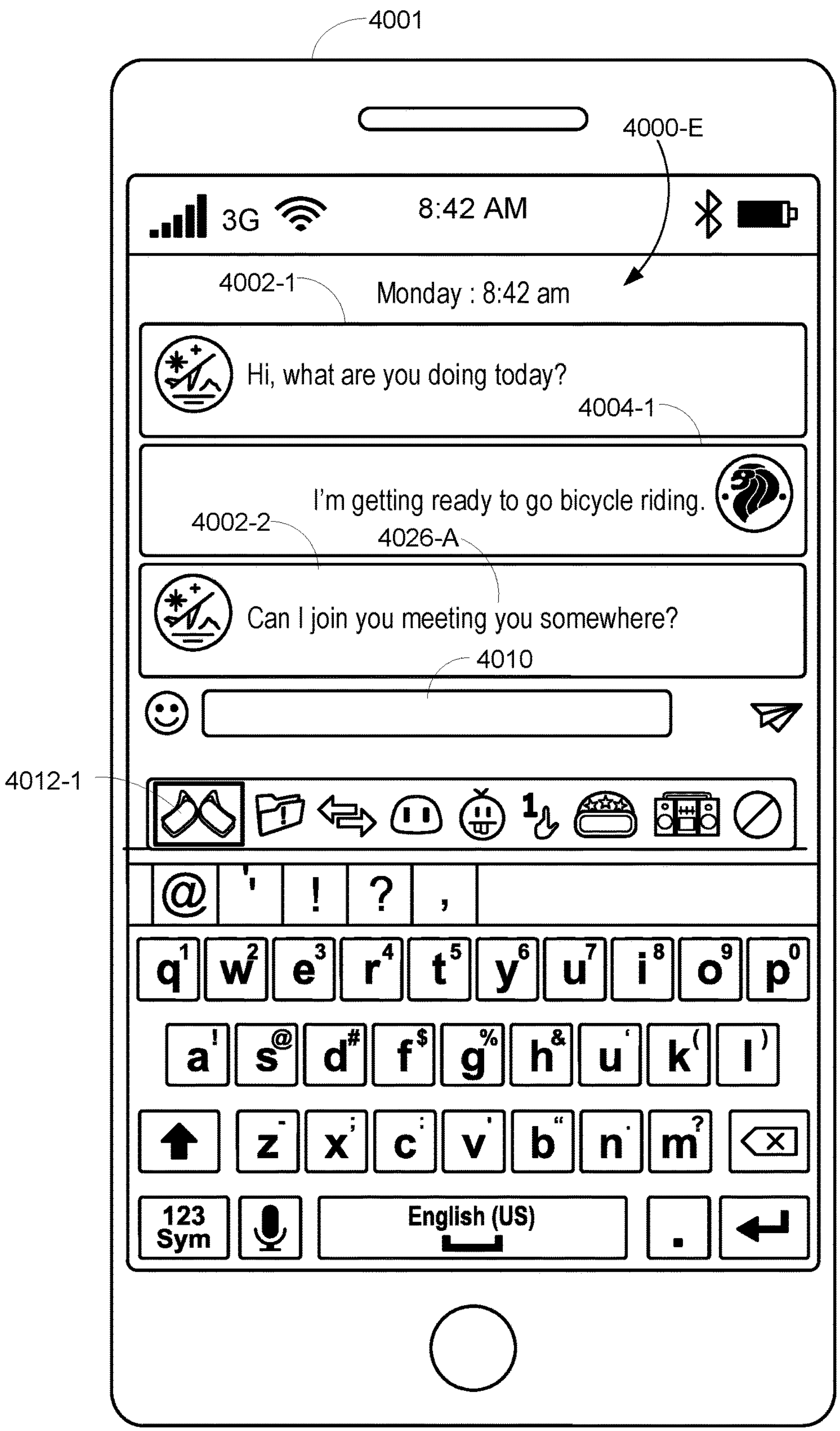
Figure 4F:
Figure 4G:
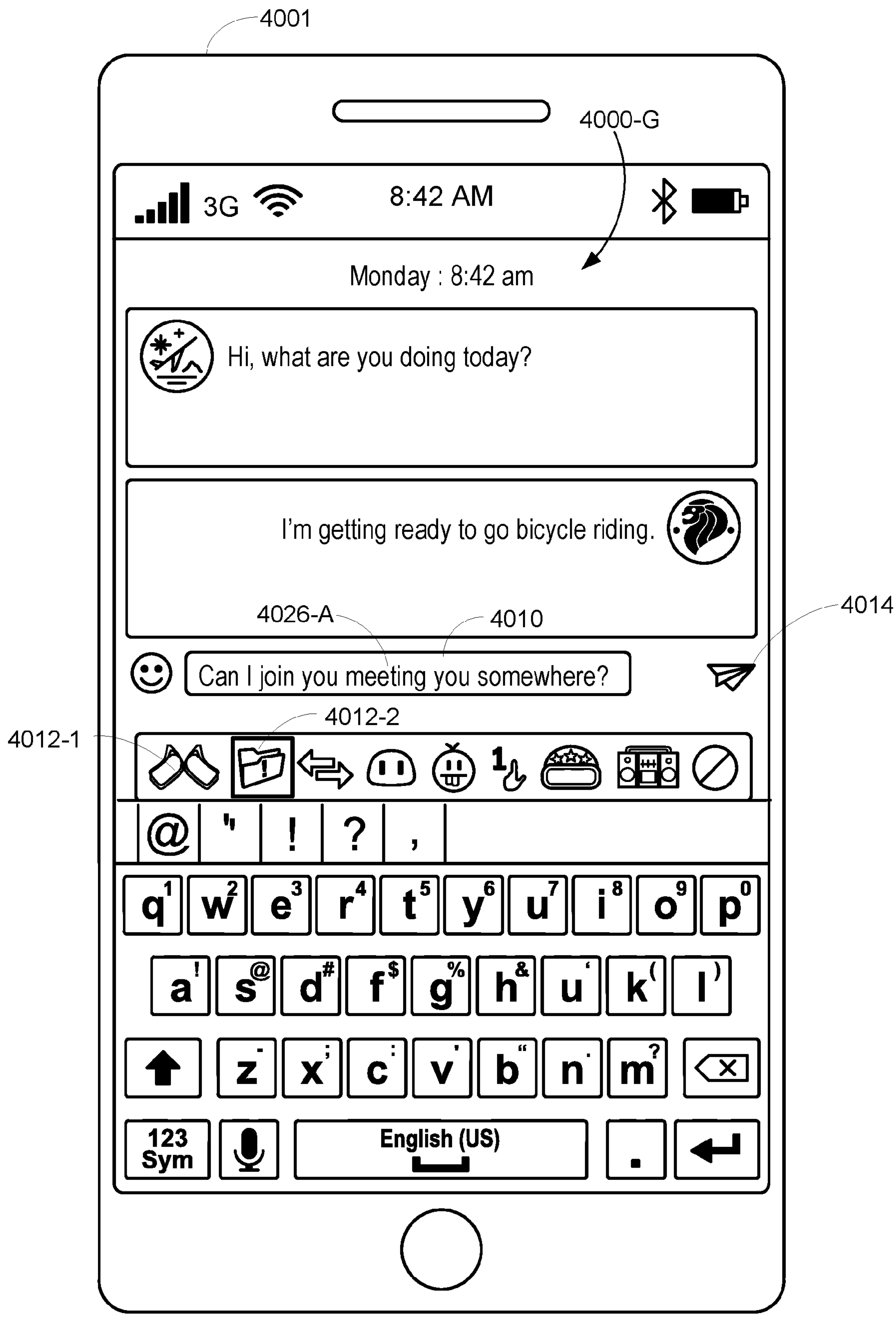
Figure 4H:
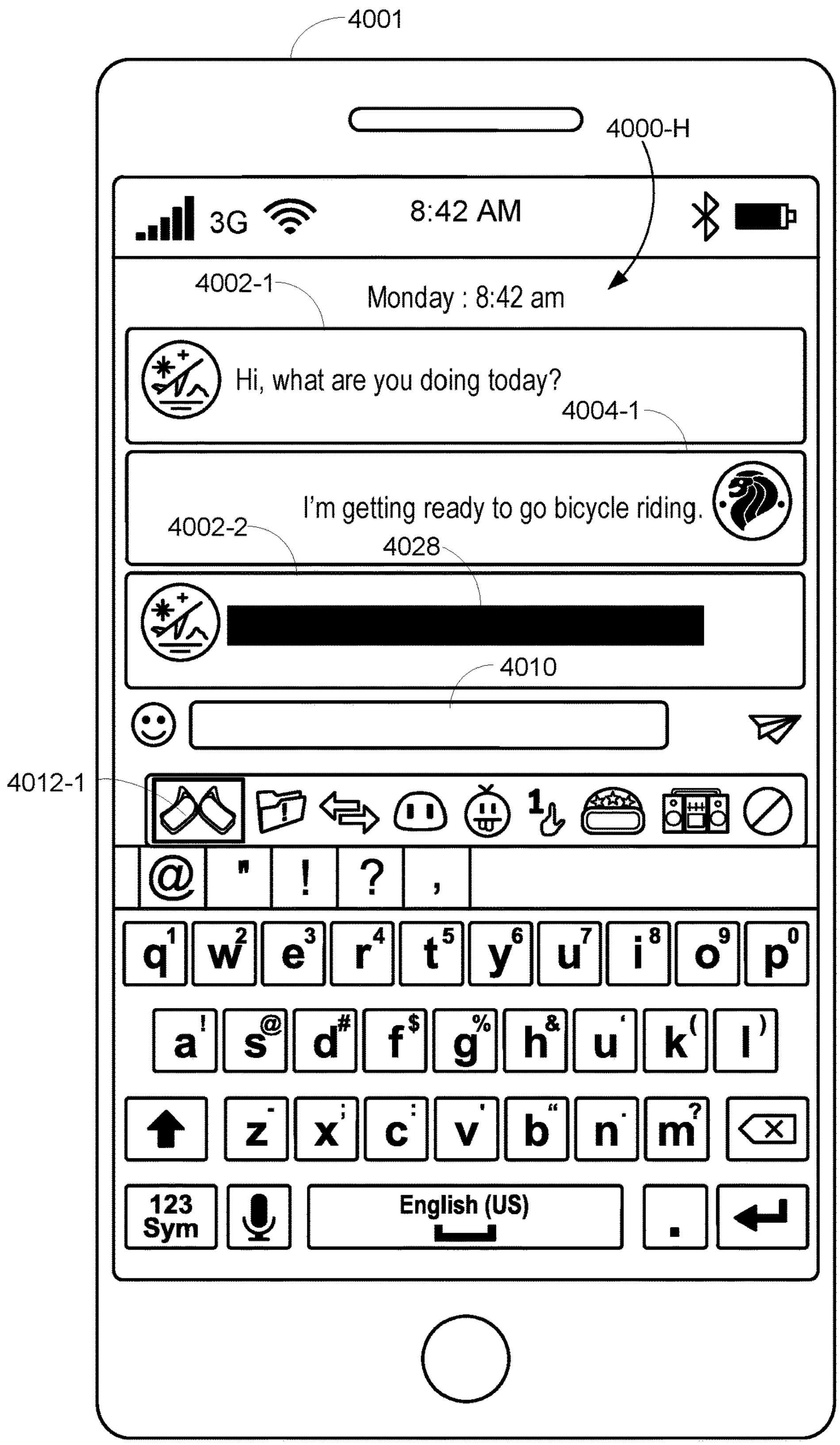
Figure 4I:
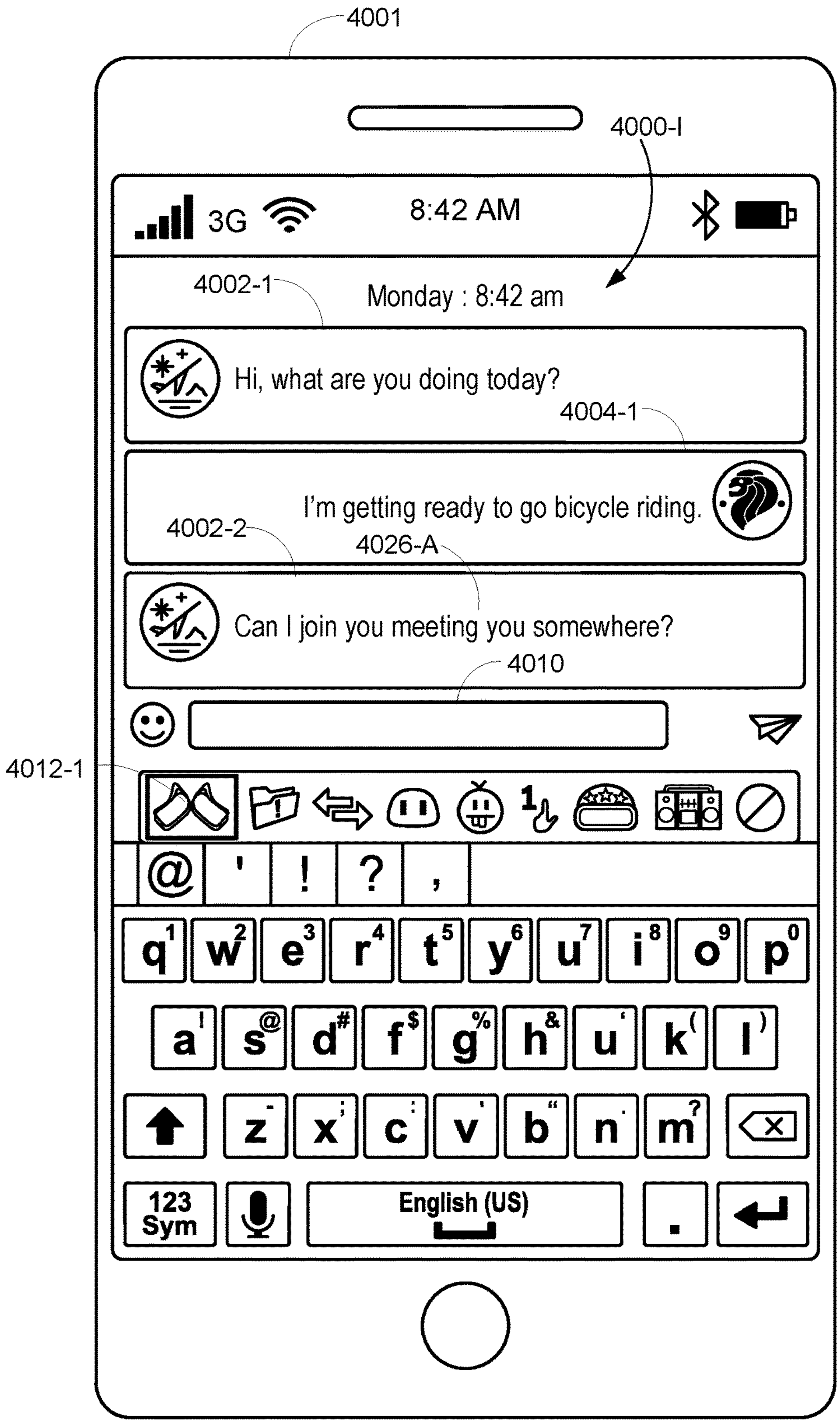
Figure 4J:
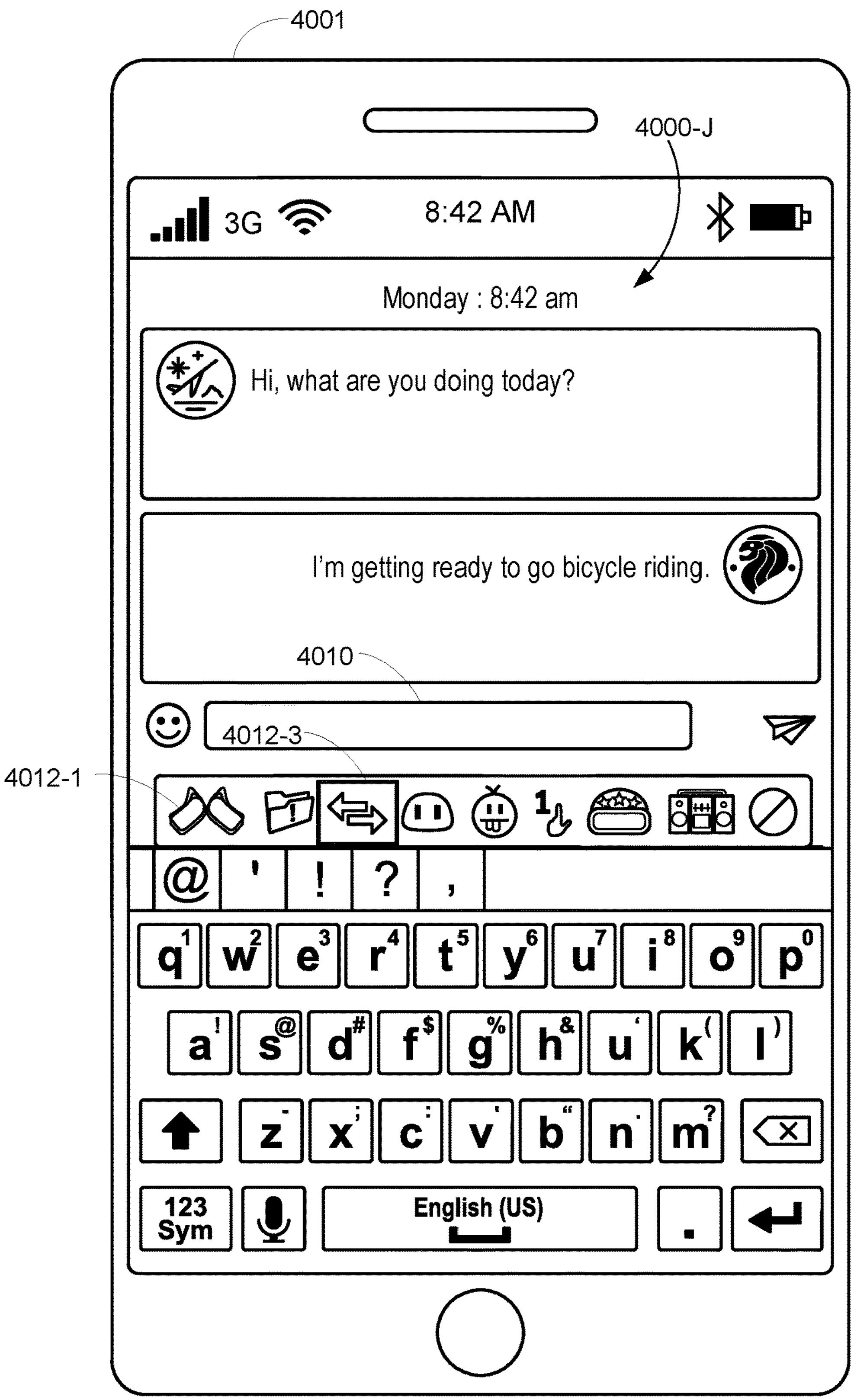
Figure 4K:
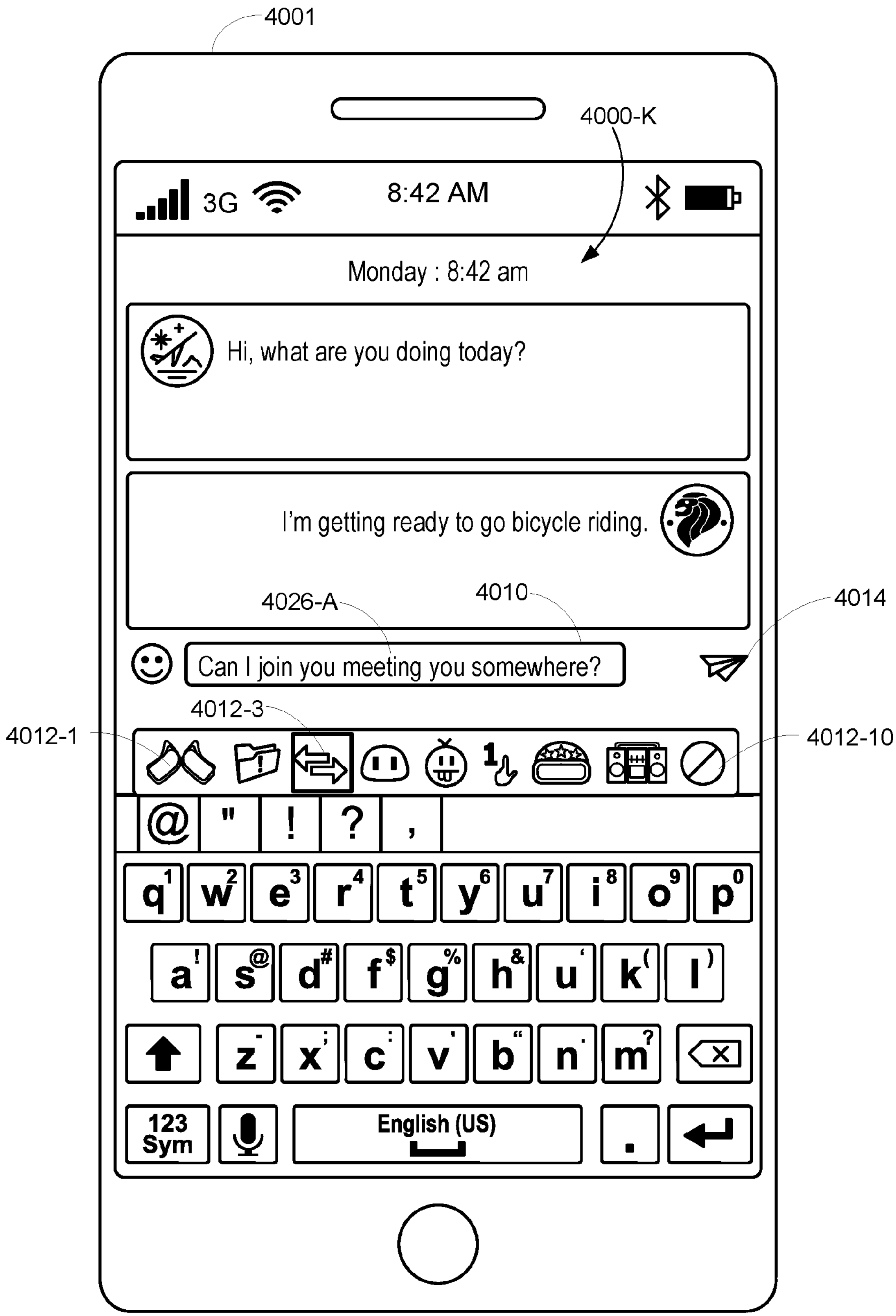
Figure 4L:
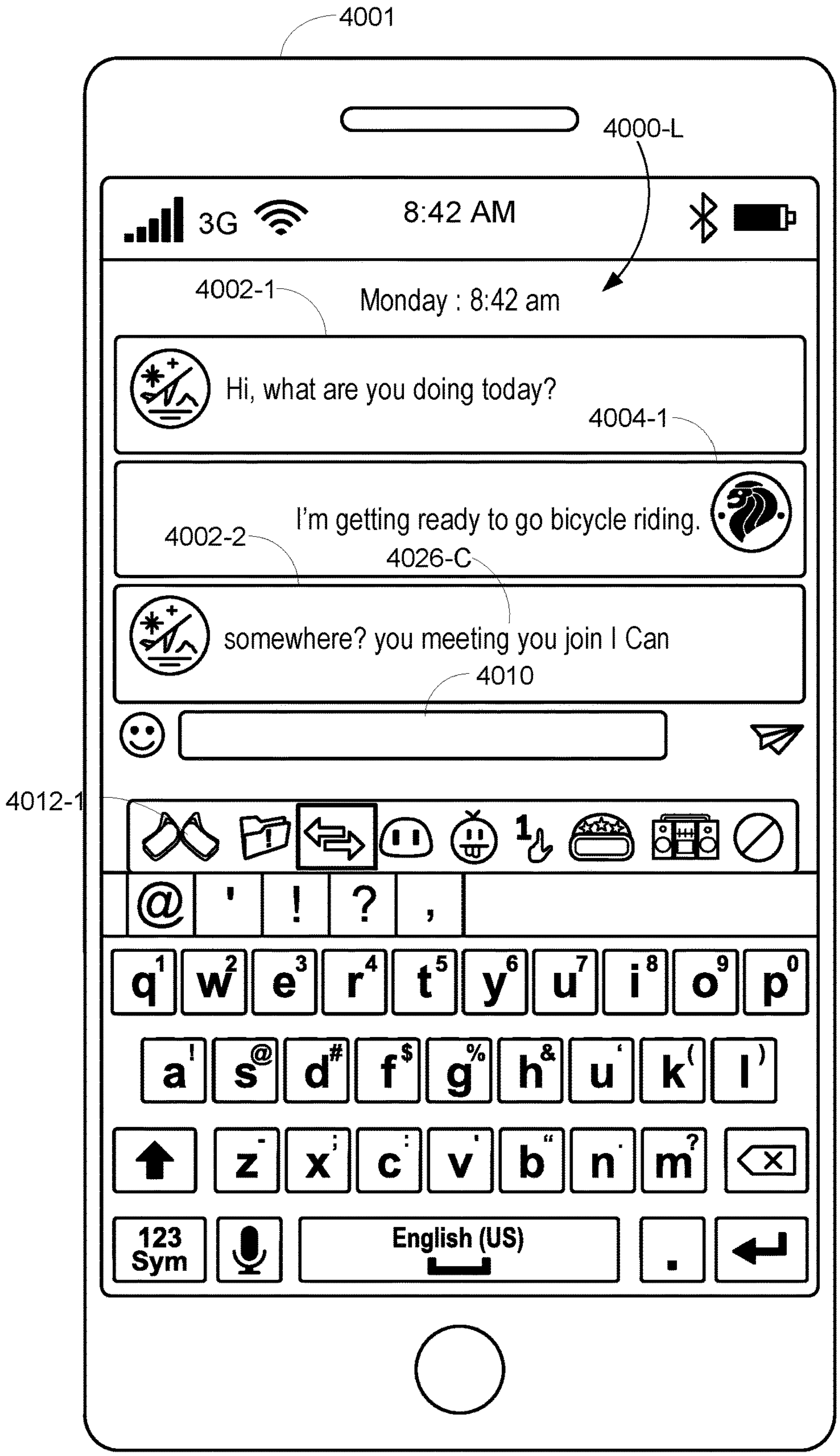
Figure 4M:
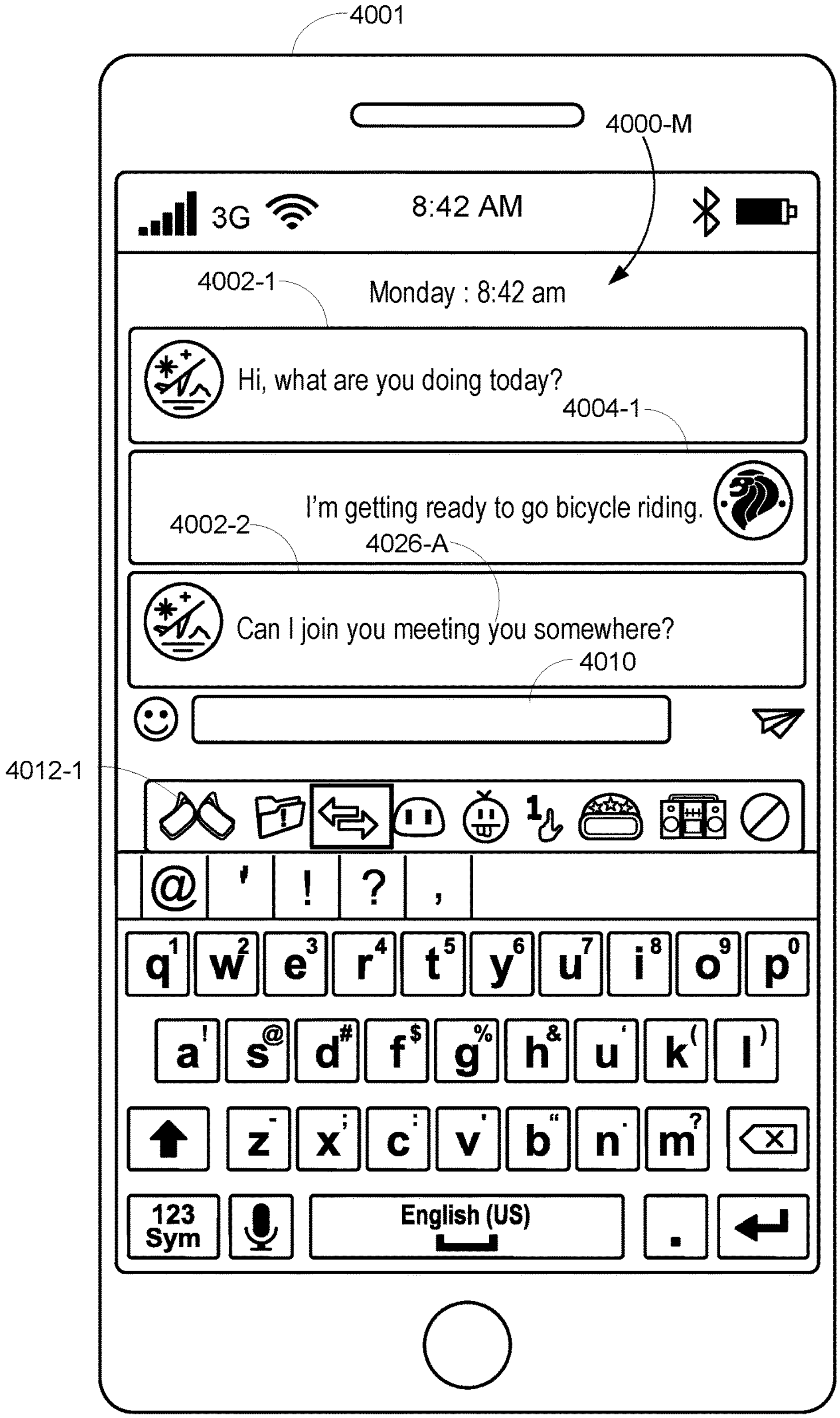
Figure 4N:
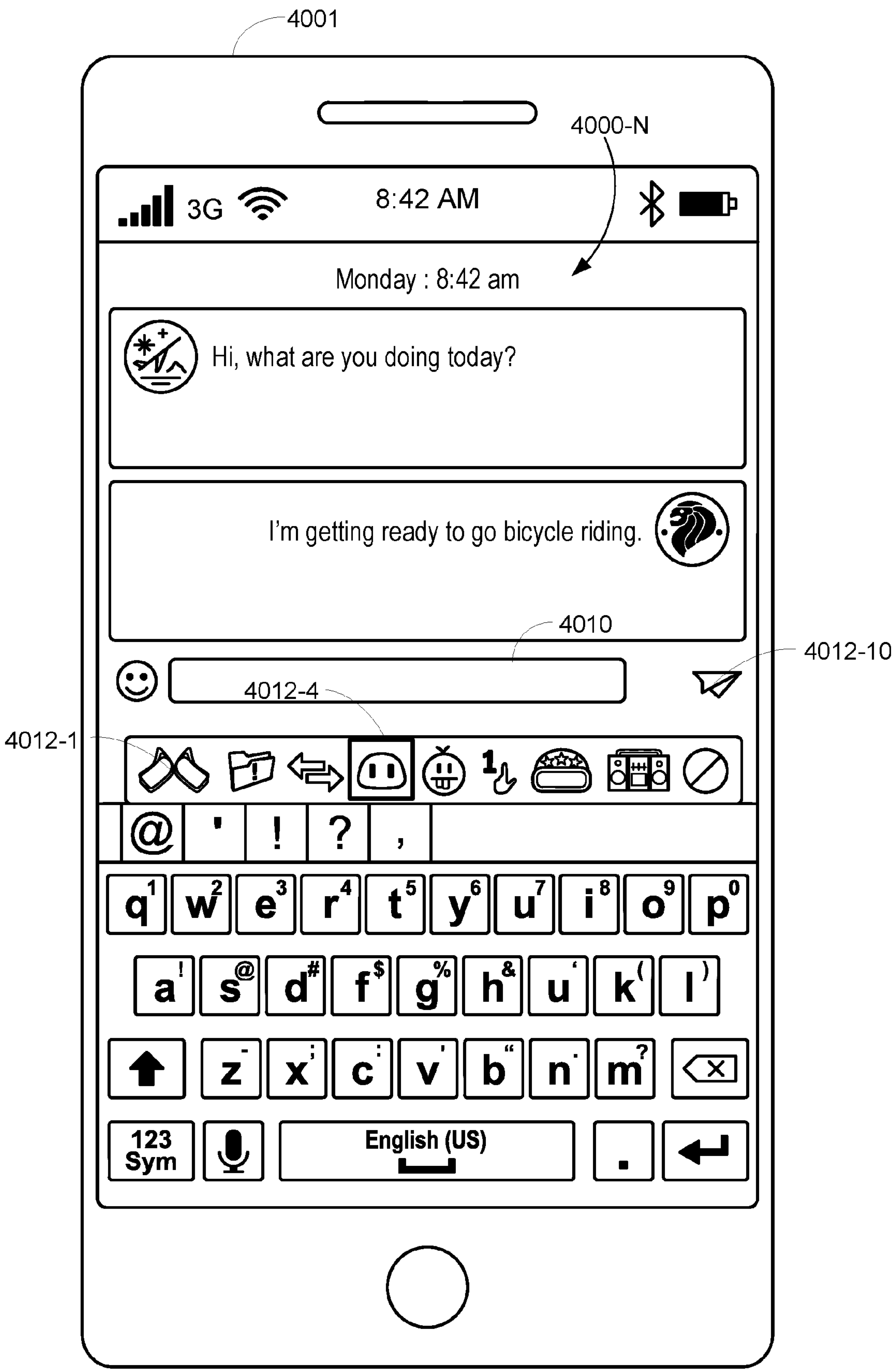
Figure 4O:
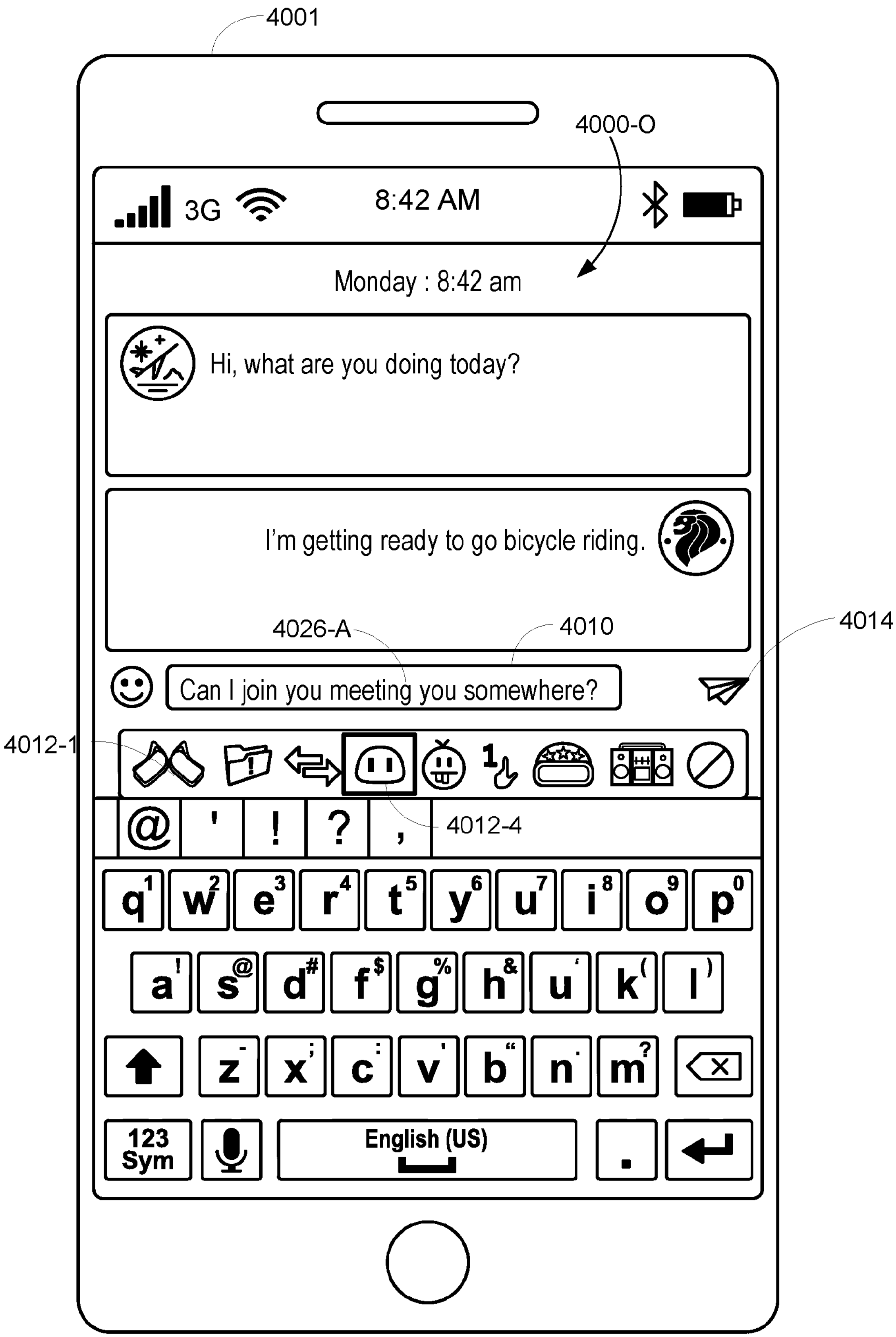
Figure 4P:
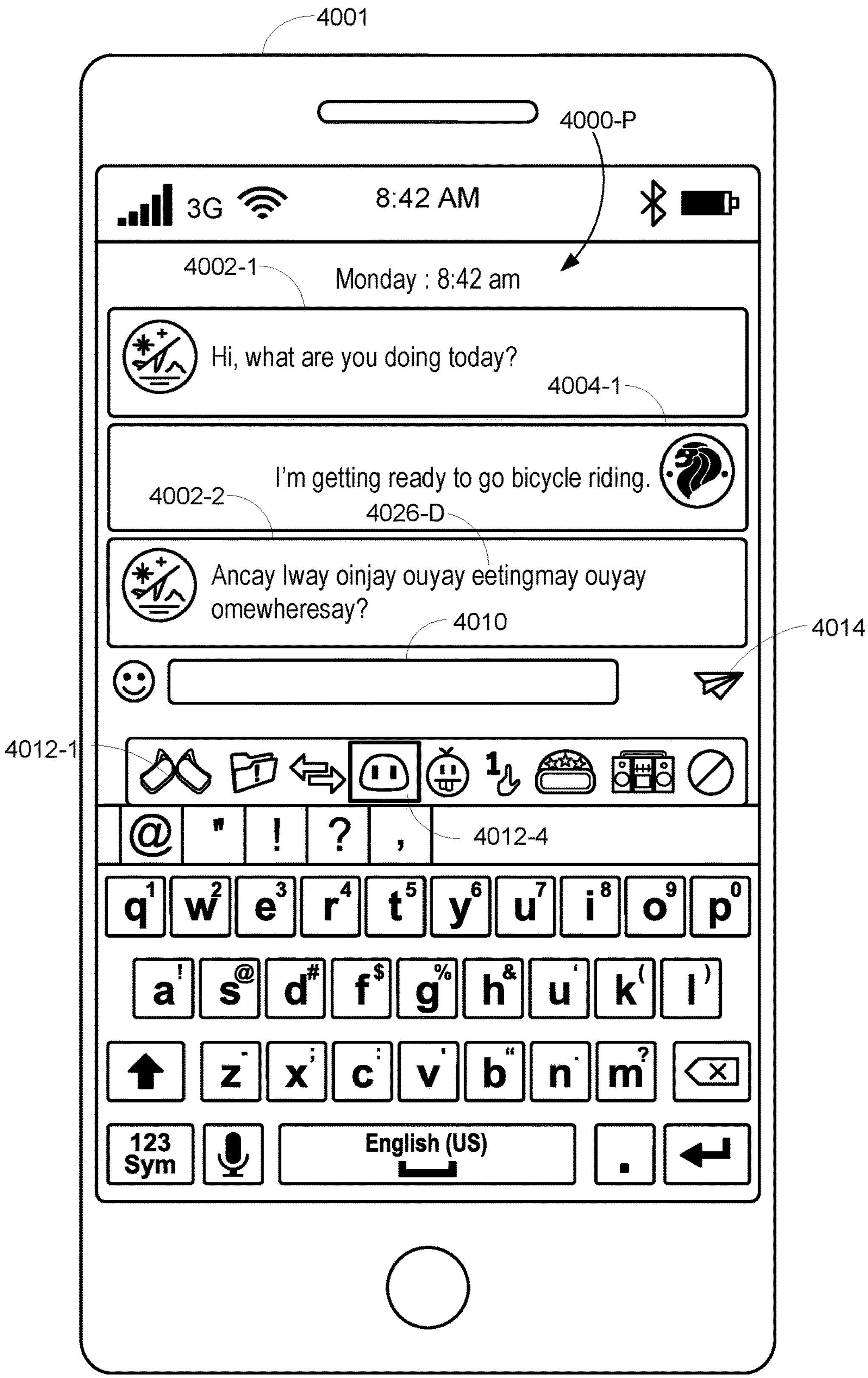
Figure 4Q:
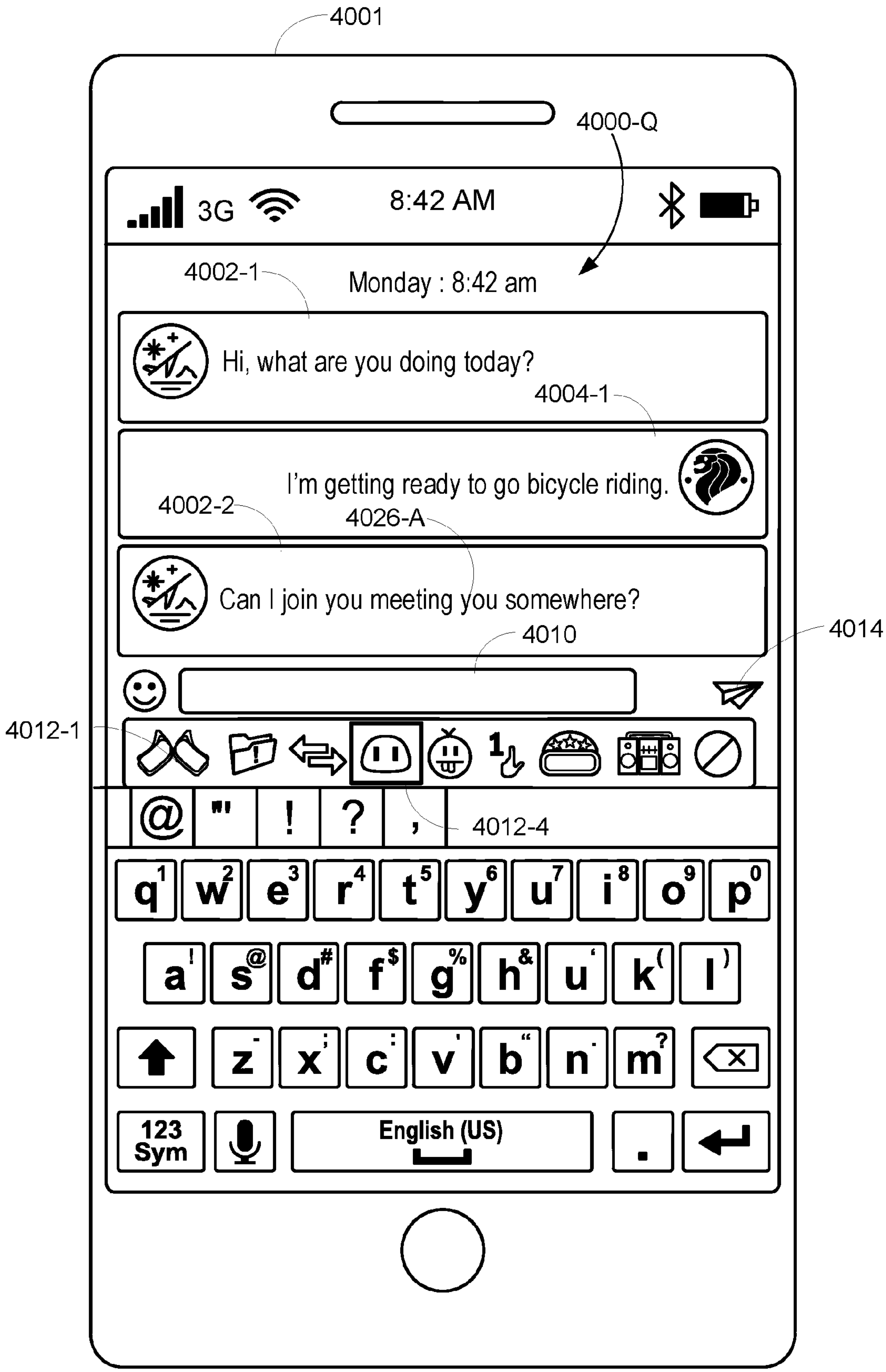
Figure 4R:
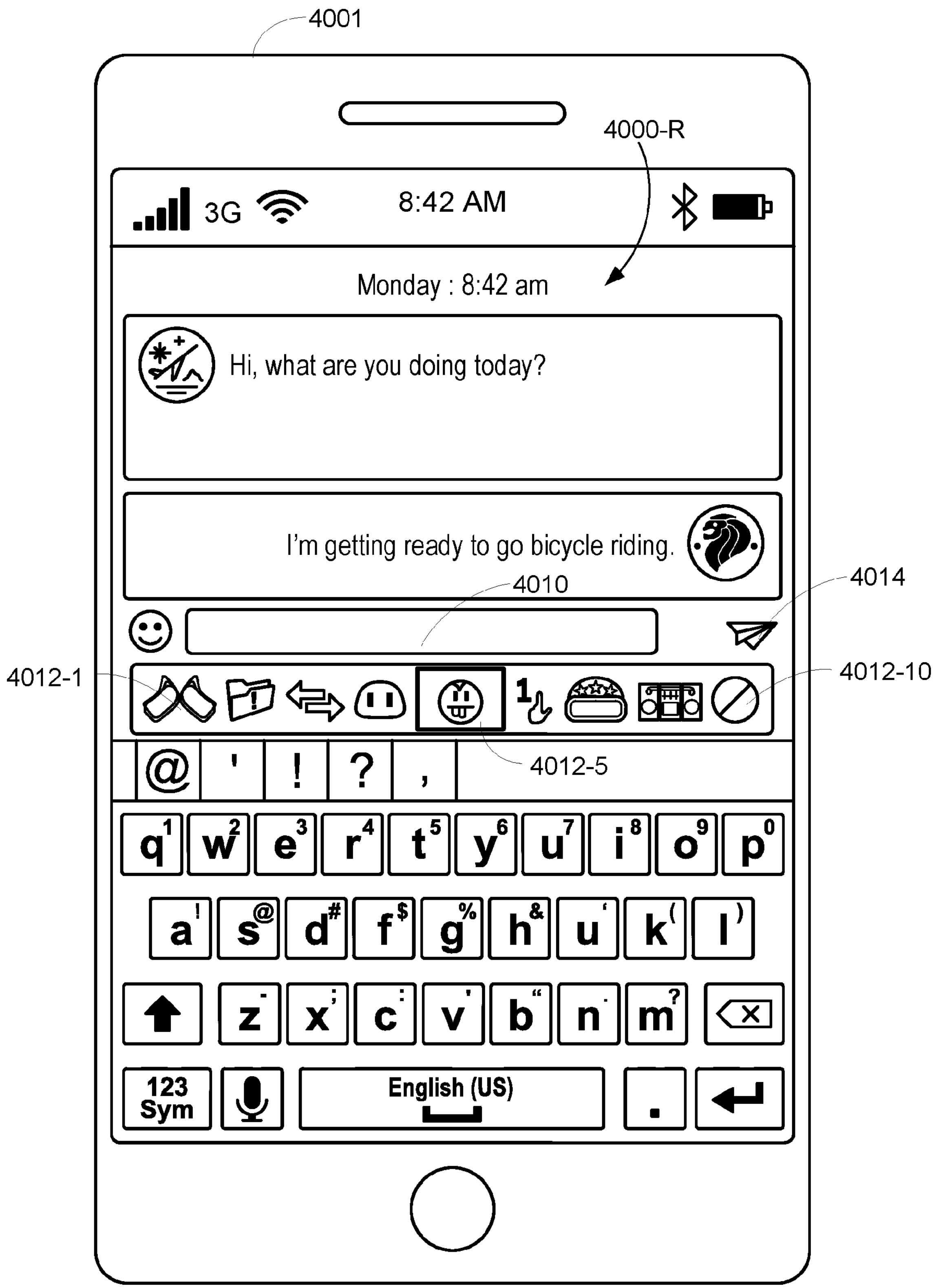
Figure 4S:
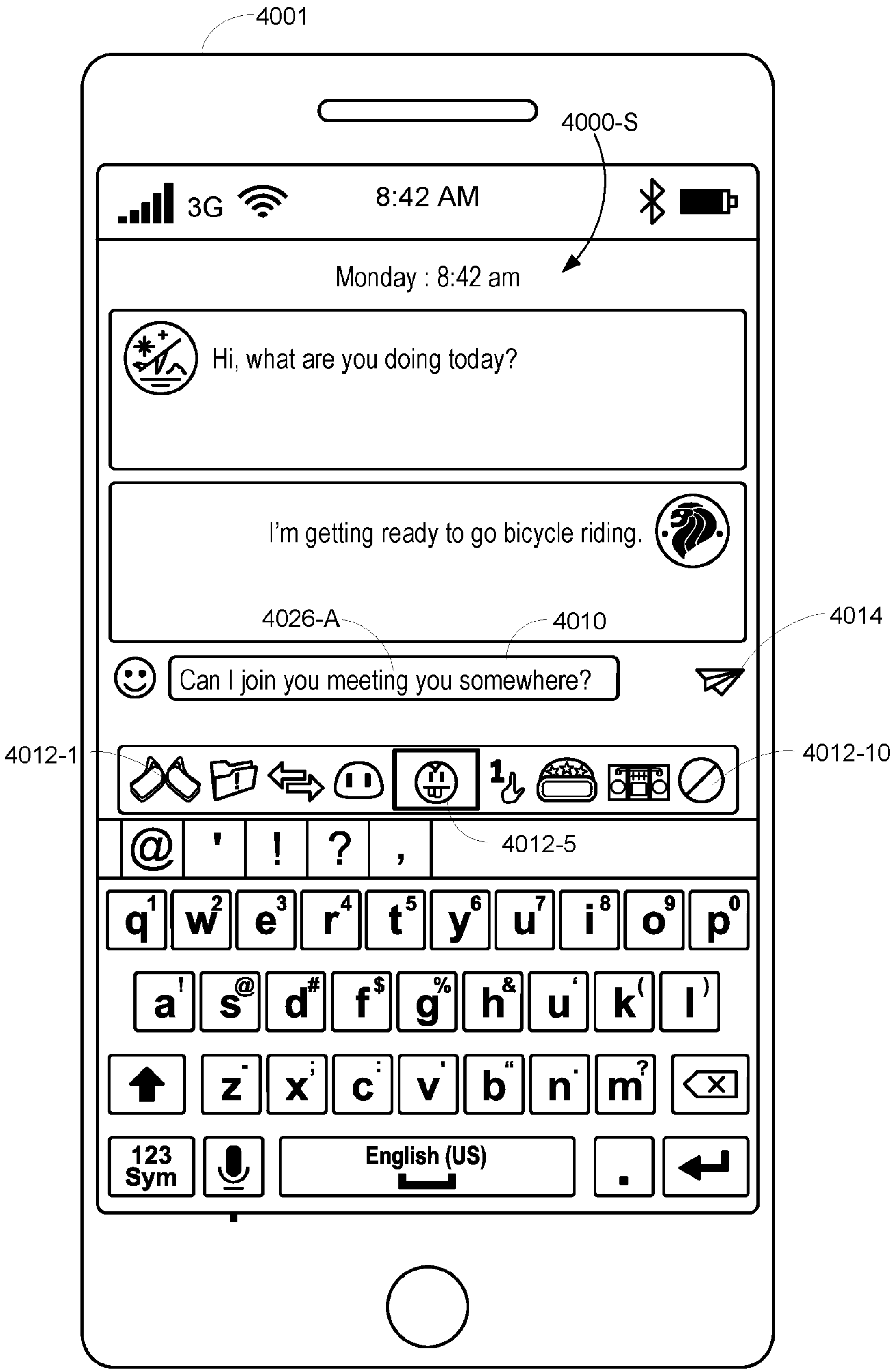
Figure 4T:
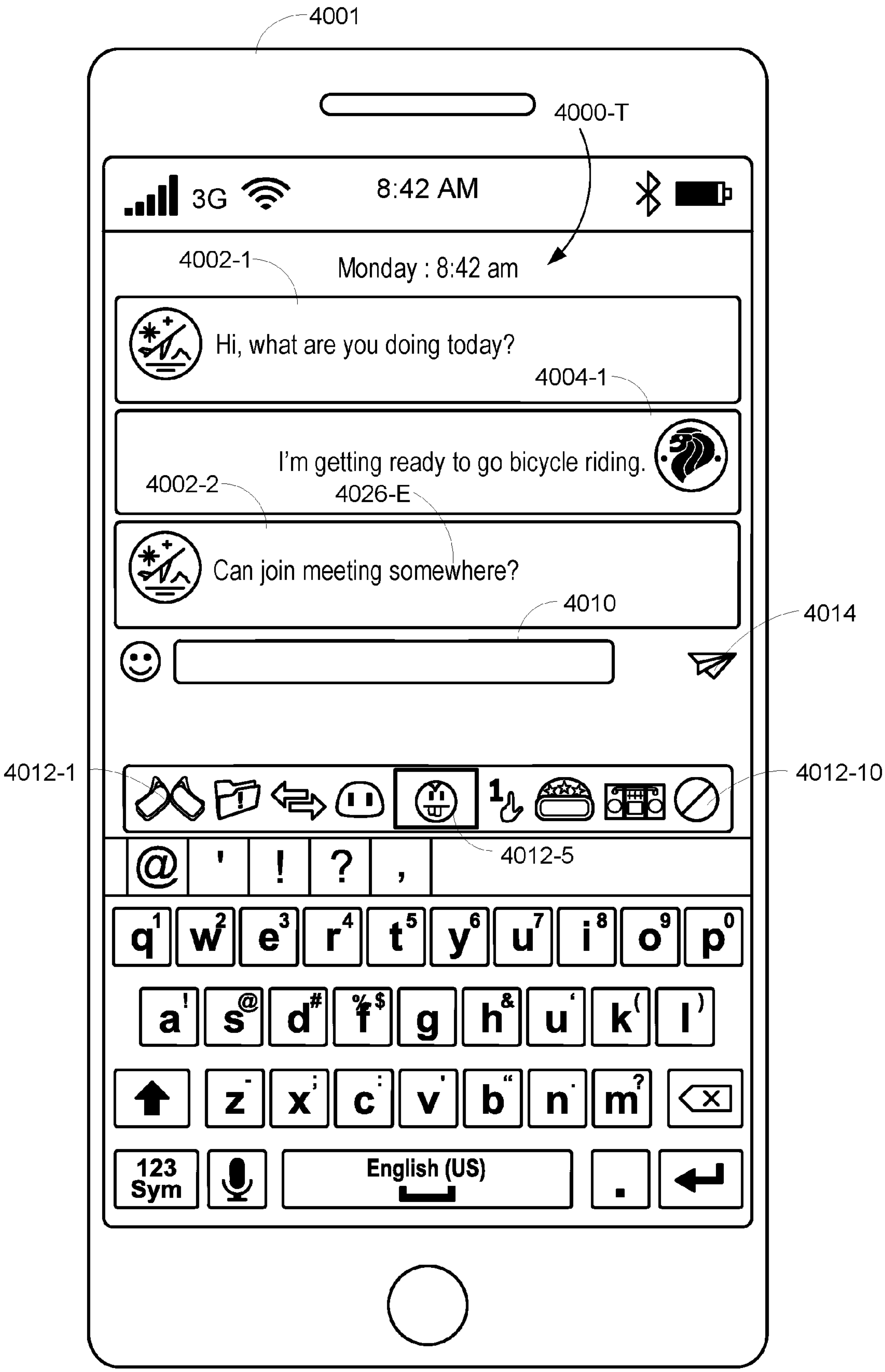

FIGS. 4A-4TT illustrate example user interfaces, including original multi-word messages with message effects applied, in accordance with some implementations. The user interfaces shown in FIGS. 4A-4TT are example user interfaces for a messaging module 110 in a client device 102. For sake of convenience and as an example of the described implementations, the user interfaces are described below as user interfaces for a messaging application (e.g., messaging module 112) on a client device 4001 (e.g., client device 102-1) that includes a touch-sensitive display (e.g., a smartphone). The messaging application is associated with a messaging service operated by the server system 106. The user interfaces are displayed on the touch-sensitive display of the client device 4001. It should be appreciated that the user interfaces, operations, and interactions described below are applicable to other types of client devices and input devices (e.g., a laptop computer with keyboard and touch pad, a desktop computer with a mouse and keyboard, a tablet device with a touch screen).

FIG. 4A illustrates a messaging user interface 4000-A for a messaging conversation between a user of the device 4001 (e.g. client device 102-1) (hereinafter "User A" for convenience) and a user of another client device (e.g., client device 102-2) (hereinafter "User B" for convenience). The messaging user interface 4000-A includes one or more original multi-word messages 4002 composed by User A and sent from the device 4001, and one or more original multi-word messages 4004 composed by User B and sent from a client device associated with User B. In some implementations, each respective original multi-word message 4002 and 4004 is displayed in respective user interface objects (e.g., message balloons). For example, in user interface 4000-A, original multi-word message 4002-1 (or more particularly, the text 4003 of message 4002-1) is displayed in one message balloon, and original multi-word message 4004-1 (or more particularly, the text 4005 of message 4004-1) is displayed in another message balloon. In the description below, for convenience, the term "message" may refer to a message or to its corresponding message balloon. In some implementations, within a message balloon 4002, an avatar or profile picture 4016 for User A is displayed. In some implementations, within a message balloon 4004, an avatar or profile picture 4018 for User B is displayed.

The user interface 4000-A also includes a graphical input stream (e.g., virtual keyboard) 4006 that includes a plurality of keys including a first subset of keys 4040 that collectively provide a character set source. Each respective key in the first subset of keys corresponds to a key in the character set (e.g., ASCII character set). Some examples of character sets are ASCII, HANZI, Guojia Biaozhun, GB2312 character set, GBK/1, GBK/2, GBK/3, GBK/4, GBK/5, ISO-8859-1, ISO-8859-2, ISO-8859-3, ISO-8859-4, ISO-8859-5, ISO-8859-6, ISO-8859-7, ISO-8859-8, ISO-8859-9, and ISO-8859-10. The graphical input stream further includes and a second subset of keys 4012-1, 4012-2, etc. that collectively provide a message effect source. Each respective key in the second subset of keys represents a unique message effect in a plurality of message effects. For instance, key 4012-1 represents a first message effect and key 4012-2 represents a second message effect. The user interface 4000-A also includes an emoji icon 4008, a message area 4010, a send icon 4014, and a time 4020 of the start of the most recent message exchange between User A and User B. First user input from the character set source (by User A) is displayed in message area 4010 by activating (e.g., with tap gestures, tap and hold gesture, etc.) various keys of the graphical input stream 4006. User A can also toggle between the graphical input stream 4006 and an emoji input interface (e.g., an emoji keyboard, an emoji selection interface) by activating the emoji icon 4008. In some embodiments, the emojis and the character set source are displayed concurrently. When User A is ready to send a message, User A activates the send icon 4014. Whatever text and emoji is input into message area 4010 is sent as a message to the server system 106, which sends the message to the device of User B.

FIG. 4B illustrates another messaging user interface 4000-B in accordance with the present application which provides another example of the message effect source having a subset of keys that 4012, wherein each respective key 4012 in the second subset of keys represents a unique message effect in a plurality of message effects. In some implementations, the message effect source is scrollable, to reveal message effect keys 4012 that may not have been in view due to the number of message effects keys 4012 and the size of the message effect source 4022. User A selects one of the keys 4012 (e.g., by tapping on the key) to select a message effect to be applied to entire multi-word message that is displayed in message area 4010, or selects key 4012-10 to cancel any previously selected message effect. For example, in FIG. 4B, "character jumble" key 4012-1 is selected. In response to User A selecting the "character jumble" key 4012-1, the message effects key 4012-1 is highlighted to indicate that the "character jumble" effect is active for the message area 4010.

FIG. 4C illustrates user interface 4000-C, which shows "character jumble" key 4012-1 highlighted, indicating that the "character jumble" effect is active. FIG. 4C also shows text 4026-A input by User A into message area 4010. With the "character jumble" effect active and original multi-word message 4026-A "Can I join you meeting you somewhere?" input in the message area 4010, User A activates the send icon 4014 to send the text 4026-A as a message 4002-2, with the "character jumble" effect applied, to the server system 106, which sends the message to User B's device.

FIG. 4D illustrates user interface 4000-D, after the message 4002-2 is sent. At User A's device 4001, the sent message 4002-2 is displayed in another balloon. The text 4026 is displayed in the message 4002-2 in accordance with the "character jumble" effect, and thus is displayed as transformed representation 4026-B, in which, within each multi-character word (or more generally, multi-character sequences separated by spaces) of the original multi-word message 4026-A, the characters are rearranged into a different order. For example, for the first word "Can" in the original multi-word message 4026-A, the characters are rearranged into "nCa" in the transformed representation 4026-B. For the last word "somewhere" in the original multi-word message 4026-A, the characters are rearranged into "ewореshme" in the transformed representation 4026-B. In some implementations, the rearrangement is random or in accordance with predefined rules (e.g., the first character swaps places with fourth character and the second character swaps places with the fifth character and so on). In some implementations, punctuation characters are left as they are, at their original position in the text 4026. Single character words, such as "I" or "a," are left as they are.

In some implementations, the character rearranging within the message text 4026 is word-by-word (as shown in FIG. 4D). In some other implementations, the character rearranging is across the whole text 4026 of the message.

While text 4026-B is displayed in the message 4002-2, User A may make an input with respect to the message 4002-2 (e.g., make a tap gesture on the message 4002-2). In response to the tap on the message 4002-2, the original multi-word message 4026-A is transiently displayed in the message 4002-2 for a period of time (e.g., for a minute or less, 30 seconds or less, or 5 seconds or less), as shown in FIG. 4E. FIG. 4E illustrates user interface 4000-E, which includes original multi-word message 4026-A displayed in the message area 4002-2 after User A has made the input with respect to the message 4002-2. In some implementations, the display of the multi-word message 4026-A is temporary. For example, the multi-word message 4026-A is displayed for five seconds after User A's input with respect to the message 4002-2, after which text 4026-B is re-displayed in message 4002-2.

Returning to, and continuing from FIG. 4A, FIG. 4F illustrates messaging user interface 4000-F in which User A selects the "top secret" key 4012-2 (e.g., by tapping on the key) in the message effect source. In response to User A selecting the "top secret" key 4012-2, the message effects key 4012 is highlighted and is active for the message area 4010 as illustrated in FIG. 4G. FIG. 4G also shows text 4026-A input by User A into message area 4010. With the "top secret" effect active and multi-word message 4026-A "Can I join you meeting you somewhere?" input in the message area 4010, User A activates the send icon 4014 to send the text 4026-A as a message 4002-2, with the "top secret" effect applied, as a message to the server system 106, which sends the message to User B's device. In some embodiments, when the user presses the "top secret" key 4012-2, the "top secret" effect is applied to the original multi-word message thereby forming a transformed representation of the multi-word message that is displayed is displayed prior to sending out the message.

FIG. 4H illustrates user interface 4000-H, after the message 4002-2 is sent. At User A's device 4001, the sent message 4002-2 is displayed in another balloon. The text 4026 in the message 4002-2 is, in accordance with the "top secret" effect, obscured by a censoring graphic 4028. Two exemplary types of censoring graphics are censoring mosaics and solid bars (e.g., black bars as in classified documents). In some implementations, the censoring graphic 4028 obscures the entirety of the text 4026. In some other implementations, the censoring graphic 4028 obscures a portion, or portions, of the text 4026-A (e.g., the first three words, every other word). In some other implementations, the censoring graphic 4028 is semi-transparent.

While the text 4026 is obscured by the censoring graphic 4028, User A may make an input with respect to the message 4002-2 (e.g., make a tap gesture on the message 4002-2). In response to the tap on the message 4002-2, the original multi-word message 4026-A is displayed in the message 4002-2, as shown in FIG. 4I; the censoring graphic 4028 is removed. FIG. 4I illustrates user interface 4000-I, which includes the original multi-word message 4026-A displayed in the message 4002-2 after User A has made the input with respect to the message 4002-2. In some implementations, the removal of the censoring graphic 4028 is temporary. For example, the censoring graphic 4028 is removed for five seconds after User A's input with respect to the message 4002-2, after which the transformed representation of the multi-word message is re-displayed.

Returning to, and continuing from FIG. 4A, FIG. 4J illustrates messaging user interface 4000-J, which includes the message effect source of message effects keys 4012 displayed after User A activated the message effects key 4012-3. User A selects the "reverse" key 4012-3 (e.g., by tapping on the icon). In response to User A selecting the "reverse" key 4012-3, the message effects key 4012-3 is highlighted and active for the message area 4010 meaning that it will be applied to any original multi-word message in the message area in accordance with the "reverse" algorithm to form a transformed representation of the original multi-word message.

FIG. 4K illustrates user interface 4000-K, which shows "reverse" key 4012-3 highlighted. User A has entered an original multi-word message 4026-A into the message area 4010. With the "reverse" effect selected, the original multi-word message 4026-A "Can I join you meeting you somewhere?" input in the message area 4010 is transformed to a transformed representation of the original multi-word message 4026-A (e.g., "somewhere? you meeting you join I Can" (not shown in FIG. 4K)). If the user does not like this transformation, the user can undo the transformation by selecting key 4012-10 or simply select a different key 4012 to enact a different message effect directly on the original multi-word message. Assuming User A is satisfied with message effect 4012-3, User A activates the send icon 4014 to send the text 4026-A as a message 4002-2, with the "reverse" effect applied, as a message to the server system 106, which sends the message to User B's device.

FIG. 4L illustrates user interface 4000-L, after the message 4002-2 is sent with message effect 4012-3 applied. At User A's device 4001, the sent message 4002-2 is displayed in another balloon. The text 4026 is displayed as the message 4002-2 in accordance with the "reverse" effect, and thus is displayed as transformed representation 4026-C, in which the words of the multi-word message 4026-A are presented in reverse order. For example, in FIG. 4L, the words in multi-word message 4026-A "Can I join you meeting you somewhere?" are re-ordered into the transformed representation "somewhere? you meeting you join I Can" in text 4026-C. More generally, the words in the multi-word message 4026-A may be reordered randomly or in accordance with one or more predefined rules (e.g., reverse order as described above, alternating words switch places). In some implementations, punctuation characters are left at their relative positions, following the word they were respectively following in the original 4026-A (e.g., the question mark follows the word "somewhere" in text 4026-C).

While text 4026-C is displayed in the message 4002-2, User A may make an input with respect to the message 4002-2 (e.g., make a tap gesture on the message 4002-2). In response to the tap on the message 4002-2, the multi-word message 4026-A is displayed in the message 4002-2, as shown in FIG. 4M. FIG. 4M illustrates user interface 4000-M, which includes original multi-word message 4026-A displayed in the message 4002-2 after User A has made the input with respect to the message 4002-2. In some implementations, the display of the original multi-word message 4026-A is temporary. For example, the original multi-word message 4026-A is displayed for five seconds after User A's input with respect to the message 4002-2, after which transformed representation 4026-C is re-displayed in message box 4002-2.

Returning to, and continuing from FIG. 4A, FIG. 4N illustrates messaging user interface 4000-N, which includes the message effects keys 4012 displayed after User A activated the message effects key 4012-4. User A selects the "pig latin" key 4012-4 (e.g., by tapping on the icon). In response to User A selecting the "pig latin" key 4012-4, the message effects key 4012-4 is highlighted and active for the message area 4010 meaning that the "pig latin" text effect will be applied to any original multi-word message in the message area in accordance with the "pig latin" algorithm to form a transformed representation of the original multi-word message.

FIG. 4O illustrates user interface 4000-0, which shows "pig latin" key 4012-4 highlighted. User A has entered an original multi-word message 4026-A into the message area 4010. With the "pig latin" effect selected, the original multi-word message 4026-A "Can I join you meeting you somewhere?" input in the message area 4010, is transformed to a transformed representation of the original multi-word message. User A activates the send icon 4014 to send the original multi-word message 4026-A as a message 4002-2, with the "pig latin" text effect applied, to the server system 106, which sends the message to User B's device.

FIG. 4P illustrates user interface 4000-P, after the message 4002-2 is sent with message effect 4012-4 applied. At User A's device 4001, the sent message 4002-2 is displayed in another balloon. The text of the original multi-word message is displayed in accordance with the "pig latin" effect, and thus is displayed as transformed representation 4026-D, in which the original multi-word message is converted to its Pig Latin counterpart. In some implementations, the conversion includes, for each word in the original multi-word message, the initial consonant or consonant cluster being moved to the end of the word, and then "ay" being added. For a word that begins with a vowel sound or a silent letter, "way" is added to the word. For example, in transformed representation 4026-D, "Ancay" is the Pig Latin version of "Can" in original multi-word message, and "Iway" is the Pig Latin version of "I" in original multi-word message. In some implementations, punctuation characters are left as they are, at their original position in the transformed representation.

While transformed representation 4026-D is displayed in the message panel 4002-2, User A may make an input with respect to the message 4002-2 (e.g., make a tap gesture on the message 4002-2). In response to the tap on the message 4002-2, the original multi-word message is displayed in the message panel 4002-2, as shown in FIG. 4Q. FIG. 4Q illustrates user interface 4000-Q, which includes original multi-word message 4026-A displayed in the message 4002-2 after User A has made the input with respect to the message 4002-2. In some implementations, the display of the original multi-word message 4026-A is temporary. For example, the original multi-word message 4026-A is displayed for five seconds after User A's input with respect to the message 4002-2, after which transformed representation 4026-D is re-displayed in message box 4002-2.

Returning to, and continuing from FIG. 4A, FIG. 4R illustrates messaging user interface 4000-R, which includes the message effects keys 4012 displayed after User A activated the message effects key 4012-5. In one example, User A selects the "toddler talk" key 4012-5 (e.g., by tapping on the icon). In response to User A selecting the "toddler talk" key 4012-5, the message effects key 4012-5 is highlighted and active for the message area 4010 meaning that the text effect "toddler talk" will be applied to any original multi-word message in the message area in accordance with the "toddler talk" algorithm to form a transformed representation of the original multi-word message.

FIG. 4S illustrates user interface 4000-S, which shows "toddler talk" key 4012-5 highlighted, indicating that the "toddler talk" effect is active. FIG. 4S also shows the original multi-word message 4026-A input by User A into message area 4010. With the "toddler talk" effect active and original multi-word message 4026-A "Can I join you meeting you somewhere?" input in the message area 4010, User A activates the send icon 4014 to send the multi-word message 4026-A as a message 4002-2, with the "toddler talk" effect applied, to the server system 106, which sends the message to User B's device.

FIG. 4T illustrates user interface 4000-T, after the message 4002-2 is sent with message effect 4012-5 applied. At User A's device 4001, the sent message 4002-2 is displayed in another balloon. The text of the original multi-word message is displayed in accordance with the "toddler talk" effect, and thus is displayed as transformed representation 4026-E, in which some of the words in the original multi-word message 4026-A are removed. In some implementations, the conversion includes removal of words that are in one or more predefined categories. In some implementations, the predefined categories include articles (such as "a" and "the"), pronouns, prepositions, or a "connector words" category that includes two or more of articles, pronouns, and prepositions. Transformed representation 4026-E, with the connector words (e.g., "I," "you"), simulates the talking style of a very young child (e.g., a baby, a toddler). In some implementations, punctuation characters are left intact.

Figure 4U:
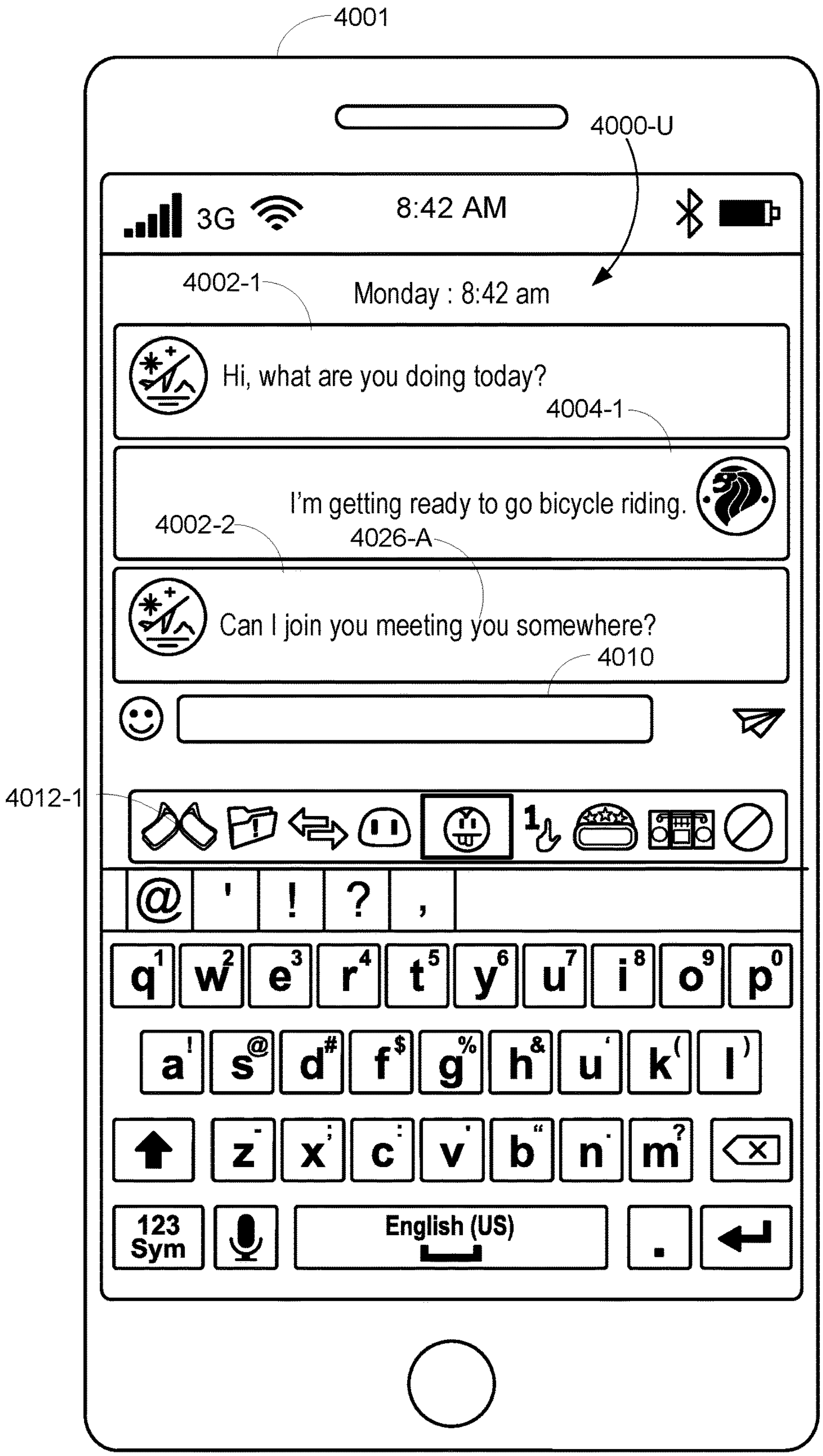

While transformed representation 4026-E is displayed in the message 4002-2, User A may make an input with respect to the message 4002-2 (e.g., make a tap gesture on the message 4002-2). In response to the tap on the message 4002-2, the original multi-word message 4026-A is displayed in the message 4002-2, as shown in FIG. 4U. FIG. 4U illustrates user interface 4000-U, which includes original multi-word message 4026-A displayed in the message 4002-2 after User A has made the input with respect to the message 4002-2. In some implementations, the display of the original multi-word message 4026-A is temporary. For example, the multi-word message 4026-A is displayed for five seconds after User A's input with respect to the message 4002-2, after which transformed representation 4026-E is re-displayed in message 4002-2.

Figure 4V:
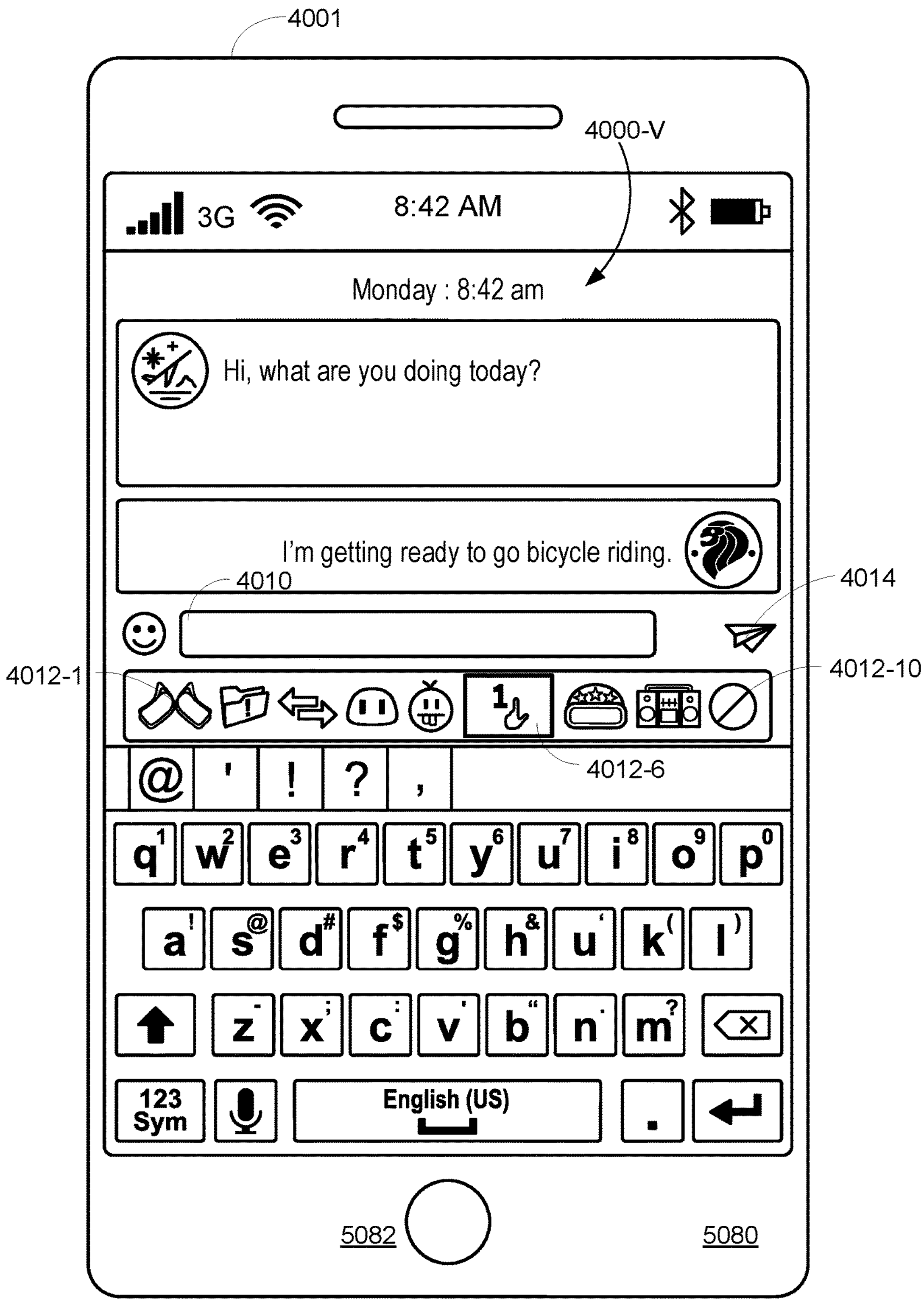

Returning to, and continuing from FIG. 4A, FIG. 4V illustrates the messaging user interface 4000-V, which includes the message effect keys 4012. In one example, User A selects the "one at a time" key 4012-6 (e.g., by tapping on the icon). In response to User A selecting the "one at a time" key 4012-6, the message effects key 4012-6 is highlighted and active for message area 4010 meaning that the text effect "one at a time" will be applied to any original multi-word message in the message area in accordance with the "one at a time" algorithm to form a transformed representation of the original multi-word message.

Figure 4W:
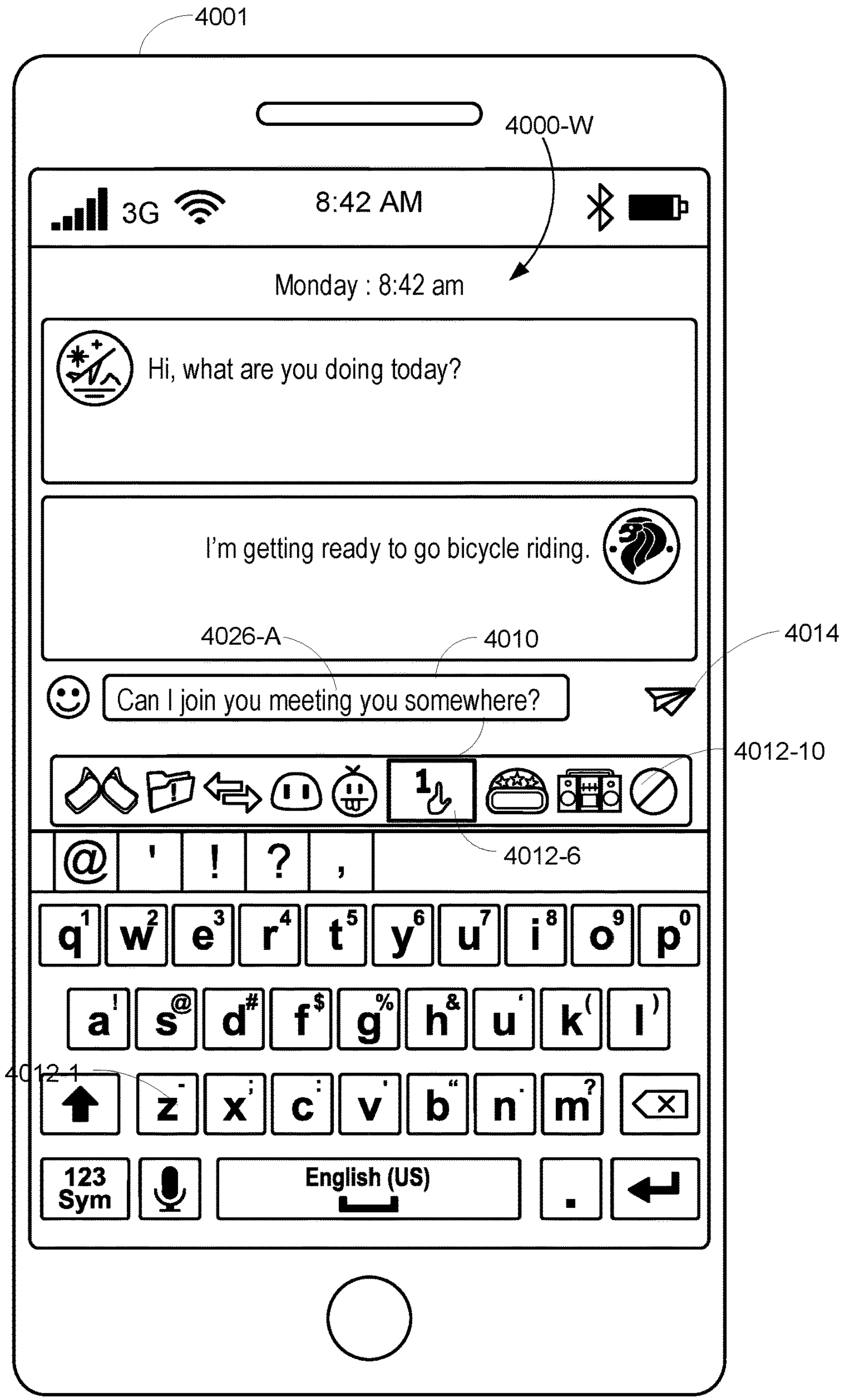

FIG. 4W illustrates user interface 4000-W, which shows the "one at a time" key 4012-6 highlighted, indicating that the "one at a time" effect is active. FIG. 4W also shows the original multi-word message 4026-A input by User A into the message area 4010. With the "one at a time" effect active and the original multi-word message 4026-A "Can I join you meeting you somewhere?" input in the message area 4010, User A activates the send icon 4014 to send the original multi-word message 4026-A as a message 4002-2, with the "one at a time" effect applied, as a message to the server system 106, which sends the message to User B's device.

Figure 4X:
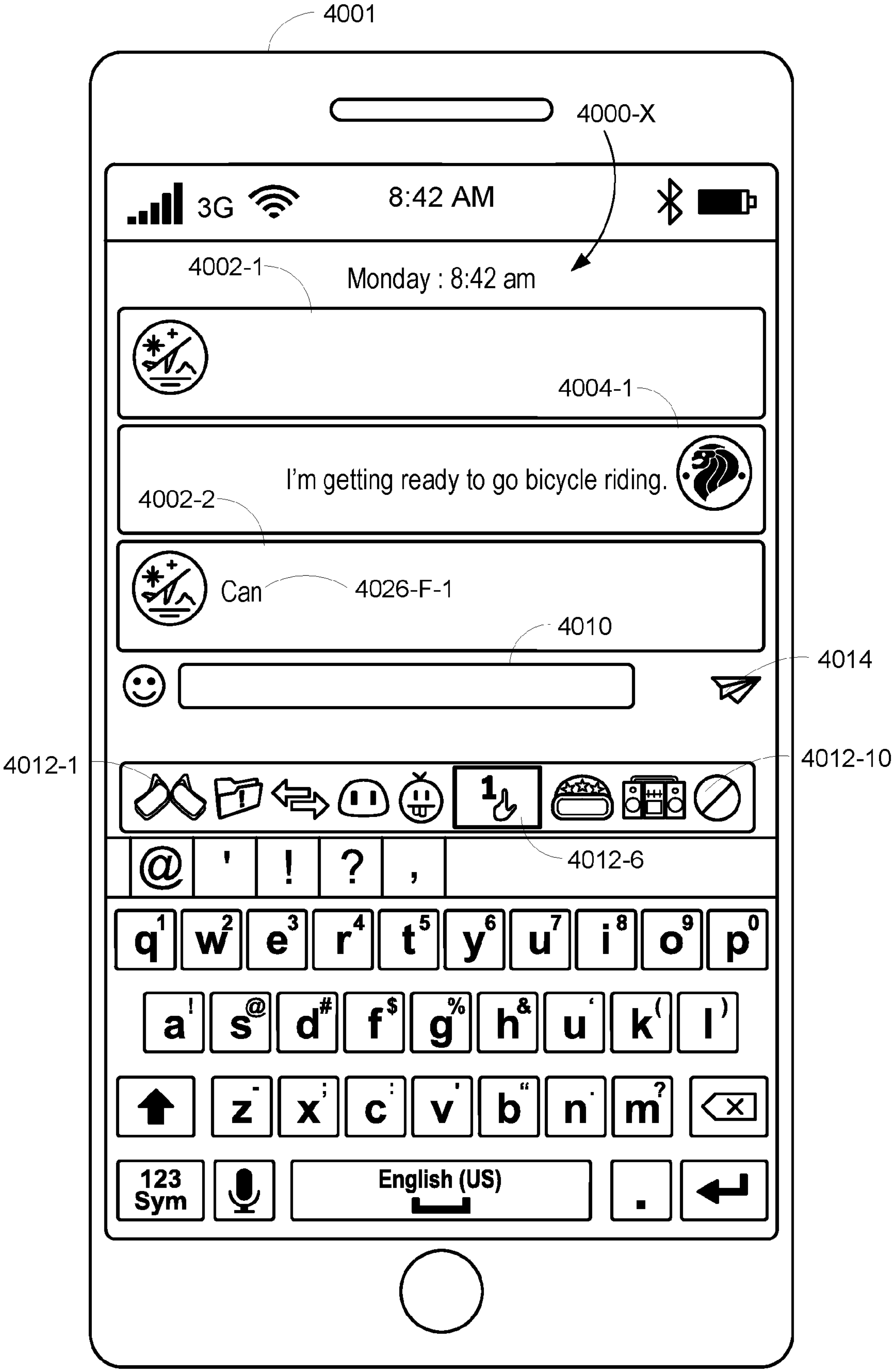

FIG. 4X illustrates the user interface 4000-X, after the message 4002-2 is sent with the message effect 4012-6 applied. At User A's device 4001, the sent message 4002-2 is displayed in another balloon. The text of the original multi-word message is displayed in accordance with the "one at a time" effect, and thus is displayed as transformed representation 4026-F, in which the words in the original multi-word message 4026-A are displayed one at a time. In some implementations, a word of the original multi-word message 4026-A (e.g., "Can") is displayed for a predefined amount of time (e.g., 200 milliseconds, 500 milliseconds), and then the next word of the original multi-word message 4026-A (e.g., "I") is displayed for the predefined amount of time, and so on, automatically (e.g., without further user intervention). In some implementations, a word of the original multi-word message 4026-A (e.g., "Can") is displayed, and then the next word of the original multi-word message 4026-A (e.g., "I") is displayed in response to a user input with respect to the message 4002-2 (e.g., a tap gesture on the message 4002-2) or the predefined amount of time has elapsed, whichever occurs first, and so on. In FIG. 4X, the transformed representation 4026-F-1 includes the word "Can" from the original multi-word message 4026-A.

Figure 4Y:
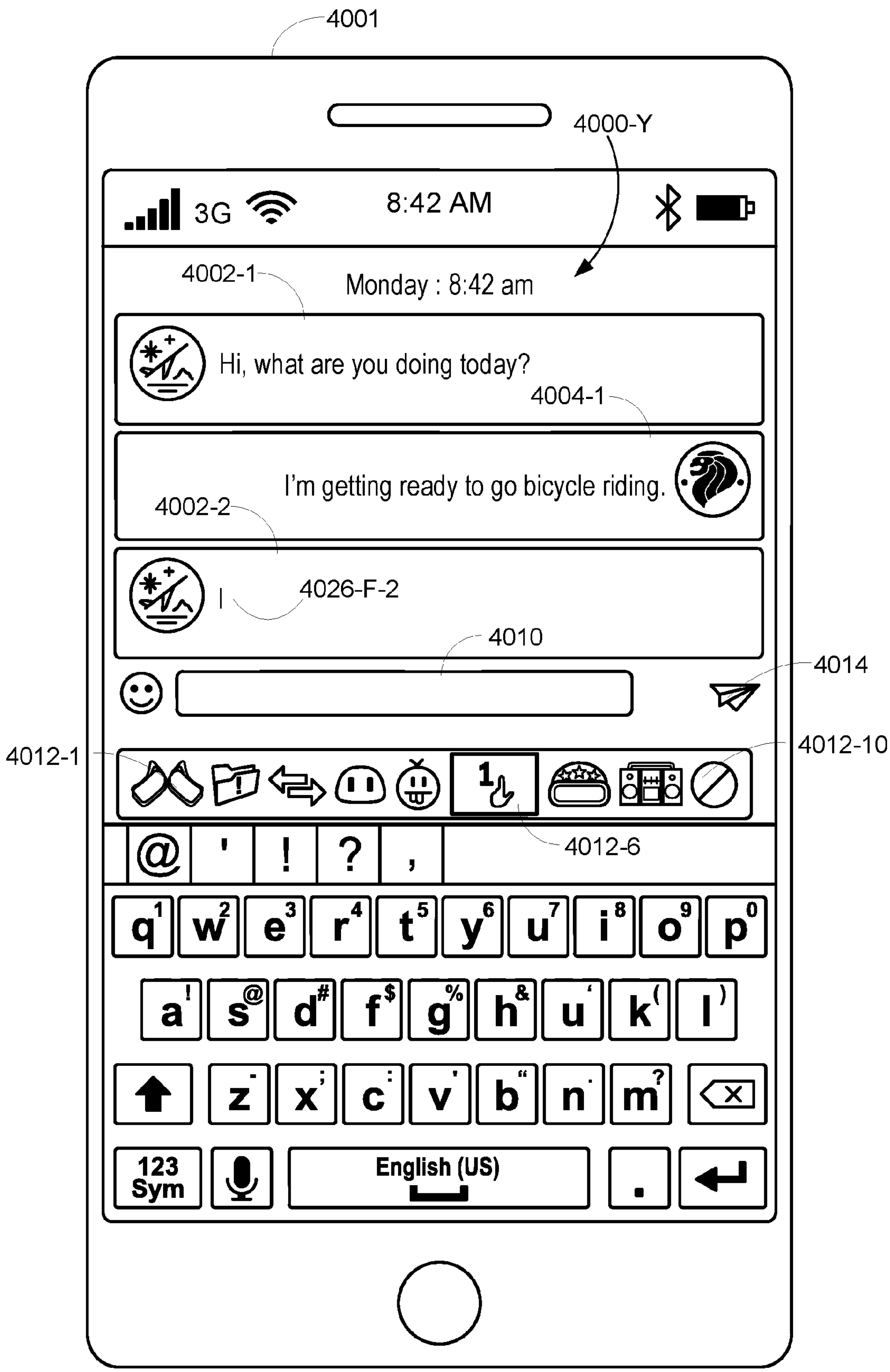

While transformed representation 4026-F-1 is displayed in the message 4002-2, User A may make an input with respect to the message 4002-2 (e.g., make a tap gesture on the message 4002-2), or a predefined amount of time has elapsed. In response to the tap on the message 4002-2 or elapse of the predefined amount of time, transformed representation 4026-F-2 is displayed in the message 4002-2, as shown in FIG. 4Y. FIG. 4Y illustrates the user interface 4000-U, which includes transformed representation 4026-F-2 displayed in the message 4002-2 after User A has made the input with respect to the message 4002-2 or elapse of the predefined amount of time. Transformed representation 4026-F-2 includes the word "I" from the original multi-word message 4026-A. Thus, in response to the input by User A or elapse of the predefined amount of time, "I" (the next word after "Can") is displayed. With another input with respect to the message 4002-2 by User A or another elapse of the predefined amount of time, the next word in the original multi-word message 4026-A ("join") is displayed. In some implementations, each user input with respect to the message 4002-2 or elapse of the predefined amount of time replaces the displayed word with the next word in the original multi-word message 4026-A. In some other implementations, each user input with respect to the message 4002-2 or elapse of the predefined amount of time adds the next word in the original multi-word message 4026-A to the words already displayed (e.g., "Can," then "Can I," then "Can I join," and so on.

Figure 4Z:
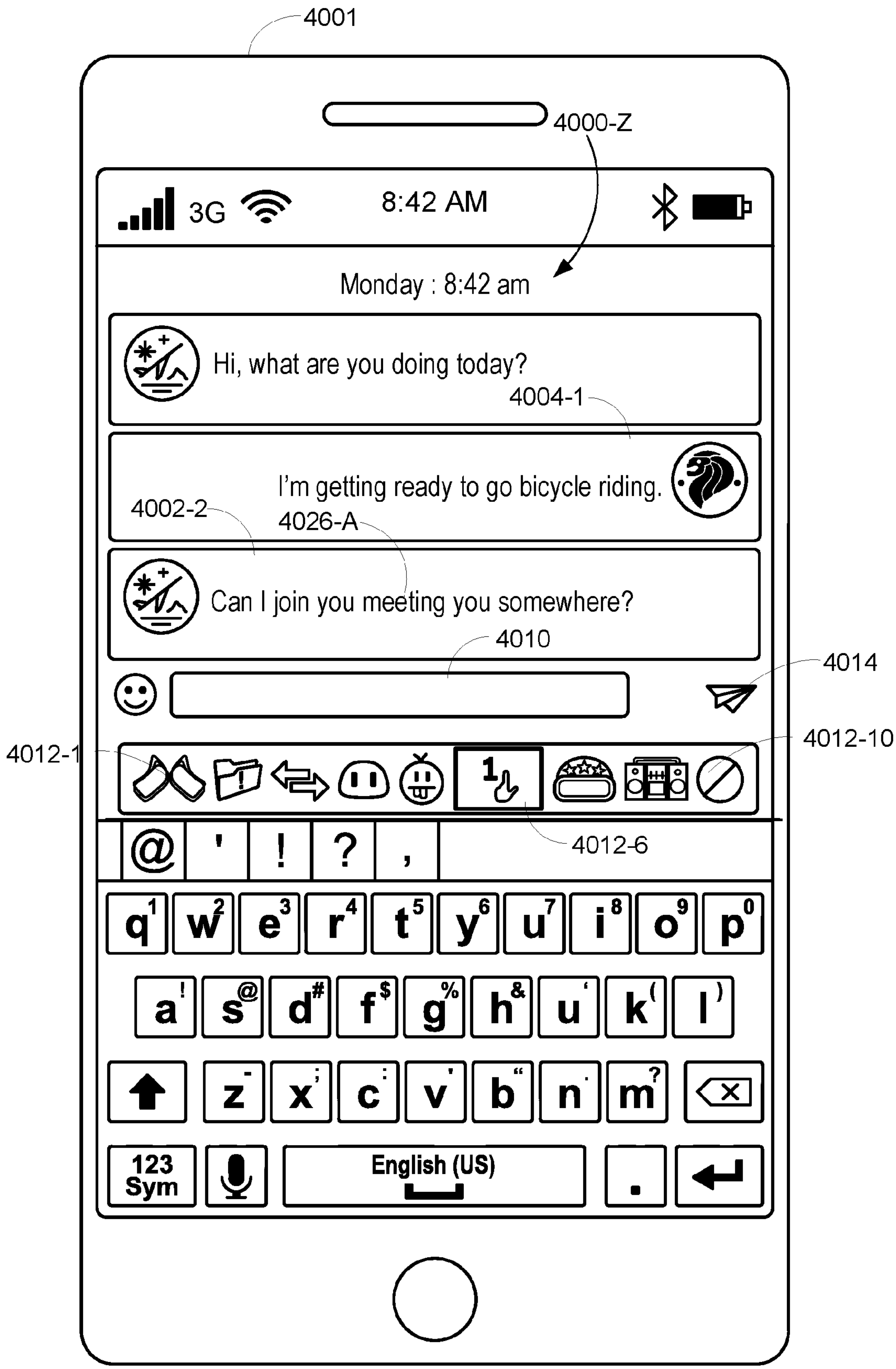
Figure 4A:
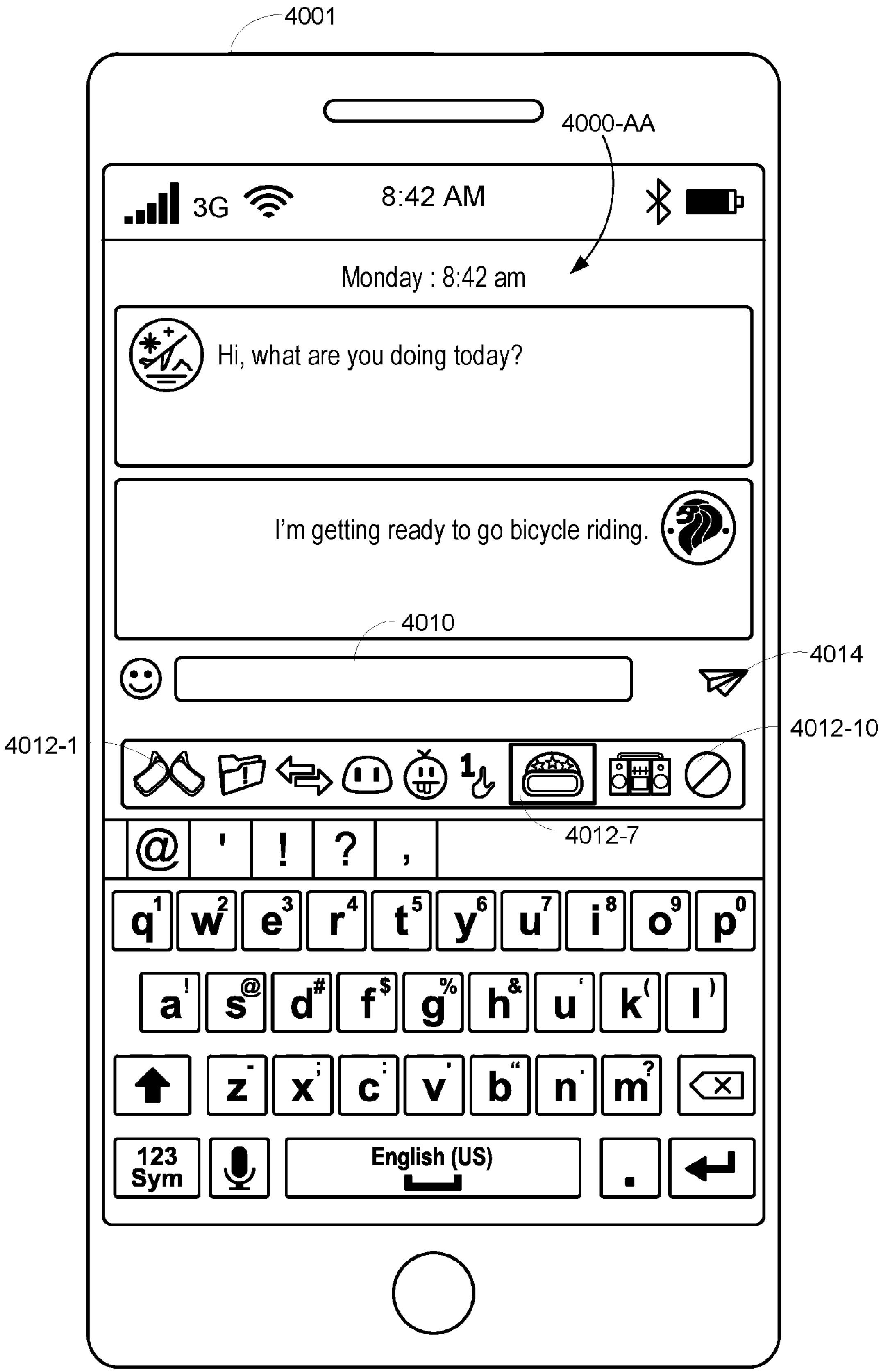
Figure 4B:
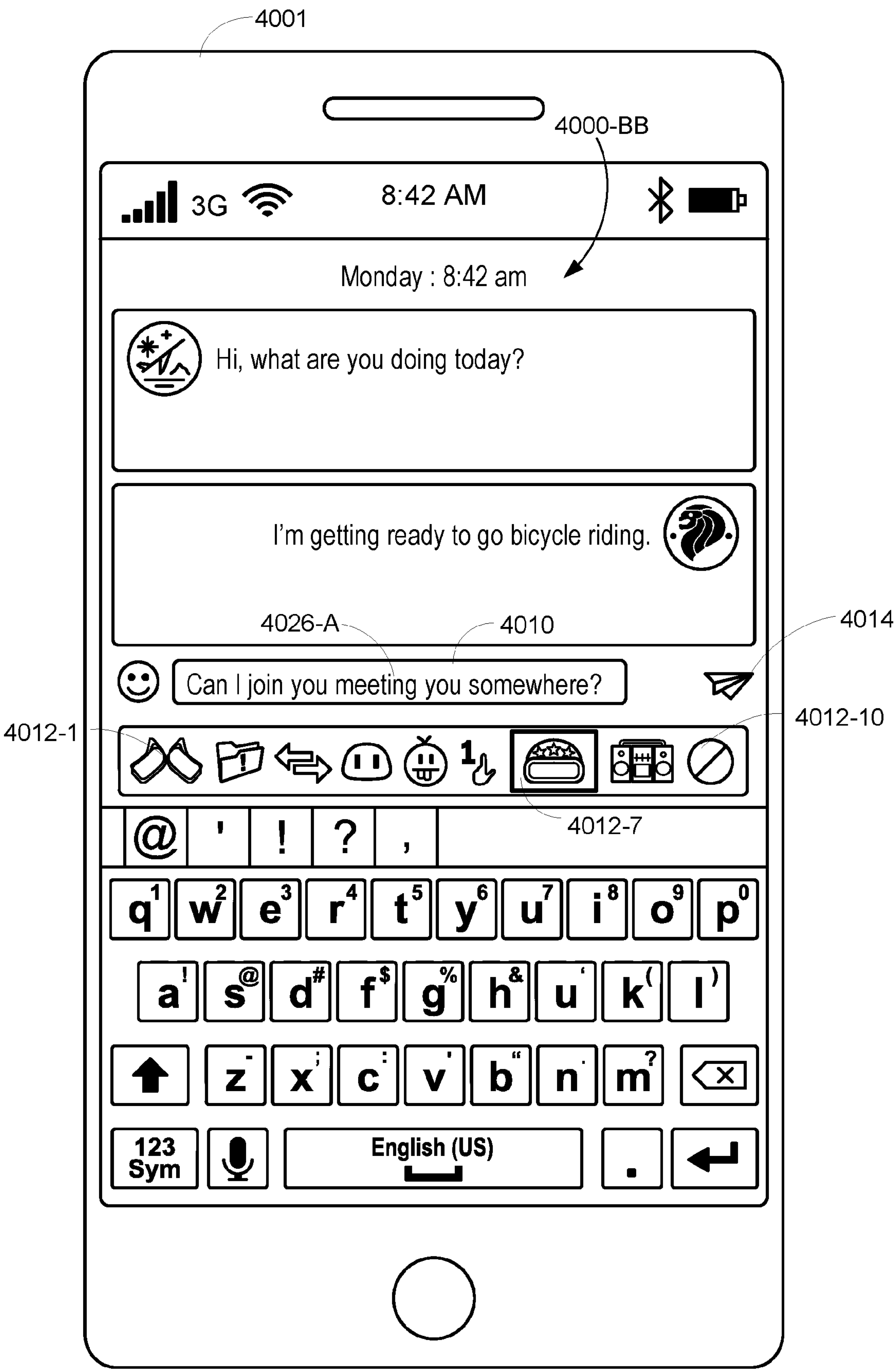
Figure 4C:
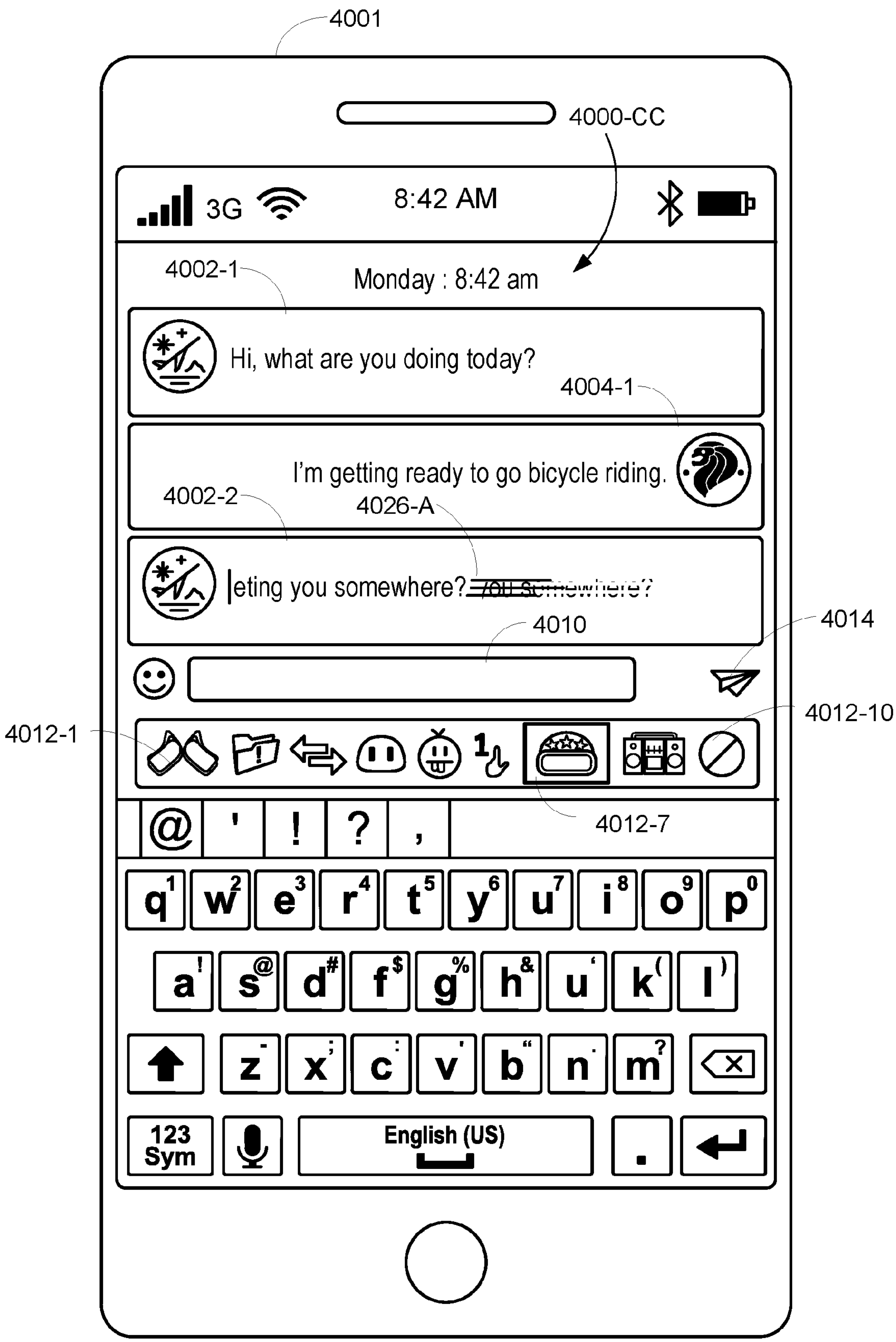
Figure 4D:
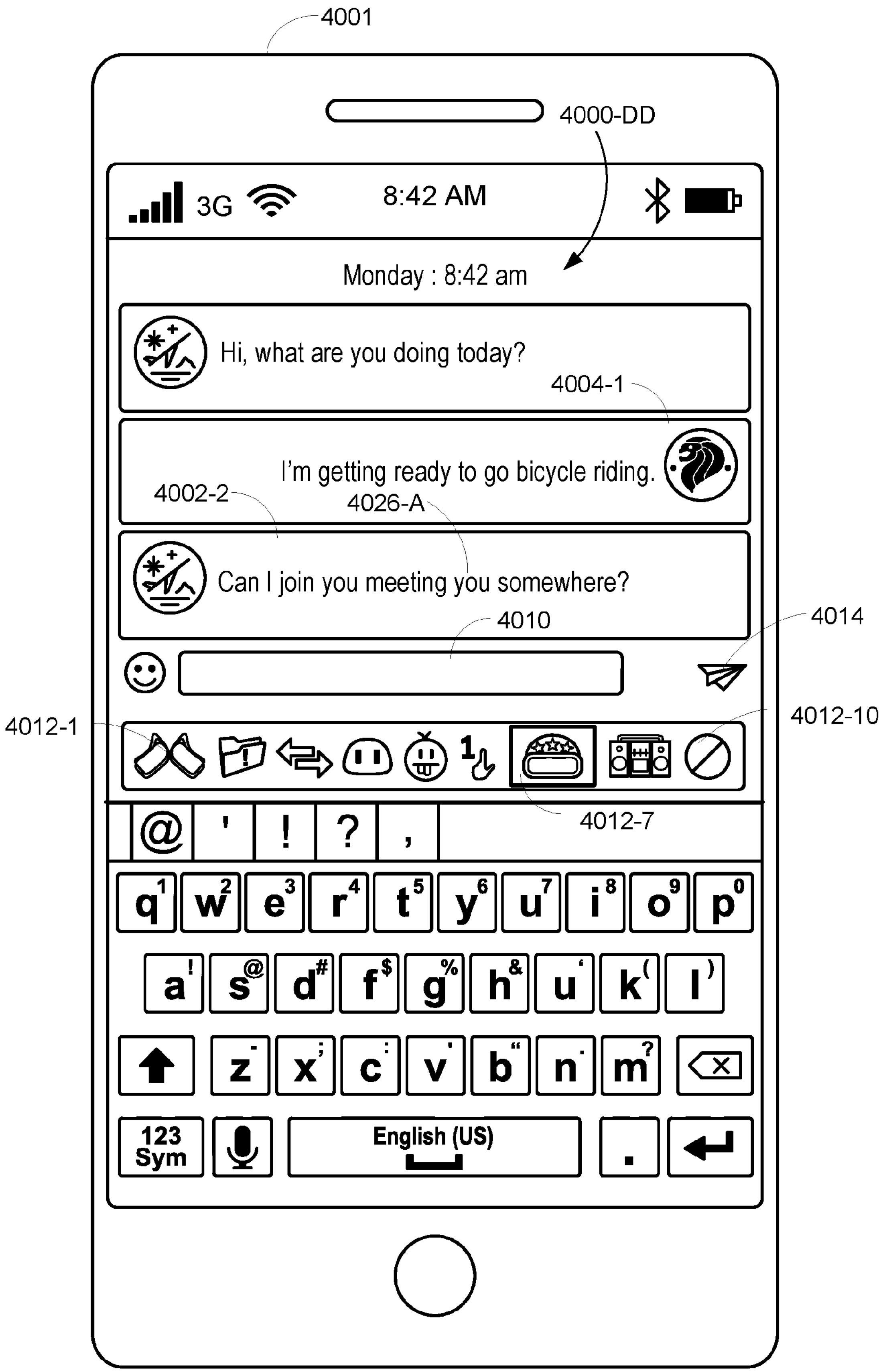
Figure 4E:
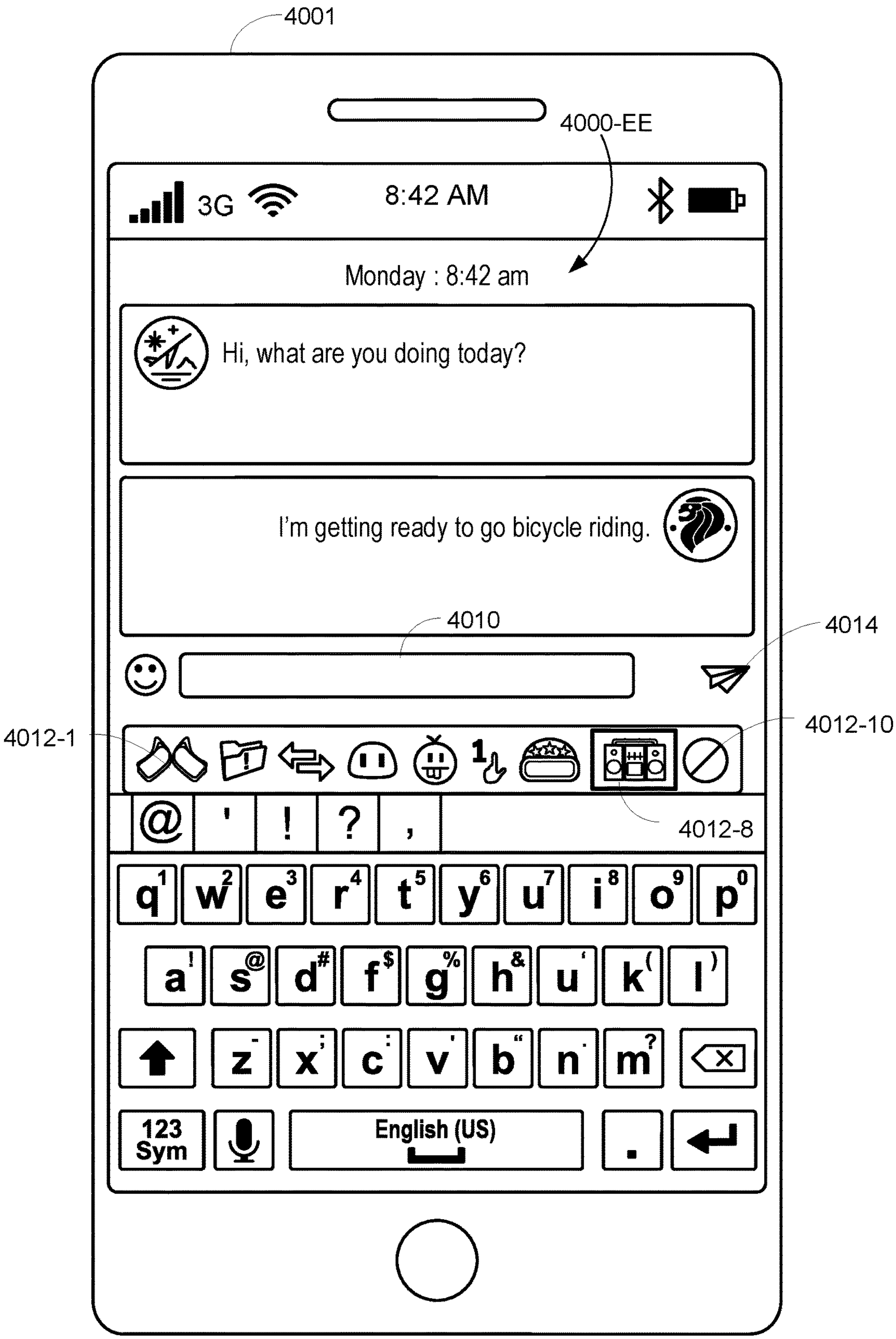
Figure 4F:
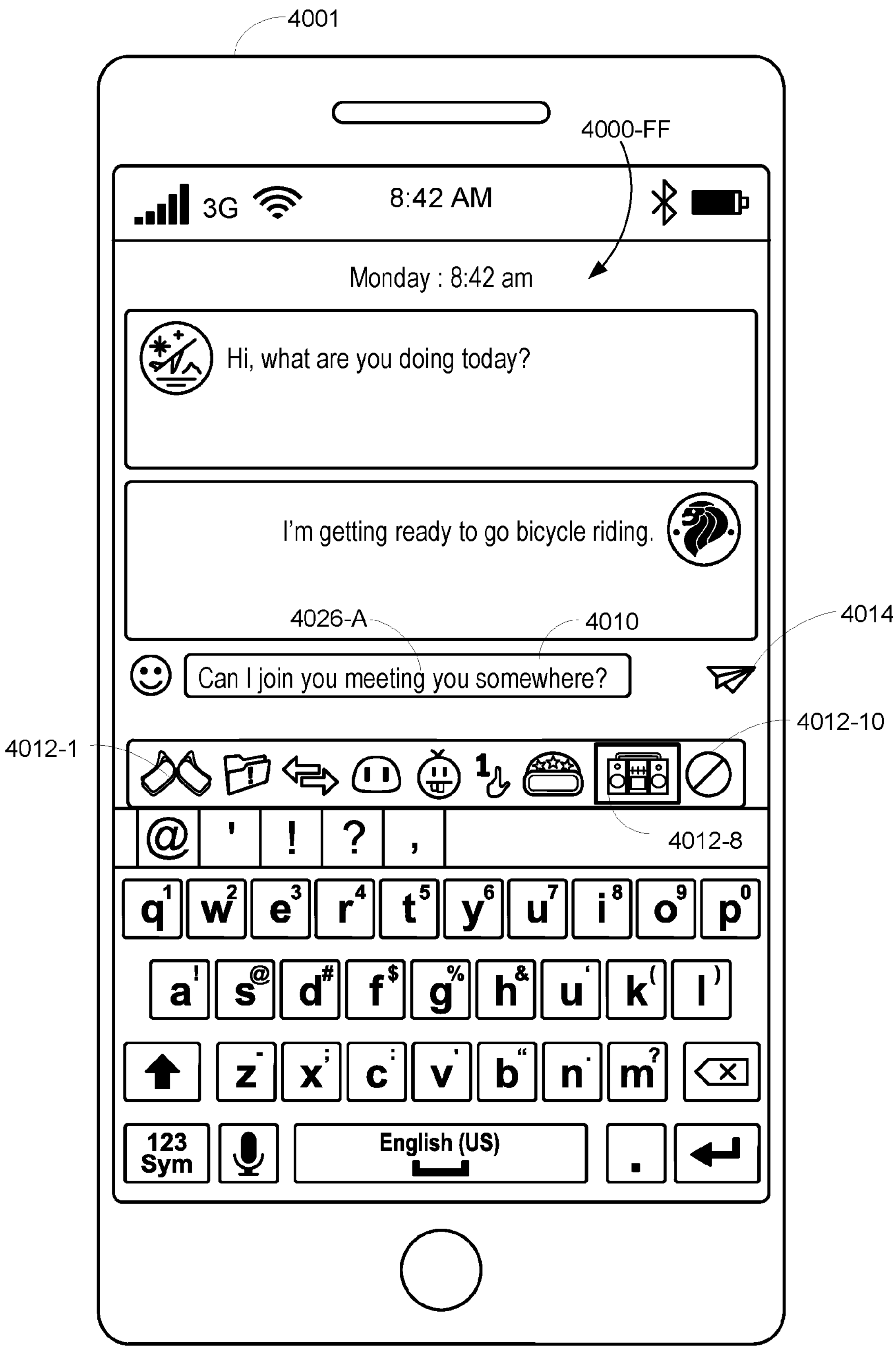
Figure 4G:
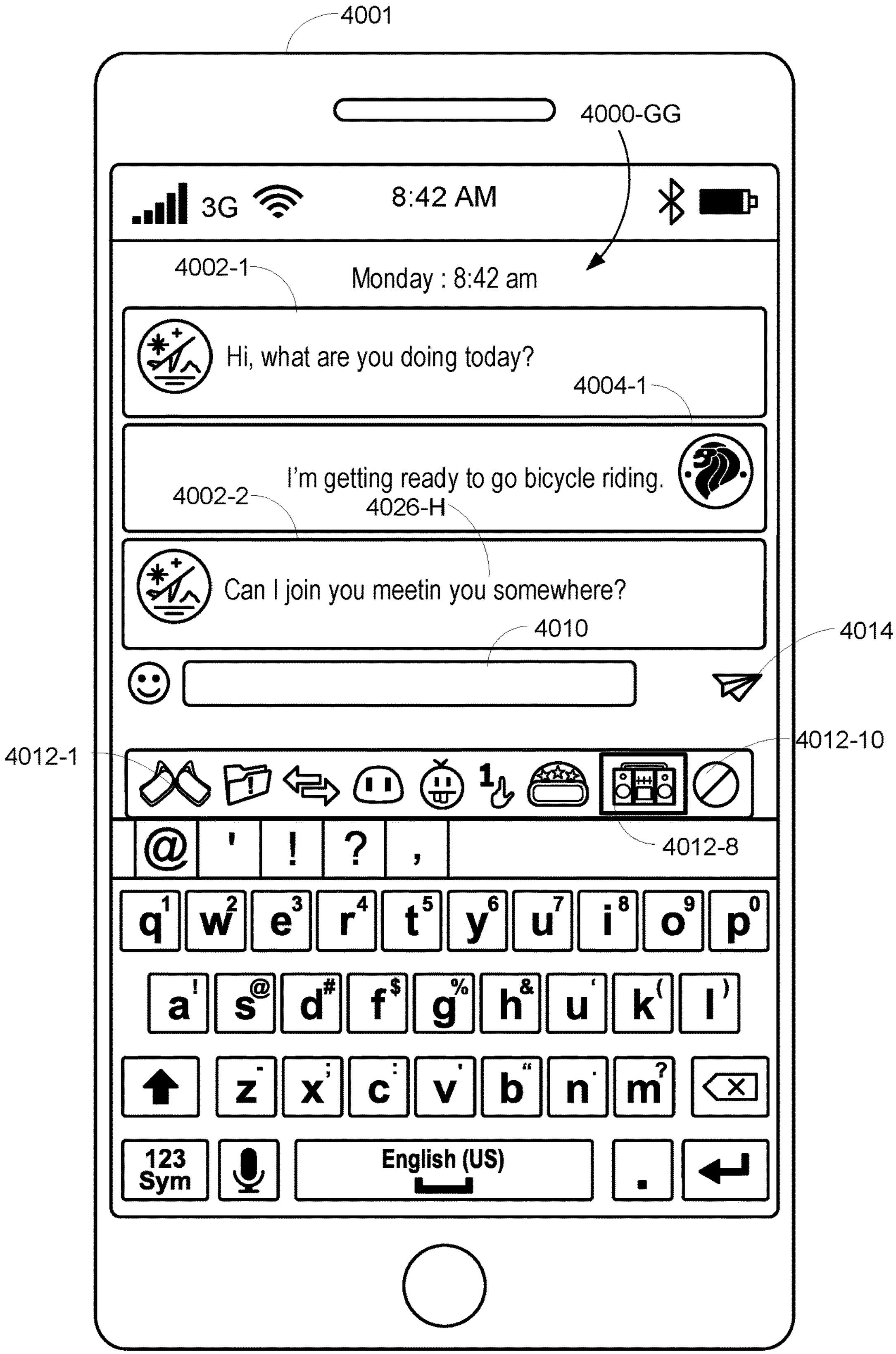
Figure 4H:
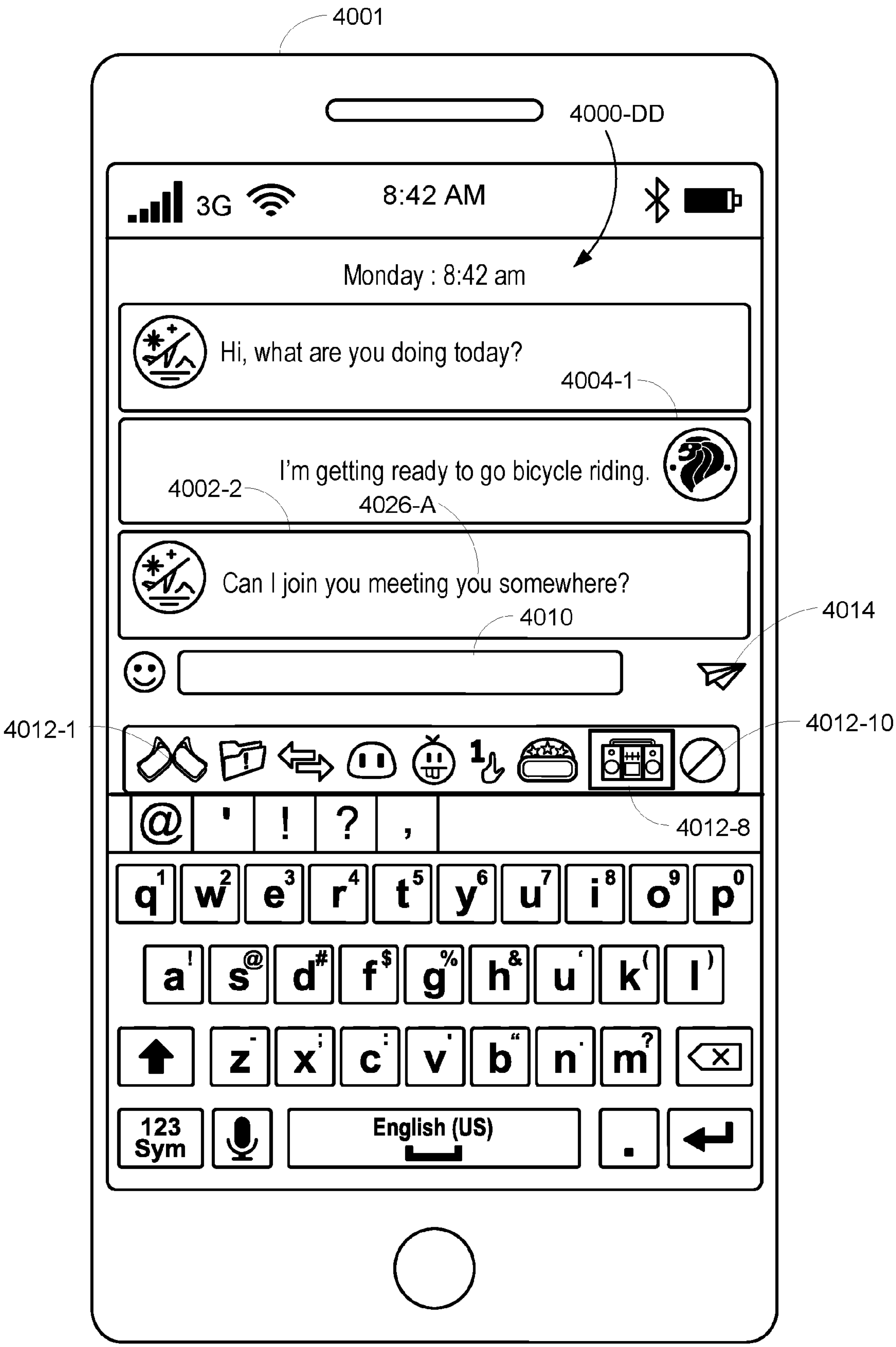
Figure 4I:
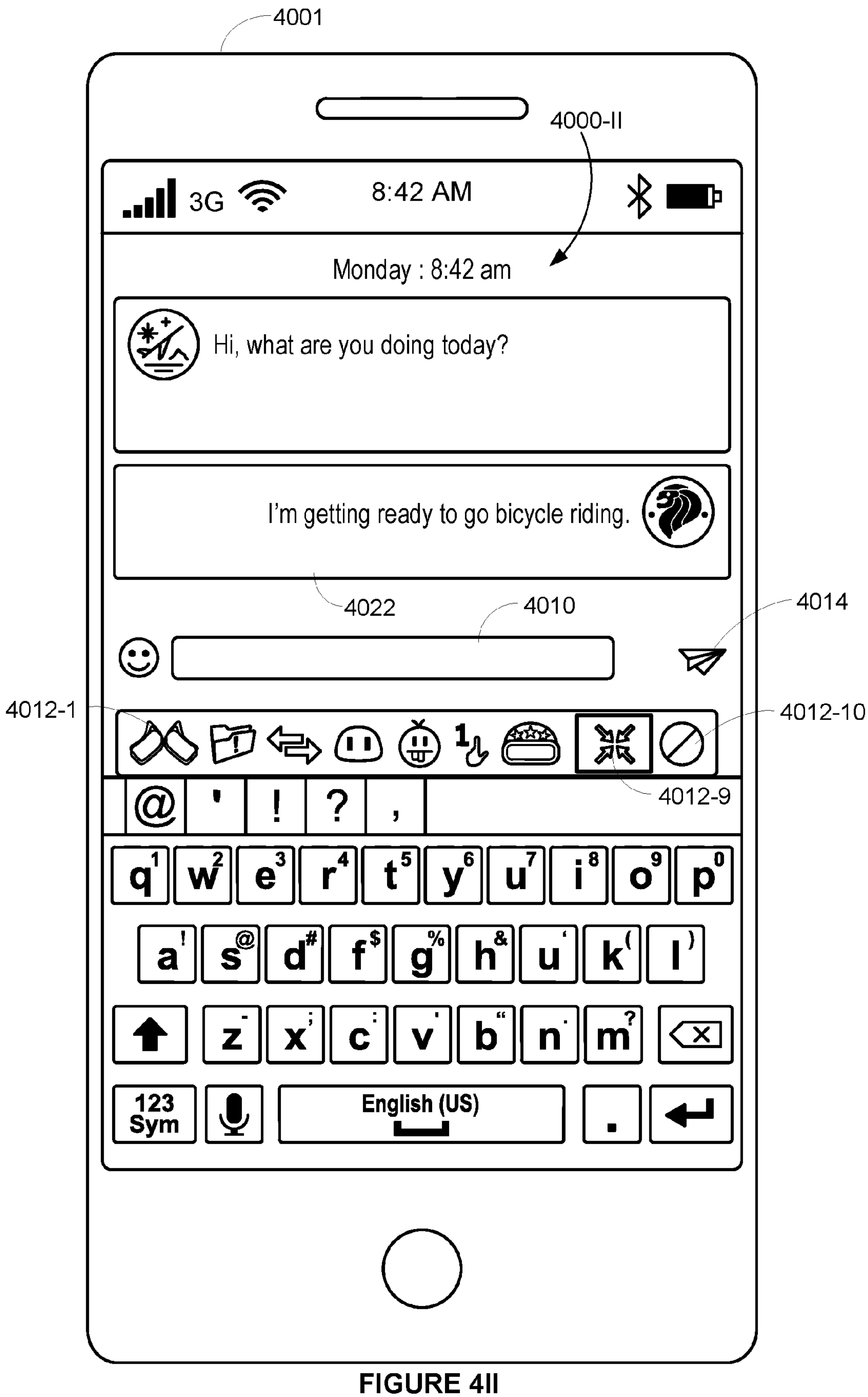
Figure 4J:
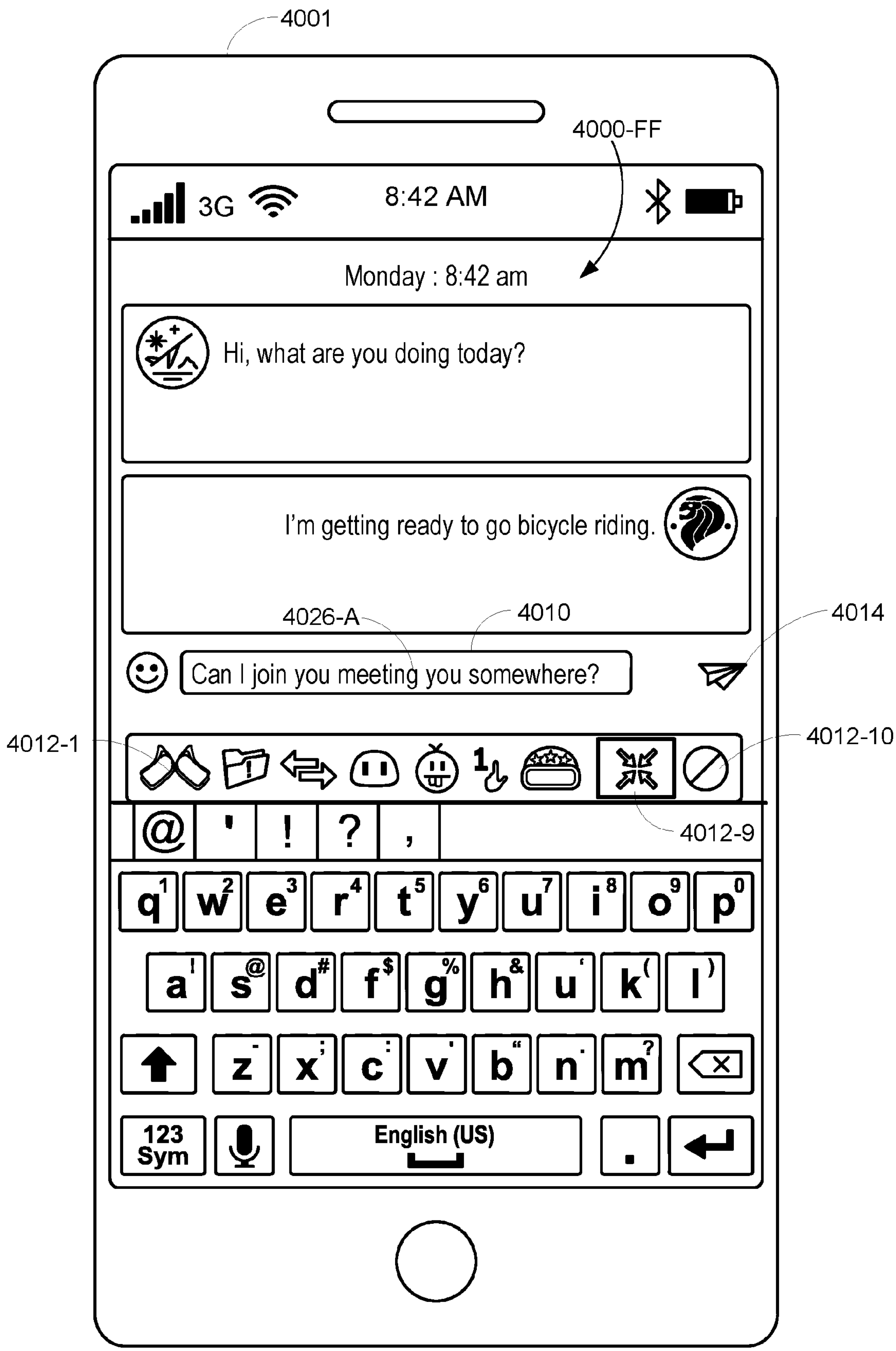
Figure 4K:
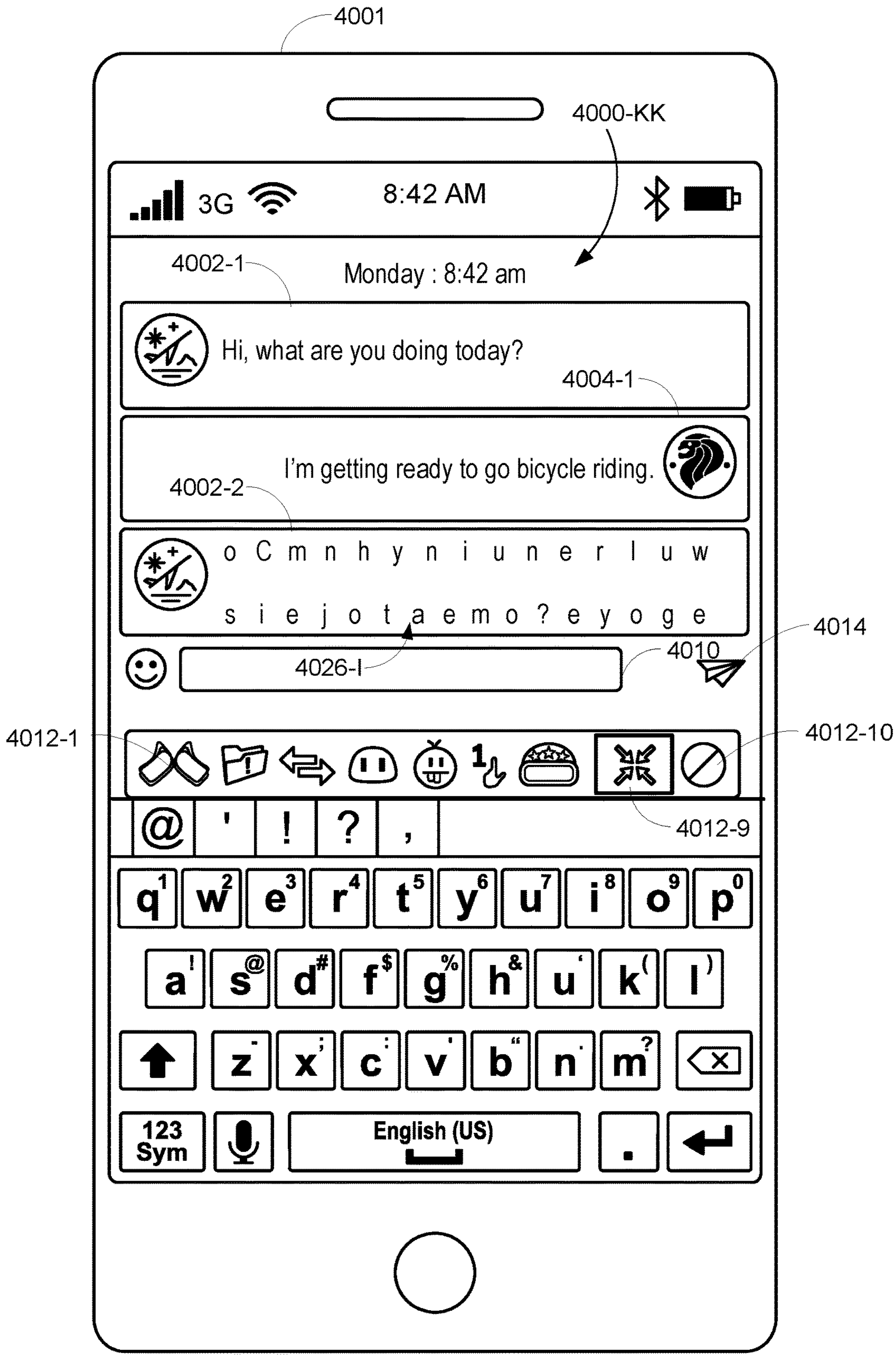
Figure 4L:
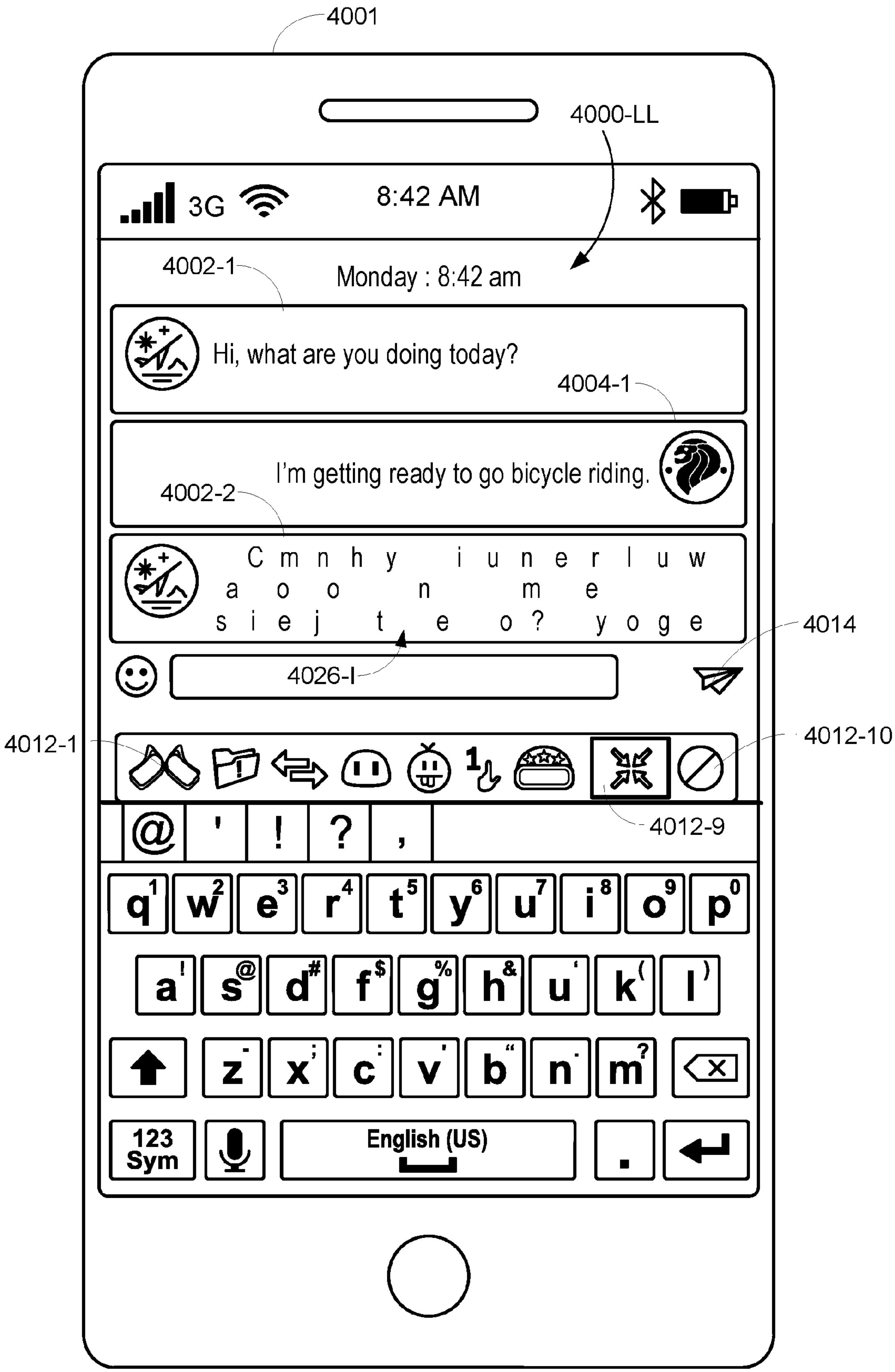
Figure 4M:
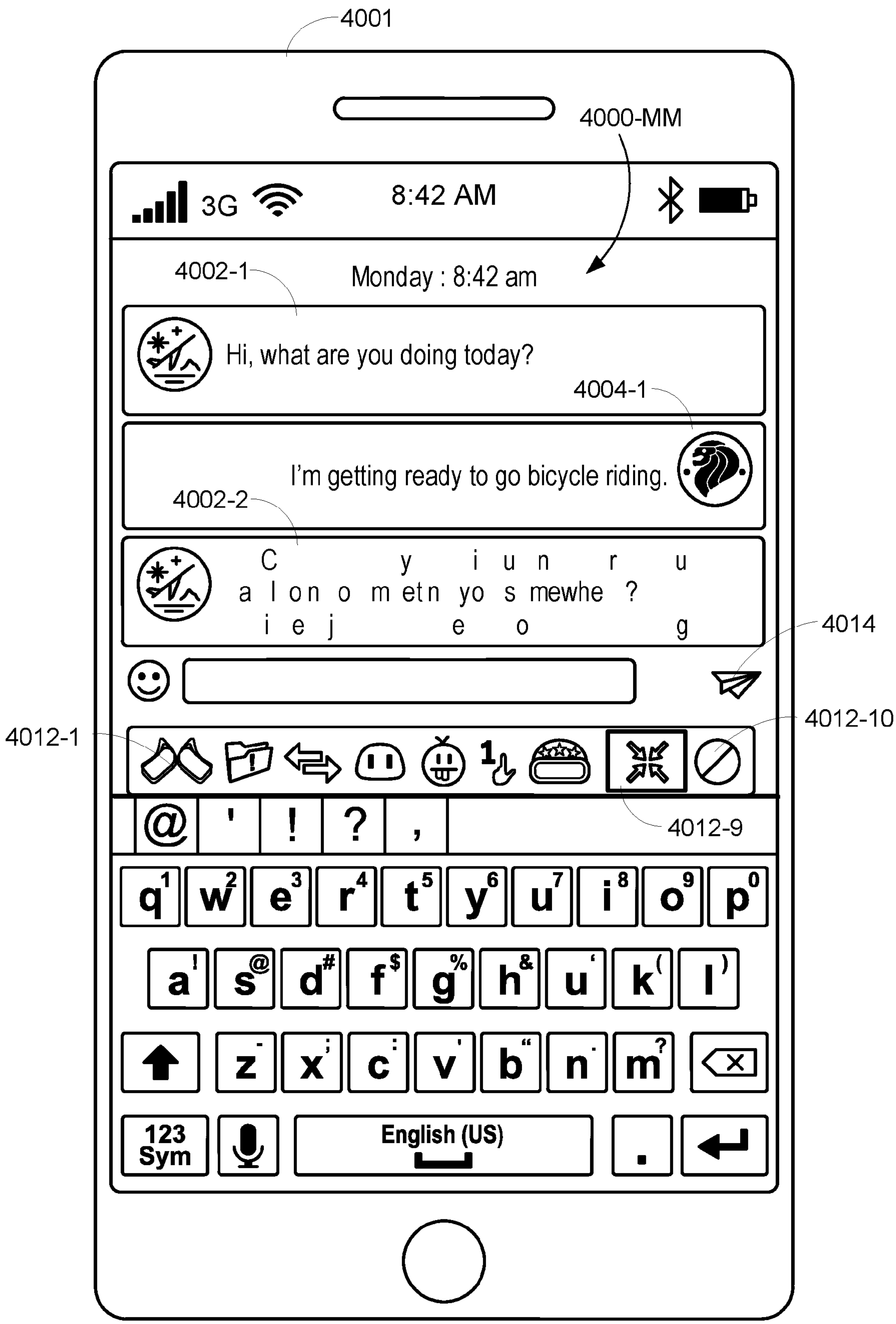
Figure 4N:
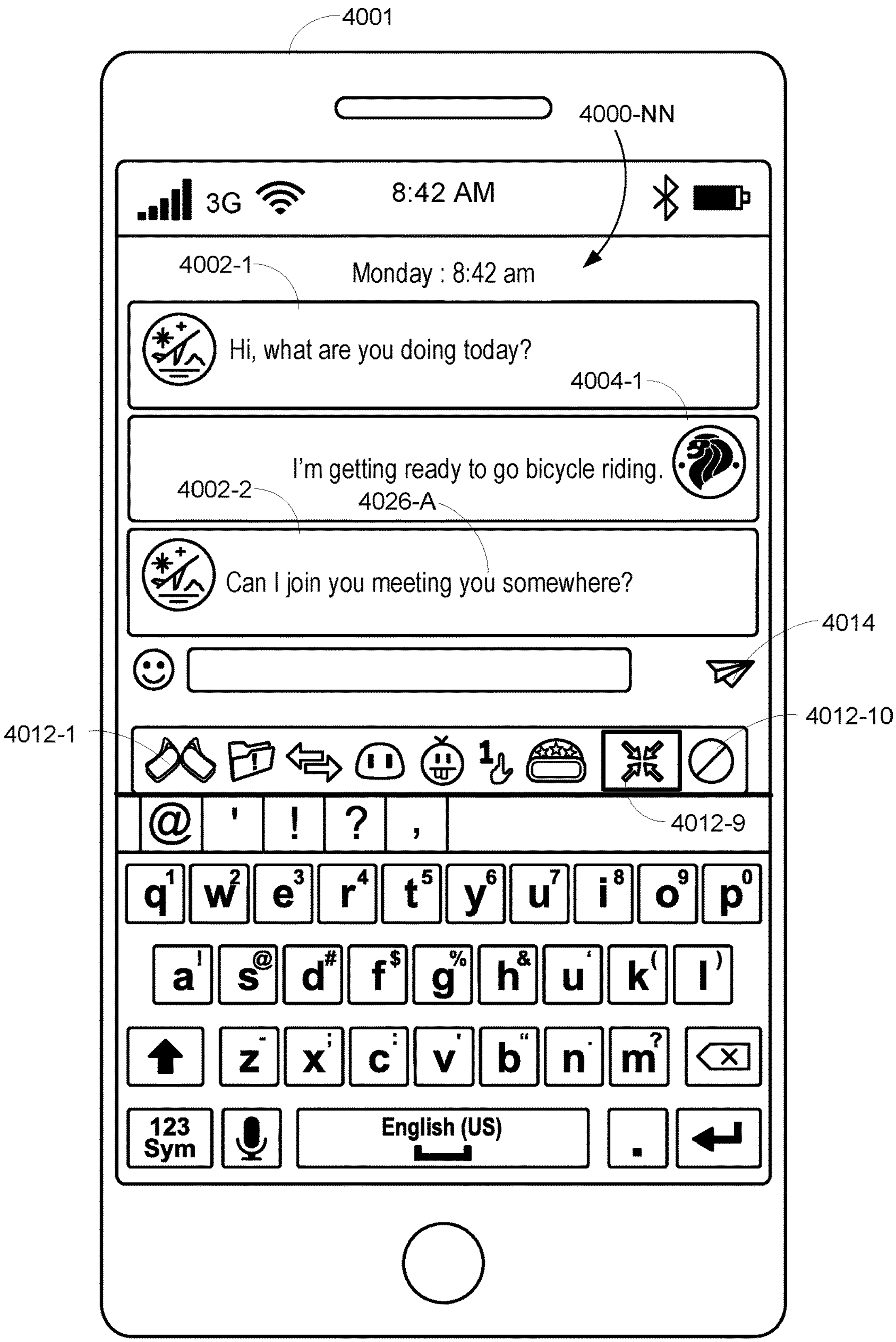
Figure 4O:
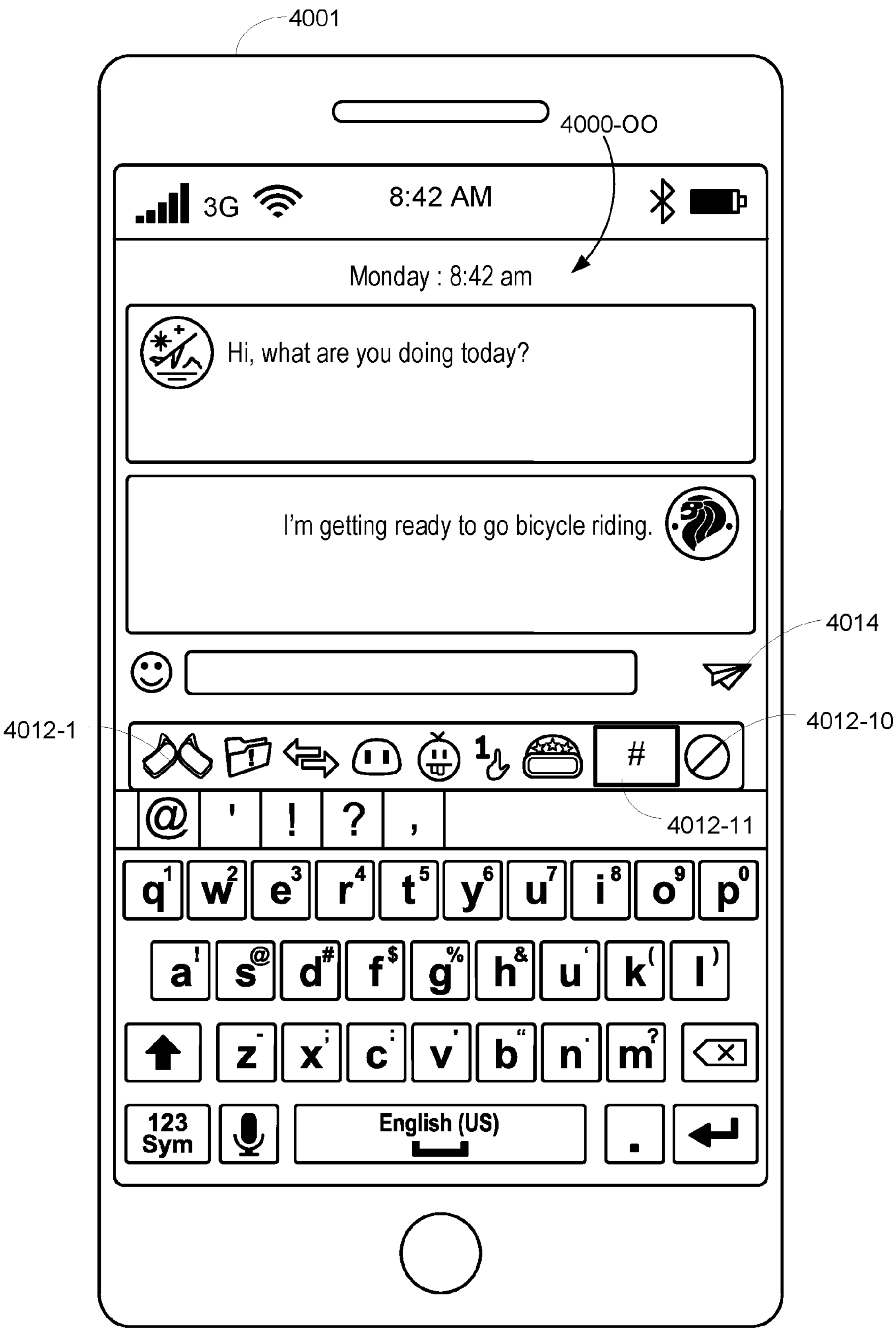
Figure 4P:
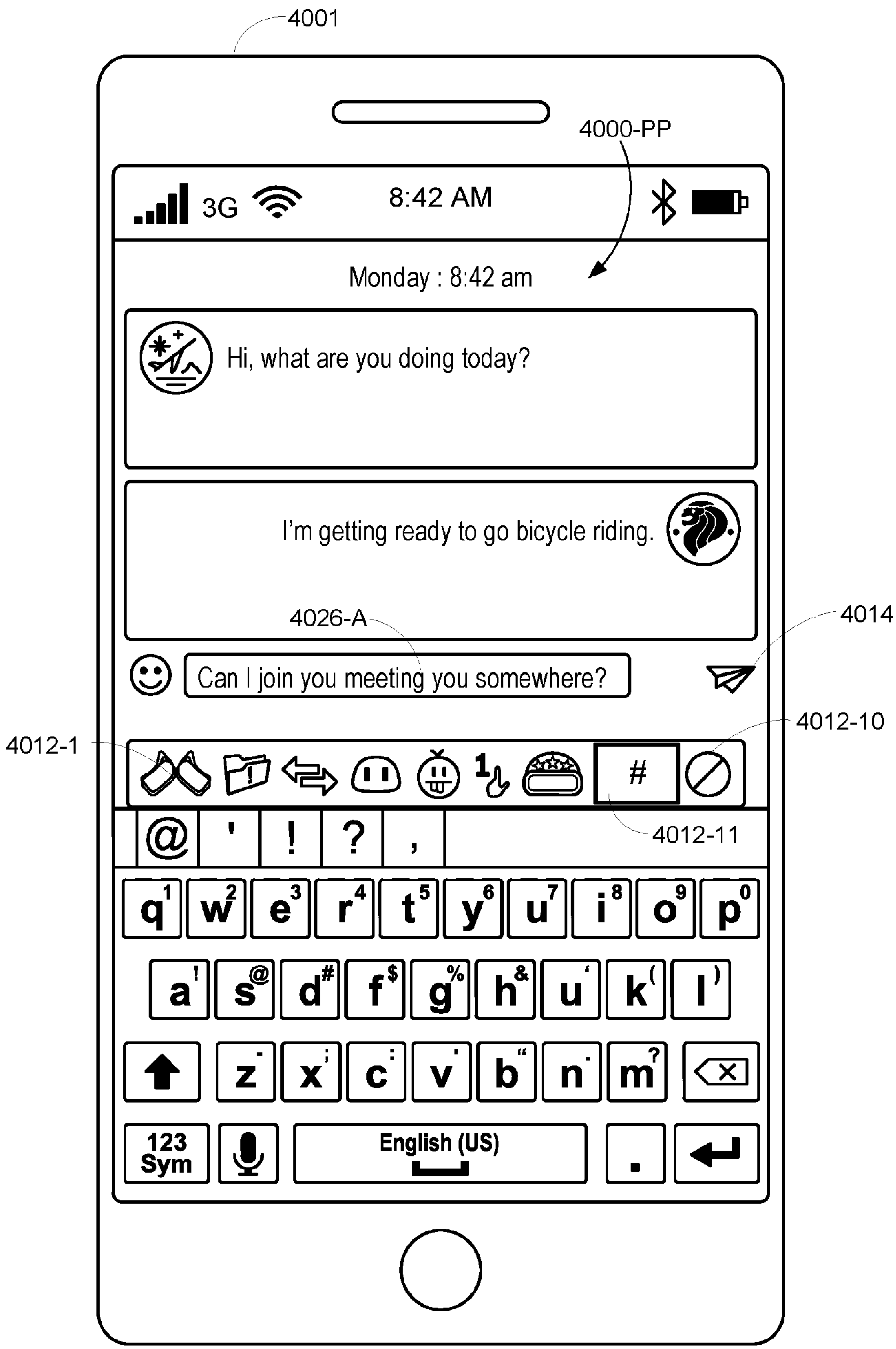
Figure 4Q:
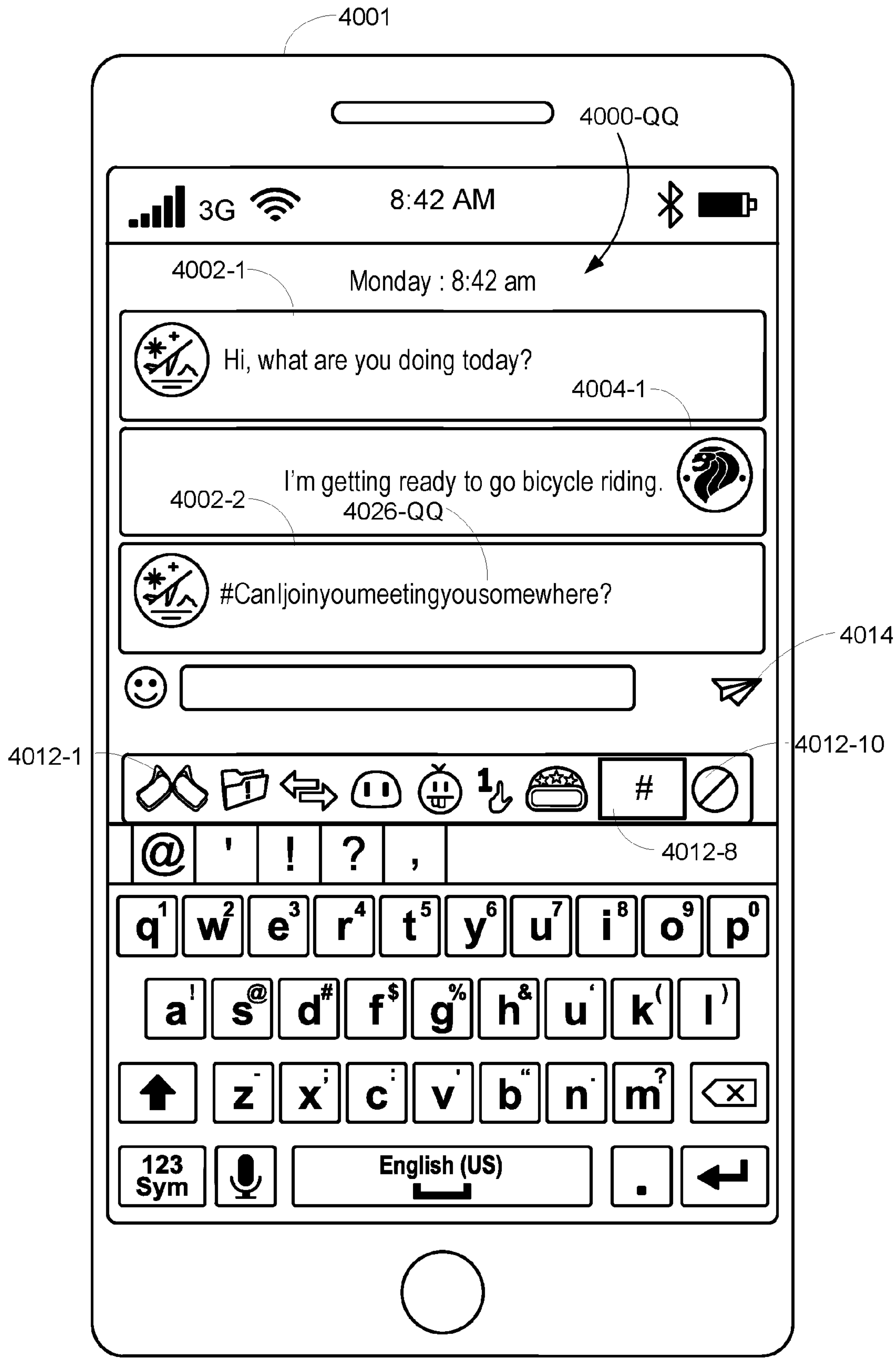
Figure 4R:
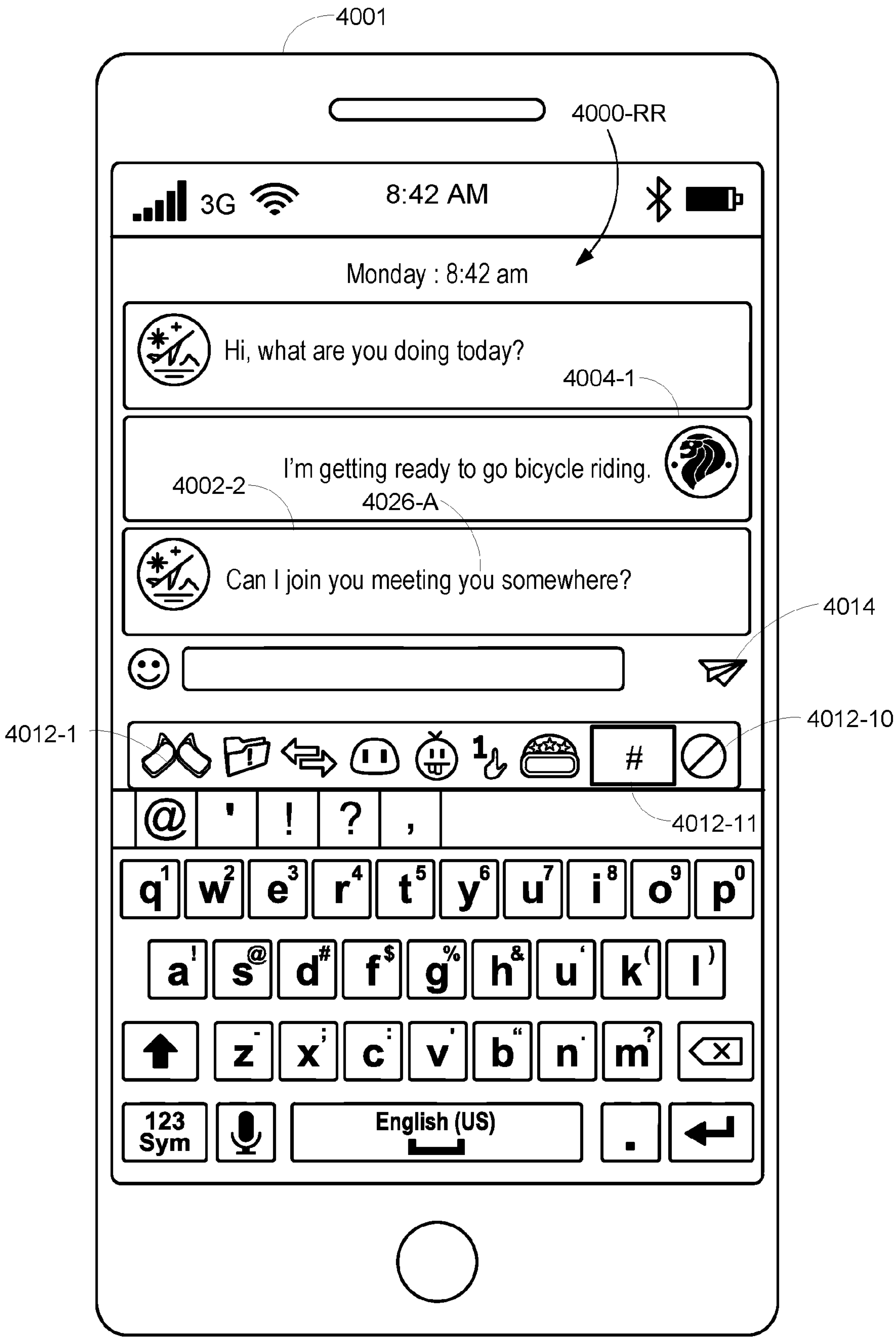
Figure 4S:
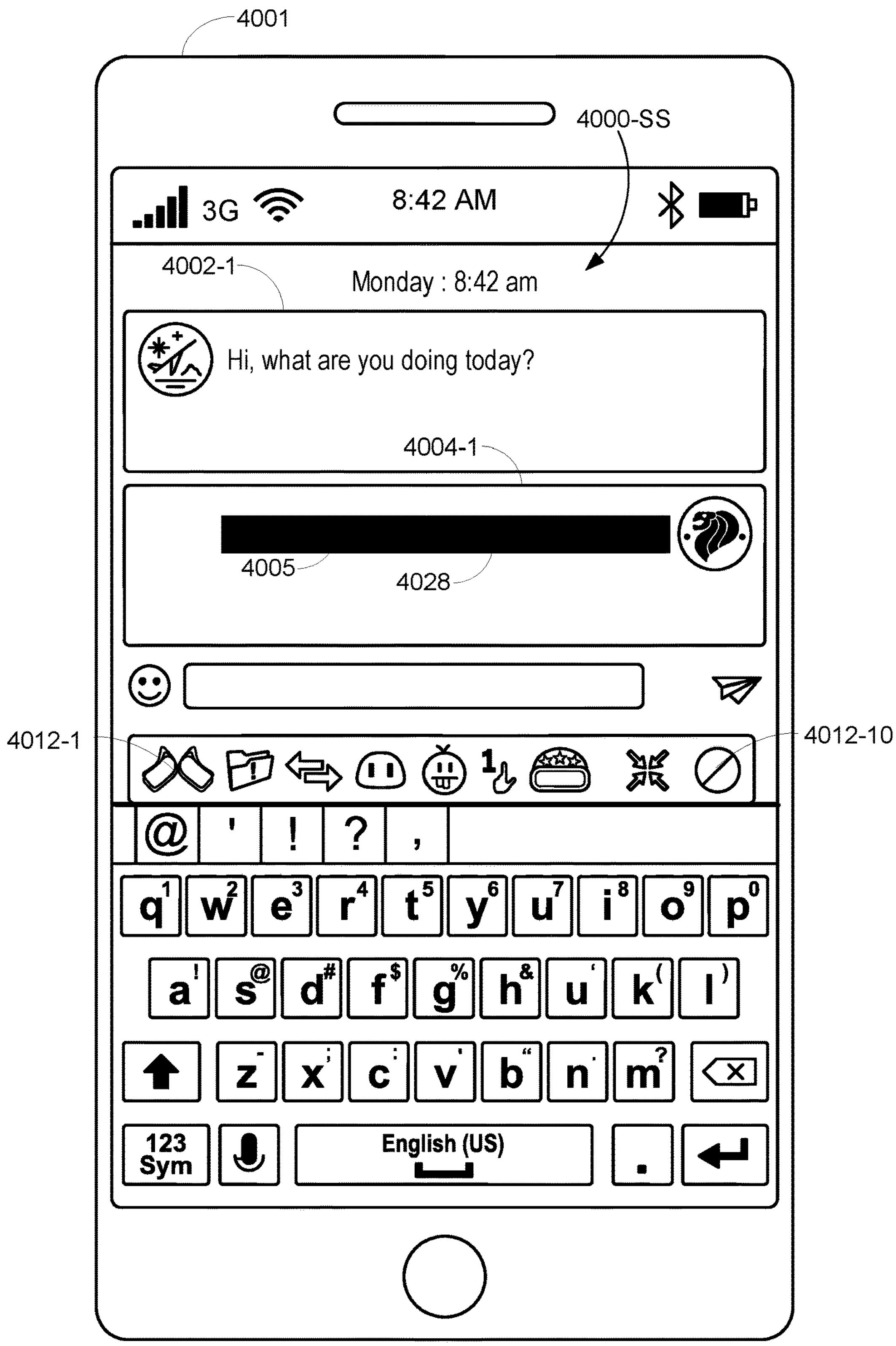
Figure 4T:
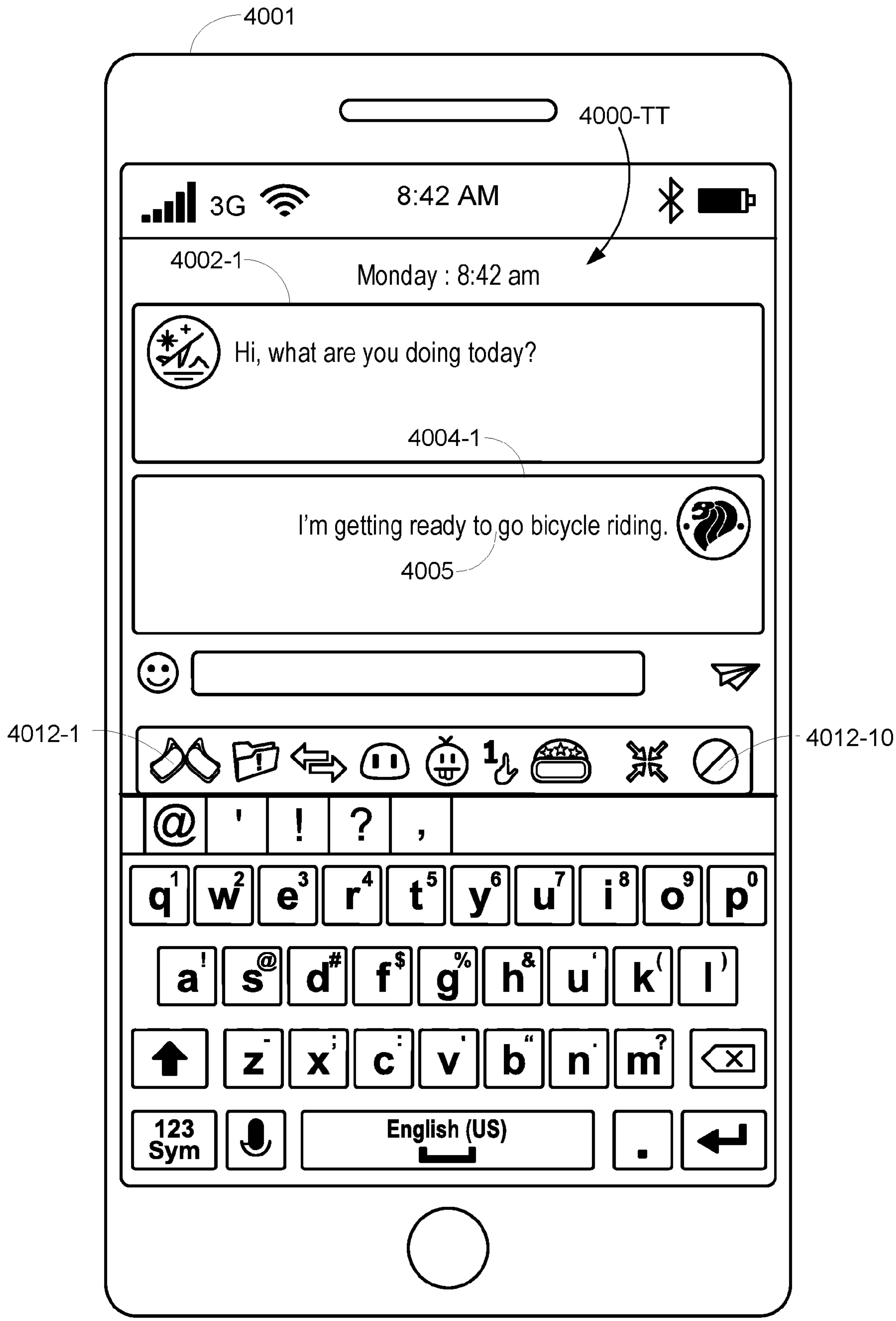

In some implementations, after a certain number of user inputs with respect to the message 4002-2 (e.g., tap gestures on the message 4002-2) or after the words in the original multi-word message 4026-A have each been individually displayed, the entire original multi-word message 4026-A is displayed in the message 4002-2, as shown in FIG. 4Z. FIG. 4Z illustrates user interface 4000-Z, which includes the original multi-word message 4026-A displayed in the message balloon 4002-2 after User A has made a certain number of inputs with respect to the message 4002-2 or after each of the words in the original multi-word message 4026-A have each been individually displayed. In some implementations, the number of inputs (from the first word in original multi-word message 4026-A) to activate display of the entire original multi-word message 4026-A is the number of words in the original multi-word message 4026-A. In some implementations, the display of the original multi-word message 4026-A is temporary. For example, the original multi-word message 4026-A is displayed for five seconds after User A's input with respect to the message 4002-2, after which one word at a time from the original multi-word message 4026-A is again displayed in message 4002-2.

Returning to, and continuing from FIG. 4A, FIG. 4AA illustrates the messaging user interface 4000-AA, which includes the message effect keys displayed. In one example, User A selects the "marquee" key 4012-7 (e.g., by tapping on the icon). In response to User A selecting the "marquee" key 4012-7, the message effect "marquee" is applied to any original multi-word message in the message area to form a transformed representation of the original multi-word message.

FIG. 4BB illustrates the user interface 4000-BB, which shows the "marquee" key 4012-7 highlighted, indicating that the "marquee" effect is active. FIG. 4BB also shows the original multi-word message 4026-A input by User A into the message area 4010. With the "marquee" effect active and the original multi-word message 4026-A "Can I join you meeting you somewhere?" input in the message area 4010, User A activates the send icon 4014 to send the original multi-word message 4026-A as a message 4002-2, with the "marquee" effect applied, as a message to the server system 106, which sends the message to User B's device.

FIG. 4CC illustrates user interface 4000-CC, after the message 4002-2 is sent with message effect 4012-7 applied. At User A's device 4001, the sent message 4002-2 is displayed in another balloon. The text of the original multi-word message is displayed in the message area 4002-2 in accordance with the "marquee" effect, and thus is displayed with, for example, scrolling (e.g., as in text scrolling on a scoreboard or a stock ticker); the original multi-word message 4026-A is displayed with a scrolling animation.

While the transformed representation is displayed, User A may make an input with respect to the message 4002-2 (e.g., make a tap gesture on the message 4002-2). In response to the tap on the message 4002-2, the original multi-word message 4026-A is displayed in the message 4002-2 without scrolling, as shown in FIG. 4DD. FIG. 4DD illustrates the user interface 4000-DD, which includes the original multi-word message 4026-A displayed in the message 4002-2, with the scrolling stopped, after User A has made the input with respect to the message 4002-2. In some implementations, the display of the original multi-word message 4026-A without the scrolling is temporary. For example, the scrolling stops for five seconds after User A's input with respect to the message 4002-2, after which the scrolling is resumed (e.g., the transformed representation of the original multi-word message is resumed).

Returning to, and continuing from FIG. 4A, FIG. 4EE illustrates the messaging user interface 4000-EE, which includes the message effect keys 4012. In one example, User A selects the "rapper style" key 4012-8 (e.g., by tapping on the icon). In response to User A selecting the "rapper style" key 4012-8, the message effects key 4012-8 is highlighted and active for message area 4010 meaning that the text effect "rapper style" will be applied to any original multi-word message in the message area in accordance with the "rapper style" algorithm to form a transformed representation of the original multi-word message.

FIG. 4FF illustrates user interface 4000-FF, which shows the "rapper style" key 4012-8 highlighted, indicating that the "rapper style" effect is active. FIG. 4FF also shows text 4026-A input by User A into the message area 4010. With the "rapper style" effect active and the original multi-word message 4026-A "Can I join you meeting you somewhere?" input in the message area 4010, User A activates the send icon 4014 to send the original multi-word message 4026-A as a message 4002-2, with the "rapper style" effect applied, as a message to the server system 106, which sends the message to User B's device.

FIG. 4GG illustrates the user interface 4000-GG, after the message 4002-2 is sent with the "rapper style" effect applied. At User A's device 4001, the sent message 4002-2 is displayed in another balloon. The text of the original multi-word message 4026 is displayed in accordance with the "rapper style" effect, and thus is displayed as transformed representation 4026-H, in which for each of one or more words in the original multi-word message 4026-A, characters are added, substituted, or removed. Thus, in FIG. 4GG, the transformed representation 4026-H is "Can I join you meetin you somewhere?" (the ending "g" in "meeting" is removed). In some implementations, the additions, substitutions, and removals are done in accordance with one or more predefined rules or a predefined grammar. The rules or grammar may be predefined so that the resulting text mimics the verbal style of rappers or hip-hop artists. For example, the grammar may specify that the upper case "S" is substituted with a dollar sign "$," that certain characters or character combinations are substituted for their all-uppercase counterparts, and that for certain characters or character combinations one or more characters are removed or one or more characters are added after the certain character or character combination. As another example, the predefined rules or grammar may specify that each word has an "izzle" added to the end of the word, in order to mimic the verbal style of the artist Snoop Dogg. In some implementations, punctuation characters are left intact in their original form.

While transformed representation 4026-H is displayed in the message 4002-2, User A may make an input with respect to the message 4002-2 (e.g., make a tap gesture on the message 4002-2). In response to the tap on the transformed representation 4002-2, the original multi-word message 4026-A is displayed in the message 4002-2, as shown in FIG. 4HH. FIG. 4HH illustrates the user interface 4000-HH, which includes the original multi-word message 4026-A displayed in the message 4002-2 after User A has made the input with respect to the message 4002-2. In some implementations, the display of the original multi-word message 4026-A is temporary. For example, the original multi-word message 4026-A is displayed for five seconds after User A's input with respect to the message 4002-2, after which the transformed representation 4026-H is re-displayed in message 4002-2.

Returning to, and continuing from FIG. 4A, FIG. 4II illustrates the messaging user interface 4000-II, which includes the message effects keys 4012 displayed. In one example, User A selects the "spread out" key 4012-9 (e.g., by tapping on the icon). In response to User A selecting the "spread out" key 4012-9, the message effect "spread out" algorithm is applied to any original multi-word message in the message area to form a transformed representation of the original multi-word message.

FIG. 4JJ illustrates the user interface 4000-JJ, which shows the "spread out" key 4012-9 in highlighted, indicating that the "spread out" effect is active. FIG. 4JJ also shows the original multi-word message 4026-A input by User A into the message area 4010. With the "spread out" effect active and original multi-word message 4026-A "Can I join you meeting you somewhere?" input in the message area 4010, User A activates the send icon 4014 to send the original multi-word message 4026-A as a message 4002-2, with the "spread out" effect applied, as a message to the server system 106, which sends the message to User B's device.

FIG. 4KK illustrates the user interface 4000-KK, after the message 4002-2 is sent with the message effect 4012-9 applied. At User A's device 4001, the sent message 4002-2 is displayed in another balloon. The text of the original multi-word message is displayed in the message area 4002-2 in accordance with the "spread out" effect, and thus is displayed as transformed representation 4026-I, in which the characters of the original multi-word message 4026-A are spread apart. For example, the characters may be spread out, in random order, into two rows within the message 4002-2, as shown in FIG. 4KK.

While the transformed representation 4026-I is displayed in the message area 4002-2, User A may make an input with respect to the message area 4002-2 (e.g., make a tap gesture on the message 4002-2). In response to the tap on the message area 4002-2, the characters in the transformed representation 4026-I move (e.g., come together) and rearrange automatically (e.g., in an animation, without further human intervention) into the original multi-word message 4026-A in the message 4002-2, as shown in FIGS. 4LL-4NN. FIGS. 4LL-4NN illustrates user interfaces 4000-LL thru 4000-NN, which show instances in an animation of the characters in transformed representation 4026-I moving and re-arranging into the original multi-word message 4026-A after User A has made the input with respect to the message 4002-2. When the animation is completed, the original multi-word message 4026-A is displayed (FIG. 4NN) in the message area 4002-2. In some implementations, the display of the original multi-word message 4026-A is temporary. For example, the original multi-word message 4026-A is displayed for five seconds after User A's input with respect to the message 4002-2, after which transformed representation 4026-I is re-displayed in message 4002-2 (e.g., the characters spread apart again into text 4026-I).

Returning to, and continuing from FIG. 4A, FIG. 4OO illustrates the messaging user interface 4000-OO, which includes the message effect keys 4012. In one example, User A activated the message effects keys 4012 by selecting the "hash tag" key 4012-11 (e.g., by tapping on the icon). In response to User A selecting the "hash tag" key 4012-11, the message effects key 4012-11 is highlighted and active for message area 4010 meaning that the text effect "hash tag" will be applied to any original multi-word message in the message area in accordance with the "hash tag" algorithm to form a transformed representation of the original multi-word message.

FIG. 4PP illustrates user interface 4000-PP, which shows the "hash tag" key 4012-11 highlighted, indicating that the "hash tag" effect is active. FIG. 4FF also shows text 4026-A input by User A into the message area 4010. With the "hash tag" effect active and the original multi-word message 4026-A "Can I join you meeting you somewhere?" input in the message area 4010, User A activates the send icon 4014 to send the original multi-word message 4026-A as a message 4002-2, with the "hash tag" effect applied, as a message to the server system 106, which sends the message to User B's device.

FIG. 4QQ illustrates the user interface 4000-QQ, after the message 4002-2 is sent with the "rapper style" effect applied. At User A's device 4001, the sent message 4002-2 is displayed in another balloon. The text of the original multi-word message 4026 is displayed in accordance with the "hash tag" effect, and thus is displayed as transformed representation 4026-QQ, in which the original multi-word message 4026-A has been converted to a hash tag. Thus, in FIG. 4QQ, the transformed representation 4026-QQ is "#CanIjoinyou meetin you somewhere?" Advantageously, in some embodiments, such hash tags are stored in some embodiments and can be recalled for later use. This transformation is further useful in some embodiments because the spell checker is configured to automatically disregard such hash tags.

While the transformed representation 4026-QQ is displayed in the message area 4002-2, User A may make an input with respect to the message area 4002-2 (e.g., make a tap gesture on the message area 4002-2). In response to the tap on the transformed representation 4026-QQ, the original multi-word message 4026-A is displayed in the message area 4002-2, as shown in FIG. 4RR. FIG. 4RR illustrates the user interface 4000-RR, which includes the original multi-word message 4026-A displayed in the message area 4002-2 after User A has made the input with respect to the message 4002-2. In some implementations, the display of the original multi-word message 4026-A is temporary. For example, the original multi-word message 4026-A is displayed for five seconds after User A's input with respect to the message 4002-2, after which the transformed representation 4026-QQ is re-displayed in message 4002-2.

The description above describes messages sent by User A, with message effects, viewed at User A's device (e.g., the message sender interacting with messages sent by the message sender). However, the above message effects and responses to user inputs are applicable to received messages. For example, FIG. 4SS illustrates messaging user interface 4000-SS on the client device 4001, in which message 4004-1 sent by User B and received by User A has the "top secret" message effect applied. In message 4004-1, censoring graphic 4028 obscures the text of the message 4004-1, similar to the message effect applied to text 4026 as shown in FIG. 4H.

While the censoring graphic 4028 is displayed in the message 4004-1, User A makes an input with respect to the message 4004-1 (e.g., make a tap gesture on the message 4004-1). In response to the tap on the message 4004-1, the original multi-word message 4026-A is displayed in the message 4004-1, as shown in FIG. 4TT; the censoring graphic 4028 is removed. FIG. 4TT illustrates user interface 4000-TT, which includes the original multi-word message 4026-A displayed in the message area 4004-1 after User A has made the input with respect to the message 4004-1, similar to the user input response as shown in FIG. 4I. In some implementations, the removal of the censoring graphic 4028 is temporary. For example, the censoring graphic 4028 is removed for five seconds after User A's input with respect to the message 4004-1, after which the censoring graphic 4028 is re-displayed and re-obscures the text 4005. Thus, the descriptions of the implementations with respect to FIGS. 4A-4QQ above are applicable to received messages also.

In some implementations, in the message 4002-2, when there is a transition from displaying a non-original message text (e.g., text 4026-B, 4026-C, etc.) to displaying the original message text (e.g., text 4026-A), an animation of the transition, showing characters flying into place to reveal the original multi-word message 4026-A, is displayed.

It should be appreciated that the message effects described above and their names are exemplary. Other names for the same message effects may be given, and other message effects, as well as variants of the message effects described above, are possible.

Figure 5A:
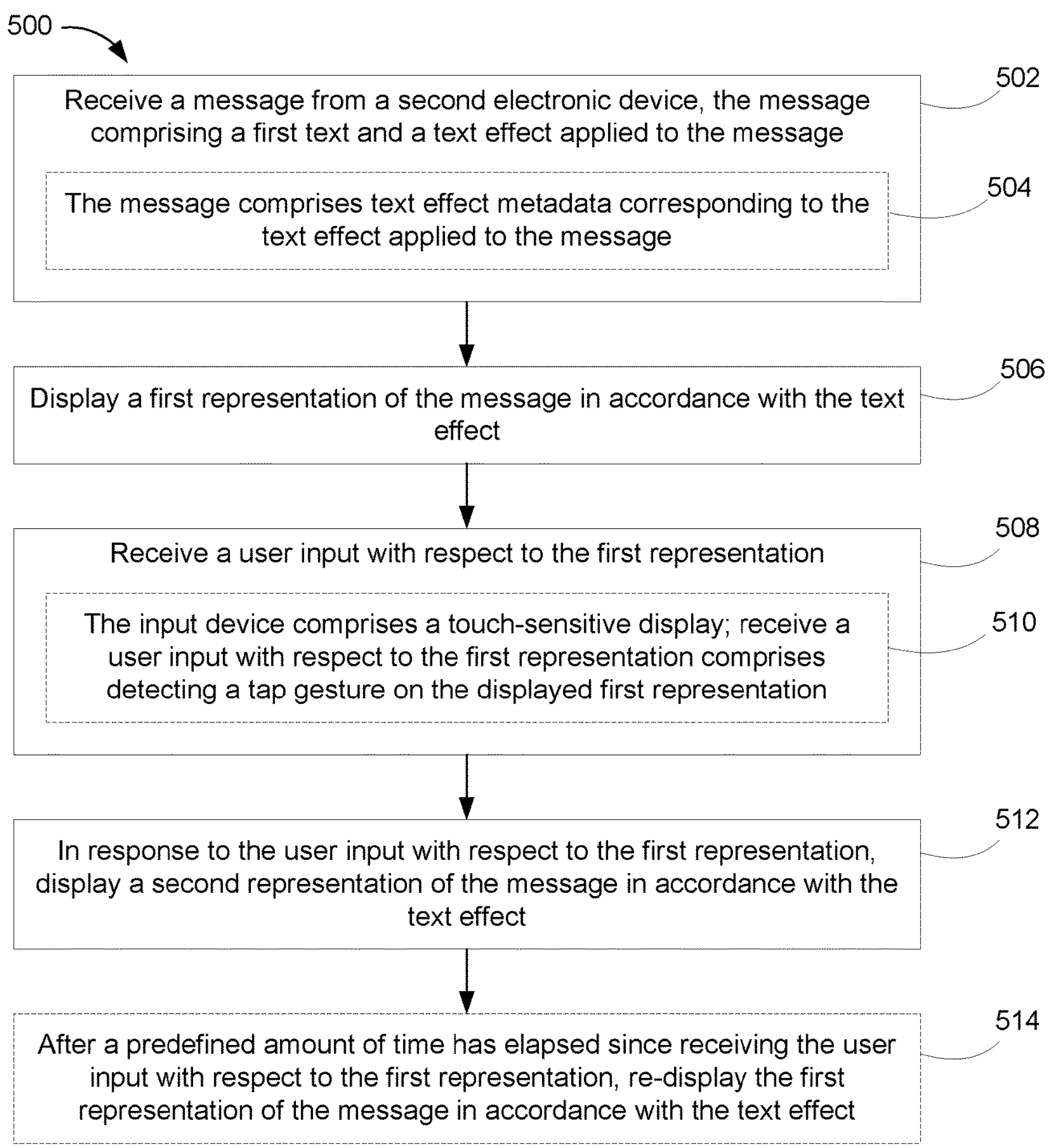
Figure 5C:
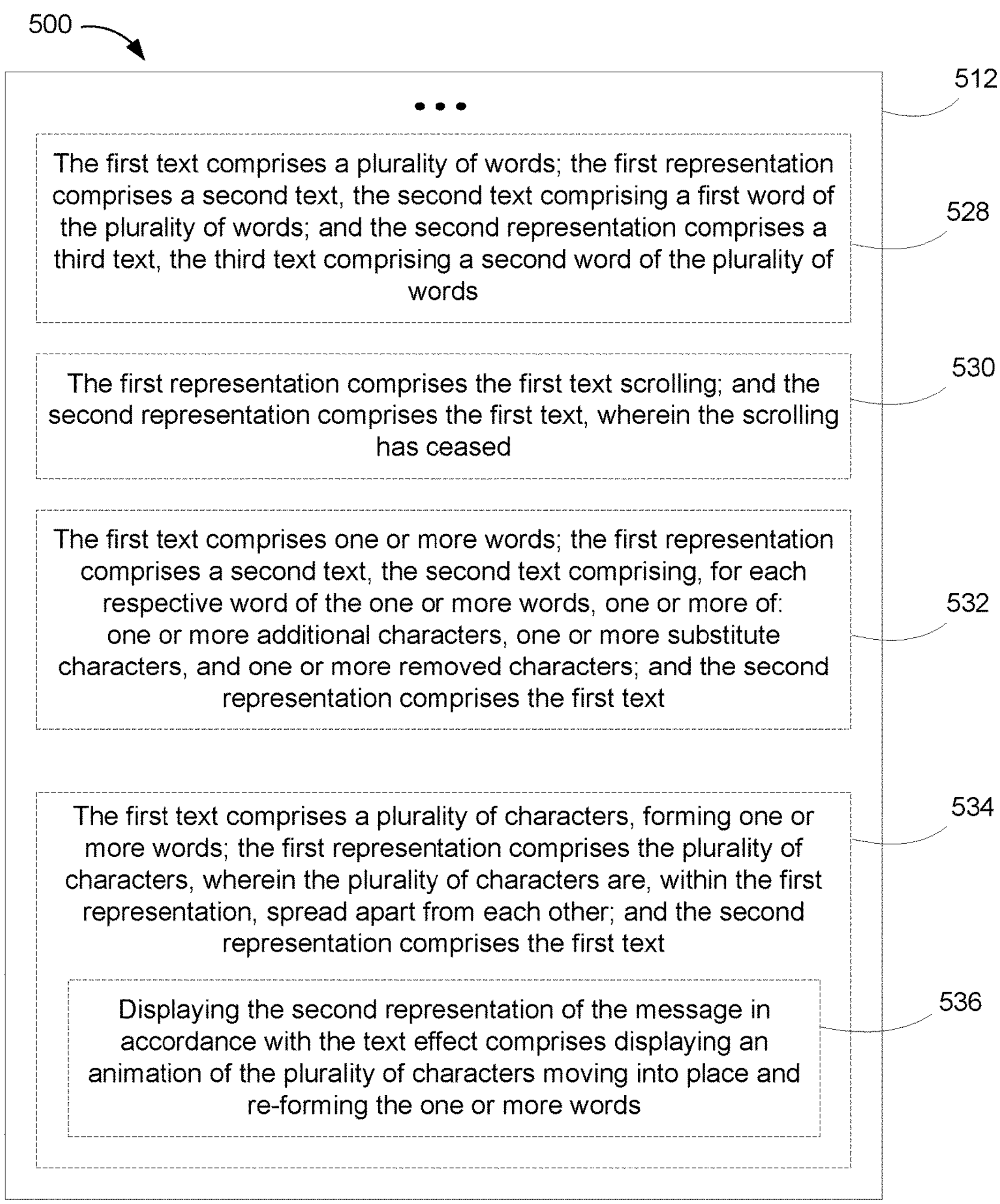

FIGS. 5A-5C are flow diagrams illustrating a method 500 of displaying text with message effects on an electronic device (e.g., client device 102) in accordance with some implementations. FIGS. 5A-5C correspond to instructions stored in a computer memory or a computer readable storage medium (e.g., memory 206). In some implementations, the method 500 is performed at a first electronic device with a display and an input device (e.g., client device 102).

The device receives (502) a message from a second electronic device. The message includes a first text and a message effect applied to the message. For example, FIG. 4SS shows a message 4004-1 received by the messaging module 110 on the device 4001. The message 4004-1 includes text 4005. The "top secret" message effect is applied to the message 4004-1.

The device displays (506) a first representation of the message in accordance with the message effect. As shown in FIG. 4SS, for example, in accordance with the "top secret" message effect, the messaging module 110 displays the message 4004-1 with text 4005 obscured by a censoring graphic 4028.

The device receives (508) a user input with respect to the first representation. For example, User A makes an input (e.g., performs a gesture, such as a tap gesture) with respect to the message 4004-1 (e.g., the gesture is performed on the message 4004-1). The device 4001 receives and detects the user input (e.g., the gesture performed by User A). In some implementations, the user input with respect to the first representation is a non-editing input (e.g., an input that does not input or edit a message or message text). For example, the user input does not input text into message area 4010, or edit text in message area 4010 or in a message 4002 or 4004. In some implementations, the messaging module 110 is configured to not allow editing of text in messages that have been sent. Thus, user inputs with respect to the first representation of a message (that has been sent) do not edit the message or the message text.

In response to the user input with respect to the first representation, the device (512) displays a second representation of the message in accordance with the message effect. As shown in FIG. 4TT, for example, in accordance with the "top secret" message effect, or more particularly, how the messaging module 110 responds to user input while the "top secret" message effect is applied to the message, the messaging module 110 displays the message 4004-1 with text 4005 and without the censoring graphic 4028.

In some implementations, the message includes message effect metadata corresponding to the message effect applied to the message (504). The message 4004-1 includes the text 4005 and message effect metadata (e.g., metadata 242). The messaging module 110 displays the message 4004-1 in accordance with the "top secret" message effect based on the metadata indicating the "top secret" effect has been applied to the message 4004-1.

In some implementations, the input device includes a touch-sensitive display, and receiving a user input with respect to the first representation includes detecting a tap gesture on the displayed first representation (510). For example, the device 4001 includes a touch screen. User A makes the user input with respect to the message 4004-1 by tapping on the touch screen at the location of the message 4004-1. The device 4001 detects the tap by User A as a tap gesture on the message 4004-1.

In some implementations, after a predefined amount of time has elapsed since receiving the user input with respect to the first representation, the device re-displays (514) the first representation of the message in accordance with the message effect. For example, after a predefined amount of time has elapsed from User A's tap gesture on the message 4004-1, the message 4004-1 is again displayed with the censoring graphic 4028.

In some implementations, the first text includes one or more words, each respective word of the one or more words including a respective plurality of characters in a first respective character order; the first representation includes a second text, the second text including, for each respective word of the one or more words, the respective plurality of characters in a second respective character order different from the first respective character order; and the second representation includes the first text (516). For example, the original message text (e.g., text 4026-A or text 4005) of a message includes one or more multi-character words. For each multi-character word, the characters are in an ordering. When the message is displayed in accordance with the "character jumble" effect, the characters in the words in the message text are rearranged into different orders on a word-by-word basis, as shown in FIGS. 4C-4E for example. In response to the user input with respect to the message, the original message text is displayed; the original character orderings are restored.

In some implementations, the first representation includes an obscuring graphic over the first text, and the second representation includes the first text (518). For example, when a message is displayed in accordance with the "top secret" effect, the message text is obscured by a censoring graphic 4028, as shown in FIGS. 4G-41 and 4SS-4TT for example. In response to the user input with respect to the message, the original message text is displayed and is not obscured by the censoring graphic 4028; the censoring graphic 4028 is removed.

In some implementations, the first text includes a plurality of words in a first word order; the first representation includes a second text, the second text including the plurality of words in a second word order different from the first word order; and the second representation includes the first text (520). For example, the original message text of a message (e.g., text 4026-A or text 4005) includes multiple words in one order (e.g., an order as composed by the user who composed the message). When the message is displayed in accordance with the "reverse" effect, the words in the message text are presented in reverse order, as shown in FIGS. 4K-4M for example, or more generally, re-ordered randomly or in accordance with one or more predefined rules. In response to the user input with respect to the message, the original message text is displayed; the original word order is restored.

In some implementations, the first text includes one or more words, each respective word of the one or more words including a respective plurality of characters in a first respective character order; the first representation includes a second text, the second text including, for each respective word of the one or more words: the respective plurality of characters in a second respective character order different from the first respective character order, and one or more additional characters; and the second representation includes the first text (522). For example, the original message text (e.g., text 4026-A or text 4005) of a message may include one or more multi-character words. For each multi-character word, the characters are in an ordering. When the message is displayed in accordance with the "pig latin" effect, the original message text is converted into Pig Latin. In some implementations, the Pig Latin conversion includes, for a word with a leading non-silent consonant, moving the leading consonant to the end of the word (i.e., the characters in the word is a different order than in the original message text) and adding an "ay" suffix to the re-ordered word, as shown in FIGS. 4O-4Q for example. In response to the user input with respect to the message, the original message text is displayed; the Pig Latin conversion is undone.

In some implementations, the first text includes a plurality of words; the first representation includes a second text, the second text including a subset of the plurality of words; and the second representation includes the first text (524). In some implementations, the words of the plurality of words excluded from the second text include one or more words that satisfy one or more predefined word exclusion criteria (526). For example, the original message text (e.g., text 4026-A or text 4005) of a message includes multiple words. When the message is displayed in accordance with the "toddler talk" effect, some of the words in the original message text are removed. Words that meet one or more word exclusion criteria are removed. For example, words that belong in predefined categories (e.g., a word is a connector word, an article, a pronoun, or a preposition) are removed, as shown in FIGS. 4S-4U for example. In response to the user input with respect to the message, the original message text is displayed; the removed words are restored.

In some implementations, the first text includes a plurality of words; the first representation includes a second text, the second text including a first word of the plurality of words; and the second representation includes a third text, the third text including a second word of the plurality of words (528). For example, the original message text (e.g., text 4026-A or text 4005) of a message includes multiple words. When the message is displayed in accordance with the "one at a time" effect, words of the original message text are displayed or presented one at a time (e.g., one per tap on the message, words displayed one at a time automatically with a predefined amount of time between words). In response to the user input with respect to the message or elapse of a predefined amount of time, the next word appears, as shown in FIGS. 4W-4Z for example. For example, one word is displayed, and then that word is replaced by the next word with a tap or elapse of the predefined amount of time, and so on one word at a time, and then when each words has been individually displayed, the entire message text is displayed. As another example, one word of the message text is displayed. Then the next word is added with a tap on the message or elapse of the predefined amount of time, so that two words are displayed. Then the next word is added with the next tap or another elapse of the predefined amount of time, and so on until the entire message text is displayed.

In some implementations, the first representation includes the first text scrolling, and the second representation includes the first text, wherein the scrolling has ceased (530). For example, when a message is displayed in accordance with the "marquee" effect, the message text is scrolled (e.g., as in text scrolling on a scoreboard or a stock ticker), as shown in FIGS. 4BB-4DD for example. In response to the user input with respect to the message, the original message text is displayed without the scrolling, i.e., the scrolling stops.

In some implementations, the first text includes one or more words; the first representation includes a second text, the second text including, for each respective word of the one or more words, one or more of: one or more additional characters, one or more substitute characters, and one or more removed characters; and the second representation includes the first text (532). For example, the original message text (e.g., text 4026-A or text 4005) of a message includes multiple words. When the message is displayed in accordance with the "rapper style" effect, each of one or more words of the original message text are converted by adding characters, substituting characters, and/or removing characters, as shown in FIGS. 4FF-4HH for example. In some implementations, the conversion is performed in accordance with one or more predefined rules or a predefined grammar. For example, the rules or grammar may be predefined so that the resulting text mimics the verbal style associated with rappers or hip-hop artists generally or with a specific rapper or hip-hop artist. In response to the user input with respect to the message, the original message text is displayed; the conversion is undone. More generally, the original message text may be converted by character addition, substitution, and/or in accordance with one or more predefined rules or a predefined grammar.

In some implementations, the first text includes a plurality of characters, forming one or more words; the first representation includes the plurality of characters, wherein the plurality of characters are, within the first representation, spread apart from each other; and the second representation includes the first text (534). In some implementations, displaying the second representation of the message in accordance with the message effect includes displaying an animation of the plurality of characters moving into place and re-forming the one or more words (536). For example, the original message text (e.g., text 4026-A or text 4005) of a message includes multiple characters. When the message is displayed in accordance with the "spread out" effect, the characters of the original message text spread apart from each other, as shown in FIGS. 4JJ-4NN for example. In response to the user input with respect to the message, the original message text is displayed; characters move and re-form the original message text. The movement of the characters to re-form the original message text may be displayed as an animation.

Figure 6:
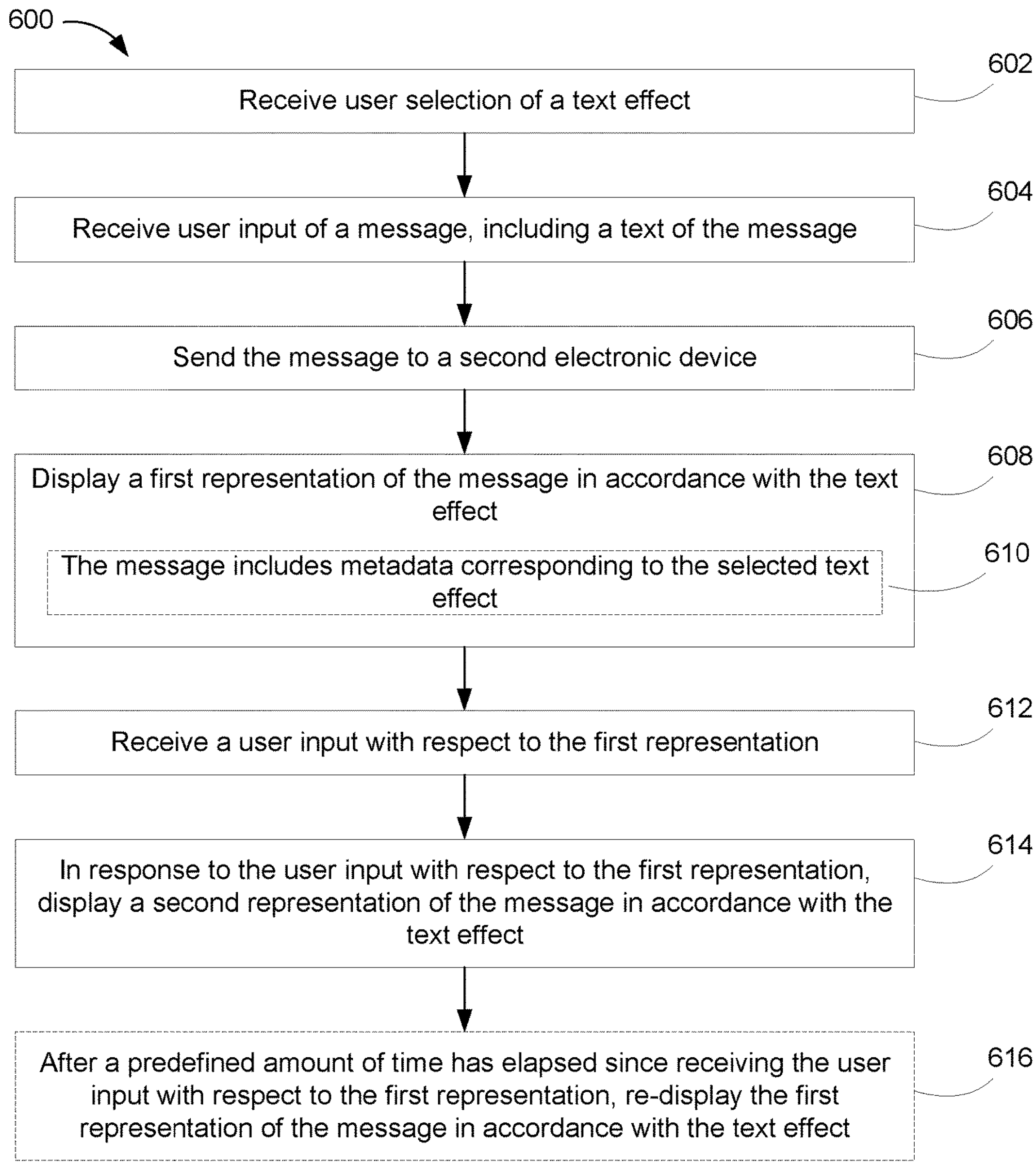
FIG. 6 illustrates a method of displaying text with message effects in accordance with some implementations.

FIG. 6 is a flow diagram illustrating a method of displaying text with message effects on an electronic device (e.g., client device 102) in accordance with some implementations. FIG. 6 corresponds to instructions stored in a computer memory or a computer readable storage medium (e.g., memory 206). In some implementations, the method 600 is performed at a first electronic device with a display and an input device (e.g., client device 102).

The device receives (602) user selection of a message effect. As shown in FIG. 4B-4C, for example, User A selects the "character jumble" key 4012-1 from the message effect source 4022. The device 4001 receives the selection.

The device receives (604) user input of a message, including a text of the message. User A inputs the message text 4026 for a message 4002-2 into message area 4010.

It should be appreciated that the user may select the message effect before or after inputting the text into the message area 4010. As long as the message has not been sent yet, the user may select a message effect, change the message effect, or cancel the message effect for text input in the message area 4010.

The device sends (606) the message to a second electronic device. When the User A activates the send icon 4014, the message 4002-2 is sent from the device 4001 to the server system 106, which sends the message to the destination device.

The device displays (608) a first representation of the message in accordance with the message effect. At the device of the message sender, the sent message is displayed in accordance with the selected message effect. For example, if the selected message effect is "character jumble," the sent message 4002-2 is displayed with the characters in the words in message text 4026 rearranged, as shown in FIGS. 4C-4D for example.

The device receives (612) a user input with respect to the first representation. For example, User A makes an input (e.g., performs a gesture, such as a tap gesture) with respect to the message 4002-2 (e.g., the gesture is performed on the message 4002-2). The device 4001 receives and detects the user input (e.g., the gesture performed by User A). In some implementations, the user input with respect to the first representation is a non-editing input (e.g., an input that does not input or edit a message or message text). For example, the user input does not input text into message area 4010, or edit text in message area 4010 or in a message 4002 or 4004. In some implementations, the messaging module 110 is configured to not allow editing of text in messages that have been sent. Thus, user inputs with respect to the first representation of a message (that has been sent) do not edit the message or the message text.

In response to the user input with respect to the first representation, the device displays (614) a second representation of the message in accordance with the message effect. In response to the user input, the message text 4026 is displayed differently. For example, the original message text 4026-A is displayed, as shown in FIG. 4E for example.

In some implementations, the message includes metadata corresponding to the selected message effect (610). The message 4002-2 is sent with message effect metadata (e.g., message effect metadata 242) generated by the message effects module 230 when the message 4002-2 is sent with a message effect selected by User A. The message effect metadata indicates what message effect is applied to the message 4002-2.

In some implementations, after a predefined amount of time has elapsed since receiving the user input with respect to the first representation, the device re-displays (616) the first representation of the message in accordance with the message effect. For example, from FIG. 4E, after a predefined amount of time has elapsed from User A's tap gesture on the message 4002-2, the message 4002-2 is again displayed with the characters in the words in text 4026 reordered as in FIG. 4D.

Figure 7B:
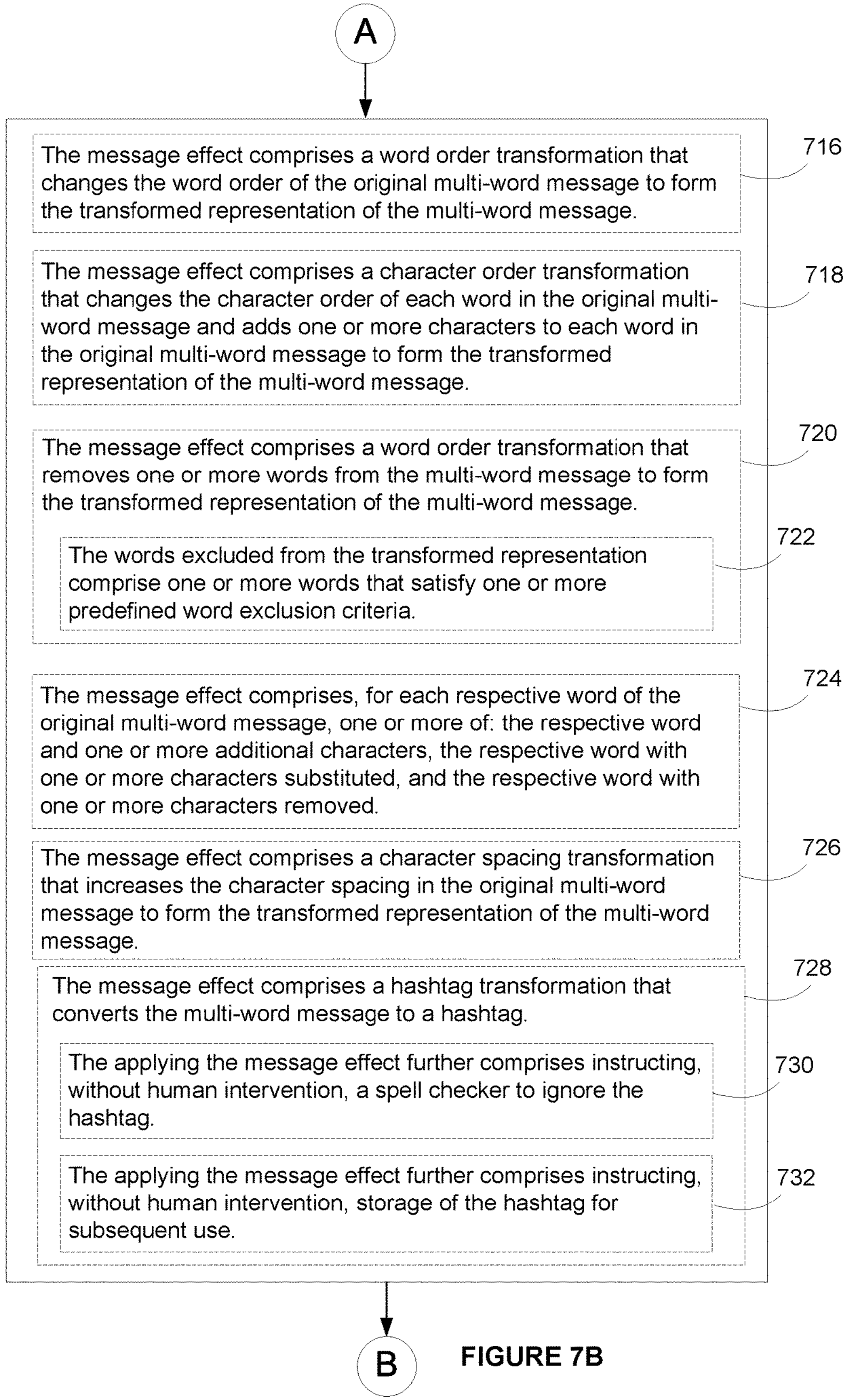
Figure 7C:
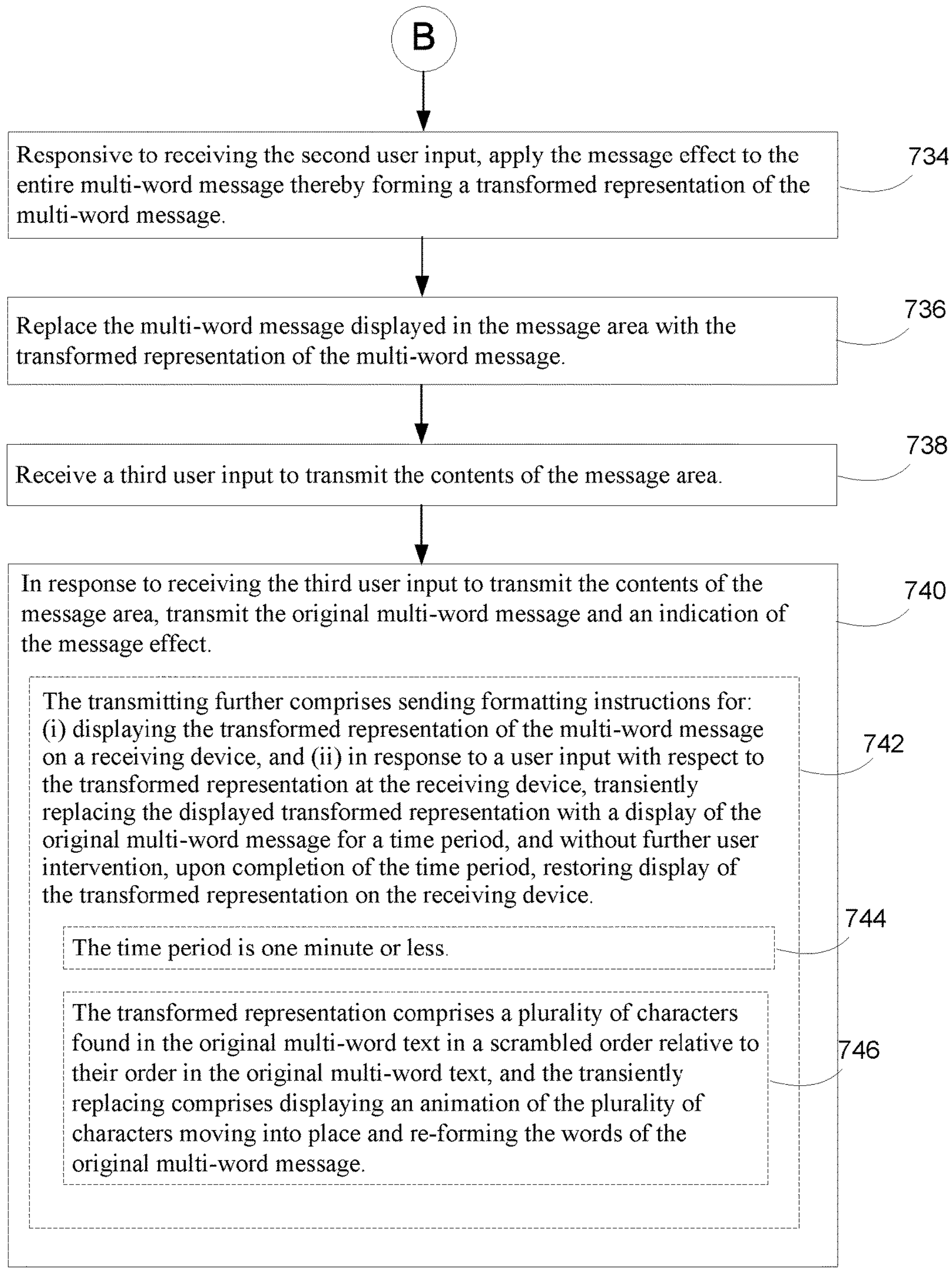

Turning to FIG. 7, a flow diagram illustrating a method of applying transformations to messages within message conversations in accordance with some implementations is provided. FIG. 7 corresponds to instructions stored in a computer memory or a computer readable storage medium (e.g., memory 206). In some implementations, the method 700 is performed at a first electronic device with a display and an input device (e.g., client device 102). A graphical input stream comprising a plurality of keys is displayed. For instance, in FIG. 4A, the graphical input stream is illustrated as portion 4040 in addition to keys 4012. The plurality of keys comprises a first subset of keys that collectively provide a character set source. For instance, in FIG. 4A, the first subset of keys is the keys 4040. Each respective key in the first subset of keys corresponds to a key in the character set and thus the first subset of keys collective provide a character set source. Examples of character sets include, but are not limited to, ASCII, HANZI, Guojia Biaozhun, GB2312 character set, GBK/1, GBK/2, GBK/3, GBK/4, GBK/5, ISO-8859-1, ISO-8859-2, ISO-8859-3, ISO-8859-4, ISO-8859-5, ISO-8859-6, ISO-8859-7, ISO-8859-8, ISO-8859-9, and ISO-8859-10. The plurality of keys further comprises a second subset of keys that collectively provide a message effect source. In FIGS. 4A through 4SS, this second subset of keys is the keys 4012. In FIGS. 4B through 4SS each respective key 4012 in the second subset of keys represents a unique message effect in a plurality of message effects. The first subset of keys and the second subset of keys are displayed concurrently in the graphical input stream (702) as illustrated, for example, in FIGS. 4A through 4SS.

In some embodiments, the graphical input stream further includes a source of emojis, unicode symbols, emoticons, icons or logos (704). For instance, in FIG. 4A, emoji 4008 is displayed. Conveniently, in some embodiments, the graphical input stream displays a plurality of emojis, unicode symbols, emoticons, icons or logos, each mapped to a different key, and these emojis, unicode symbols, emoticons, icons or logos are displayed along with the character set source and the message effect source.

A message area is displayed (706). An example of such a message area is message area 4010 in FIGS. 4A through 4SS. In the methods, a first user input is received from the character set source. That is, referring to FIG. 4B, a user presses certain of the keys in area 4040 in order to form an original multi-word message. Each respective character of the original multi-word message is displayed in the message area 4010 as the respective character is inputted (708). Thus for example, referring to FIG. 4C, a user has entered the message "Can I join you meeting somewhere." Next, a second user input is received from the message effect source. The second user input specifies a message effect in the plurality of message effects (710).

For instance, in FIG. 4C, the message effect comprises a character order transformation 4012-1 that changes the character order of each word in the original multi-word message to form the transformed representation of the multi-word message (712). Thus, in such embodiments, the user presses key 4012-1 thereby enacting the transformed representation of the multi-word message, "nCa I ionj oyu igetnem uyo eworeshme?", as illustrated in FIG. 4D.

As another example, referring to FIG. 4F, the message effect comprises application of an obscuring graphic over the original multi-word text to form the transformed representation of the multi-word message (714). Thus, in such embodiments, the user presses key 4012-2 thereby enacting the transformed representation 4028 of the multi-word message illustrated in FIG. 4H.

As another example, referring to FIG. 4I, the message effect comprises a word order transformation that changes the word order of the original multi-word message to form the transformed representation of the multi-word message (716). Thus, in such embodiments, the user presses key 4012-3 thereby enacting the transformed representation of the multi-word message, "somewhere? you meeting you join I Can" 4026-C, as illustrated in FIG. 4L.

As still another example, the message effect comprises a character order transformation that changes the character order of each word in the original multi-word message and adds one or more characters to each word in the original multi-word message to form the transformed representation of the multi-word message (718).

As still another example, the message effect comprises a word order transformation that removes one or more words from the multi-word message to form the transformed representation of the multi-word message (720). In some embodiments, the words excluded from the transformed representation comprise one or more words that satisfy one or more predefined word exclusion criteria (722). For example, the original message text (e.g., text 4026-A or text 4005) of a message includes multiple words. When the message is displayed in accordance with the "toddler talk" effect 4012-5 of FIG. 4R, words that meet one or more word exclusion criteria are removed. For example, words that belong in predefined categories (e.g., a word is a connector word, an article, a pronoun, or a preposition) are removed, as shown in FIGS. 4S-4U for example. In response to the user input with respect to the message, the original message text is displayed; the removed words are restored.

As still another example, the transformed representation comprises, for each respective word of the original multi-word message, one or more of: the respective word and one or more additional characters, the respective word with one or more characters substituted, and the respective word with one or more characters removed (724).

As still another example, the message effect comprises a character spacing transformation that increases the character spacing in the original multi-word message to form the transformed representation of the multi-word message (726).

As still another example, referring to FIG. 4PP, the message effect comprises a hashtag transformation that converts the multi-word message to a hashtag (728). Thus, referring to FIG. 4PP, in such embodiments, the user presses key 4012-11 thereby enacting the transformed representation of the multi-word message, "#CanIjoinyoumeetingyousomewhere?" 4026-QQ, as illustrated in FIG. 4QQ. Advantageously, in some such embodiments, the applying the message effect further comprises instructing, without human intervention, a spell checker to ignore the hashtag (730). This is highly advantageous because hashtags notoriously trip spell checkers causing user frustration and delay as the hashtag is needlessly identified as a misspelled word and thus identified by the spell checker. In the disclosed embodiment, advantageously this does not happen. The spell checker ignores the transformed representation. In some embodiments, the applying the message effect further comprises instructing, without human intervention, storage of the hashtag for subsequent use (732). This is advantageous because such storage allows the user to resuse the hashtag later without having to reenter the hashtag. For instance, in some embodiments, the user types just the first few characters of the hashtag and then the hashtag transformation key 4012-11. If there is a match between the entered characters and one or more preexisting hashtags, such preexisting hashtags are suggested to the user for use. When the user selects one of the suggested preexisting hashtags, the hashtag is incorporated into the message area 4010.

Referring to FIG. 7, responsive to receiving the second user input (e.g., a selection of one of keys 4012), the message effect is applied to the entire multi-word message thereby forming a transformed representation of the multi-word message (734). In some embodiments, the user can select more than one message transformation and each of the selected message transformations is applied to the multi-word message in order to form the transformed representation. For instance, in some embodiments, any combination of the message transformations disclosed in the present disclosure can be applied to a multi-word message to form the message transformation. In alternative embodiments, only a single message transformation can be applied to a multi-word message.

Continuing to refer to FIG. 7, the multi-word message displayed in the message area 4010 is replaced with the transformed representation of the multi-word message (736). For instance, referring to FIG. 4PP, when the user presses the key 4012-11, the multi-word message "Can I join you meeting you somewhere?" is replaced with the transformed representation "#CanIjoinyoumeetingyousomewhere?" as illustrated in FIG. 4-QQ.

Continuing to refer to FIG. 7, a third user input is received to transmit the contents of the message area (738). For example, in FIG. 4-QQ, the user presses the transmit key 4014 to transmit the transformed representation. Continuing to refer to FIG. 7, in response to receiving the third user input to transmit the contents of the message area, the original multi-word message is transmitted along with an indication of the message effect (740). In some embodiments, transmitting the original multi-word message and an indication of the message effect involves sending the original multi-word message and an indication of the message effect as separate constructs. Such transmission embodiments are advantageous because, under certain circumstances, the message effect can be separated from the original multi-word message. In some alternative embodiments, however, transmitting the original multi-word message and an indication of the message effect consists of sending only the transformed representation. In such embodiments, the original multi-word message is not transmitted and thus, in such embodiments, it is not possible to separate the message effect from the original multi-word message. For example, in some embodiments, one of the message transformations is the hash tag transformation and only the hash tag is transmitted, not the original multi-word message. In yet another example, one of the message transformations is the hash tag transformation and the original multi-word message is transmitted along with an indication that the message transformation is the hash tag transformation.

Referring once again to FIG. 7, in some embodiments, the transmitting further comprises sending formatting instructions for: (i) displaying the transformed representation of the multi-word message on a receiving device, and (ii) in response to a user input with respect to the transformed representation at the receiving device, transiently replacing the displayed transformed representation with a display of the original multi-word message for a time period, and without further user intervention, upon completion of the time period, restoring display of the transformed representation on the receiving device (742). For instance, in some embodiments, the recipient of a transformed representation may temporarily reverse the transformation (e.g., by performing a predetermined action on the recipient device such as pressing a predetermined key, making a predetermined swipe motion, or moving the device in a predetermined way) in order to view the original multi-word message. In some embodiments, in this way, the recipient is able to view the original multi-word message for a minute or less (744). In some embodiments, in this way, the recipient is able to view the original multi-word message for five minutes or less, 1 minute or less, 30 seconds or less, 5 seconds or less, 1 second or less, 100 milliseconds or less, 10 milliseconds or less, or 1 millisecond or less.

In some embodiments, the transformed representation comprises a plurality of characters found in the original multi-word text in a scrambled order relative to their order in the original multi-word text, and the transiently replacing comprises displaying an animation of the plurality of characters moving into place and re-forming the words of the original multi-word message (746)

It should be appreciated that the user interfaces illustrated in the drawings and described above are exemplary. Many variations on the user interfaces illustrated in the drawings and described above are possible. For example, positions of icons and buttons within an interface may differ from what is shown in the drawings. Icons and buttons that are shown may be omitted, and icons and buttons that are not shown may be included. Backgrounds may differ from what is shown in the drawings. The arrangement of areas and objects within an interface may differ from what is shown in the drawings.

It will be understood that, although the terms “first,” “second,” etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the “first device” are renamed consistently and all occurrences of the “second device” are renamed consistently. The first device and the second device are both device, but they are not the same device.

The terminology used herein is for the purpose of describing particular implementations only and is not intended to be limiting of the claims. As used in the description of the implementations and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in accordance with a determination” or “in response to detecting,” that a stated condition precedent is true, depending on the context. Similarly, the phrase “if it is determined [that a stated condition precedent is true]” or “if [a stated condition precedent is true]” or “when [a stated condition precedent is true]” may be construed to mean “upon determining” or “in response to determining” or “in accordance with a determination” or “upon detecting” or “in response to detecting” that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method comprising, at a first electronic device with a display and an input device:

displaying a graphical input stream comprising a plurality of keys, wherein the plurality of keys comprises:

a first subset of keys that collectively provide a character set source, wherein each respective key in the first subset of keys corresponds to a key in the character set, and a second subset of keys that collectively provide a message effect source, wherein each respective key in the second subset of keys represents a unique message effect in a plurality of message effects, wherein the first subset of keys and the second subset of keys are displayed concurrently in the graphical input stream;

displaying a first original multi-word message at a first portion of the display, wherein the first original multi-word message is a message previously received by or transmitted from the first electronic device;

displaying a message area at a second portion of the display;

receiving a first user input from the character set source, the first user input forming a second original multi-word message, wherein the receiving further comprises displaying each respective character of the second original multi-word message in the message area as the respective character is inputted;

receiving a second user input from the message effect source, wherein the second user input specifies a message effect in the plurality of message effects;

responsive to receiving the second user input, applying the message effect to only the second multi-word message thereby forming a transformed representation of the second multi-word message;

replacing only the second multi-word message displayed in the message area with the transformed representation of the second multi-word message;

receiving a third user input to transmit the contents of the message area; and in response to receiving the third user input to transmit the contents of the message area, transmitting the second original multi-word message and an indication of the message effect.

2. The method of claim 1, wherein the transmitting further comprises sending formatting instructions for:

(i) displaying the transformed representation of the second multi-word message on a receiving device, and (ii) in response to a user input with respect to the transformed representation at the receiving device, transiently replacing only the displayed transformed representation with a display of the second original multi-word message for a time period, and without further user intervention, upon completion of the time period, restoring display of the transformed representation on the receiving device.

3. The method of claim 2, wherein time period is one minute or less.

4. The method of claim 1, wherein the graphical input stream further includes a source of emojis, Unicode symbols, emoticons, icons or logos.

5. The method of claim 1, wherein:

the message effect comprises a character order transformation that changes the character order of each word in the second original multi-word message to form the transformed representation of the second multi-word message.

6. The method of claim 1, wherein:

the message effect comprises application of an obscuring graphic over the second original multi-word text to form the transformed representation of the second multi-word message.

7. The method of claim 1, wherein:

the message effect comprises a word order transformation that changes the word order of the second original multi-word message to form the transformed representation of the second multi-word message.

8. The method of claim 1, wherein:

the message effect comprises a character order transformation that changes the character order of each word in the second original multi-word message and adds one or more characters to each word in the second original multi-word message to form the transformed representation of the second multi-word message.

9. The method of claim 1, wherein:

the message effect comprises a word order transformation that removes one or more words from the second multi-word message to form the transformed representation of the second multi-word message.

10. The method of claim 9, wherein the words excluded from the transformed representation comprise one or more words that satisfy one or more predefined word exclusion criteria.

11. The method of claim 1, wherein:

the transformed representation comprises, for each respective word of the second original multi-word message, one or more of:

the respective word and one or more additional characters, the respective word with one or more characters substituted, and the respective word with one or more characters removed.

12. The method of claim 1, wherein:

the transformed representation comprises a character spacing transformation that increases the character spacing in the second original multi-word message to form the transformed representation of the second multi-word message.

13. The method of claim 2, wherein the transformed representation comprises a plurality of characters found in the second original multi-word text in a scrambled order relative to their order in the second original multi-word text, and the transiently replacing comprises displaying an animation of the plurality of characters moving into place and re-forming the words of the second original multi-word message.

14. The method of claim 1, wherein the message effect comprises a hashtag transformation that converts the second multi-word message to a hashtag.

15. The method of claim 14, wherein the applying the message effect further comprises instructing, without human intervention, a spell checker to ignore the hashtag.

16. The method of claim 14, wherein the applying the message effect further comprises instructing, without human intervention, storage of the hashtag for subsequent use.

17. A method comprising, at a first electronic device with a display and an input device:

displaying a graphical input stream comprising a plurality of keys, wherein the plurality of keys comprises:

a first subset of keys that collectively provide a character set source, wherein each respective key in the first subset of keys corresponds to a key in the character set, and a second subset of keys that collectively provide a message effect source, wherein each respective key in the second subset of keys represents a unique message effect in a plurality of message effects, and the first subset of keys and the second subset of keys are displayed concurrently in the graphical input stream;

displaying a first original multi-word message at a first portion of the display wherein the first original multi-word message is a message previously received by or transmitted from the first electronic device;

displaying a message area at a second portion of the display;

receiving a first user input from the character set source, the user input forming a second original multi-word message, wherein the receiving further comprises displaying each respective character of the second original multi-word message in the message area as the respective character is inputted;

receiving a second user input from the message effect source, wherein the second user input specifies a message effect in the plurality of message effects, wherein the message effect is a hashtag key;

responsive to receiving the second user input, applying the message effect to only the second multi-word message thereby forming a transformed representation of the second multi-word message, wherein the transforming converts the second multi-word message to a hashtag;

replacing only the second multi-word message displayed in the message area with the hashtag;

receiving a third user input to transmit the contents of the message area; and in response to receiving the third user input to transmit the contents of the message area, transmitting the hashtag.

18. A non-transitory computer-readable storage medium storing one or more programs, the one or more programs comprising instructions which, when executed by an electronic device with a display and an input device, cause the device to:

display a graphical input stream comprising a plurality of keys, wherein the plurality of keys comprises:

a first subset of keys that collectively provide a character set source, wherein each respective key in the first subset of keys corresponds to a key in the character set, and a second subset of keys that collectively provide a message effect source, wherein each respective key in the second subset of keys represents a unique message effect in a plurality of message effects, and wherein the first subset of keys and the second subset of keys are displayed concurrently in the graphical input stream;

display a first original multi-word message at a first portion of the display, wherein the first original multi-word message is a message previously received by or transmitted from the electronic device;

display a message area at a second portion of the display;

receive a first user input from the character set source, the first user input forming a second original multi-word message, and display each respective character of the second original multi-word message in the message area as the respective character is inputted;

receive a second user input from the message effect source, wherein the second user input specifies a message effect in the plurality of message effects;

responsive to the second user input, applying the message effect to the only the second multi-word message thereby forming a transformed representation of the second multi-word message;

replacing only the second multi-word message displayed in the message area with the transformed representation of the second multi-word message;

receiving a third user input to transmit the contents of the message area; and in response to receiving the third user input, transmitting the second original multi-word message and an indication of the message effect.

19. The non-transitory computer-readable storage medium of claim 18, wherein the transmitting further comprises sending formatting instructions for:

displaying the transformed representation of the second multi-word message on a receiving device, and in response to a user input with respect to the transformed representation at the receiving device, transiently replacing only the displayed transformed representation with a display of the second original multi-word message for a time period, and without further user intervention, upon completion of the time period, restoring display of the transformed representation on the receiving device.

20. A method of communicating at a server comprising one or more processors, and memory for storing programs to be executed by the one or more processors, the method comprising:

formatting for display on a source electronic device, a graphical input stream comprising a plurality of keys, wherein the plurality of keys comprises:

a first subset of keys that collectively provide a character set source for a character set, wherein each respective key in the first subset of keys corresponds to a key in the character set, and a second subset of keys that collectively provide a message effect source, wherein each respective key in the second subset of keys represents a unique message effect in a plurality of message effects, and the first and second subset of keys are displayed concurrently in the graphical input stream;

receiving, from the source electronic device, (i) a first original multi-word message entered by a user through use of the first subset of keys, (ii) a second original multi-word message entered by the user through the use of the first subset of keys, and (iii) an indication of a message effect for the second original multi-word message entered by the user at the source electronic device by selection of a key in the second subset of keys, wherein the message effect is applied to the entire second multi-word message thereby forming a transformed representation of the second multi-word message;

transmitting the first original multi-word message to a recipient electronic device indicated by the user; and transmitting only the transformed representation of the second multi-word message to the recipient electronic device.

21. The method of claim 20, wherein the message effect comprises a hashtag transformation that converts the multi-word message to a hashtag.

22. The method of claim 21, wherein a spell checker operating at the source electronic device or the recipient electronic device ignores the hashtag.

23. The method of claim 21, wherein the hashtag is automatically, without human intervention, stored at the source electronic device for subsequent use.

24. The method of claim 20, wherein the transformed representation is formed at the source electronic device and the server does not receive or transmit the original multi-word message.

25. The method of claim 20, wherein the transformed representation is formed at the server and the server does not transmit the original multi-word message.

26. The method of claim 20, wherein the transformed representation is formed at the recipient electronic device and the server receives the original multi-word message from the source electronic device and transmits the original multi-word message to the recipient electronic device.

* * * * *